(12) United States Patent
Chen

(10) Patent No.: US 11,340,430 B2
(45) Date of Patent: May 24, 2022

(54) OPTICAL LENS SYSTEM, IMAGE CAPTURING UNIT AND ELECTRONIC DEVICE COMPRISING NINE LENSES OF VARIOUS REFRACTIVE POWERS, OR TEN LENSES OF -+--+-+-+- OR ++--+-+-+- REFRACTIVE POWERS

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 132 days.

(21) Appl. No.: 16/560,751

(22) Filed: Sep. 4, 2019

(65) Prior Publication Data

US 2020/0393653 A1    Dec. 17, 2020

(30) Foreign Application Priority Data

Jun. 14, 2019   (TW) ................................. 108120723

(51) Int. Cl.
    *G02B 13/00*  (2006.01)
    *G02B 9/64*   (2006.01)

(52) U.S. Cl.
    CPC ........... *G02B 13/0045* (2013.01); *G02B 9/64* (2013.01)

(58) Field of Classification Search
    CPC .............................. G02B 13/0045; G02B 9/64
    See application file for complete search history.

(56) References Cited

U.S. PATENT DOCUMENTS

| 6,025,959 | A | 2/2000 | Moskovich | |
|---|---|---|---|---|
| 2020/0209593 | A1 | 7/2020 | Hirano | |
| 2020/0209594 | A1 | 7/2020 | Hirano | |
| 2020/0241243 | A1* | 7/2020 | Hirano | ............... G02B 13/0045 |
| 2020/0249437 | A1 | 8/2020 | Hirano | |
| 2020/0271898 | A1 | 8/2020 | Hirano | |
| 2020/0285028 | A1 | 9/2020 | Hirano | |
| 2020/0333569 | A1 | 10/2020 | Kondo | |

FOREIGN PATENT DOCUMENTS

| CN | 111665611 A | 9/2020 |
|---|---|---|
| WO | 2020-080053 A1 | 4/2020 |

OTHER PUBLICATIONS

Chinese Office Action dated Aug. 4, 2021 as received in application No. 201910575371.5.

* cited by examiner

*Primary Examiner* — Wen Huang
(74) *Attorney, Agent, or Firm* — Maschoff Brennan

(57) ABSTRACT

An optical lens system includes nine lens elements which are, in order from an object side to an image side: a first lens element, a second lens element, a third lens element, a fourth lens element, a fifth lens element, a sixth lens element, a seventh lens element, an eighth lens element and a ninth lens element. At least one lens surface of the seventh lens element, the eighth lens element and the ninth lens element has at least one critical point in an off-axis region thereof, and each of the seventh lens element, the eighth lens element and the ninth lens element has at least one lens surface being aspheric.

33 Claims, 29 Drawing Sheets

OPTICAL LENS SYSTEM, IMAGE CAPTURING UNIT AND ELECTRONIC DEVICE COMPRISING NINE LENSES OF VARIOUS REFRACTIVE POWERS, OR TEN LENSES OF -+--+-+-+- OR ++--+-+-+- REFRACTIVE POWERS

RELATED APPLICATIONS

This application claims priority to Taiwan Application 108120723, filed on Jun. 14, 2019, which is incorporated by reference herein in its entirety.

BACKGROUND

Technical Field

The present disclosure relates to an optical lens system, an image capturing unit and an electronic device, more particularly to an optical lens system and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical lens system includes nine lens elements. The nine lens elements are, in order from an object side to an image side, a first lens element, a second lens element, a third lens element, a fourth lens element, a fifth lens element, a sixth lens element, a seventh lens element, an eighth lens element and a ninth lens element.

At least one lens surface of the seventh lens element, the eighth lens element and the ninth lens element has at least one critical point in an off-axis region thereof. Each of the seventh lens element, the eighth lens element and the ninth lens element has at least one lens surface being aspheric.

When an axial distance between an object-side surface of the first lens element and an image surface is TL, a maximum image height of the optical lens system is ImgH, an entrance pupil diameter of the optical lens system is EPD, and a minimum value among Abbe numbers of all lens elements of the optical lens system is Vmin, the following conditions are satisfied:

$TL/\mathrm{Img}H<3.0$;

$TL/EPD<4.0$; and $V\mathrm{min}<28$.

According to another aspect of the present disclosure, an image capturing unit includes the aforementioned optical lens system and an image sensor, wherein the image sensor is disposed on the image surface of the optical lens system.

According to another aspect of the present disclosure, an electronic device includes at least two image capturing units which face in the same direction. The at least two image capturing units include a first image capturing unit and a second image capturing unit. The first image capturing unit is the aforementioned image capturing unit. The maximum field of view of the first image capturing unit is different from the maximum field of view of the second image capturing unit by at least 20 degrees.

According to another aspect of the present disclosure, an optical lens system includes, in order from an object side to an image side, a front lens group, a middle lens group and a rear lens group. The front lens group includes an object-side lens element closest to an imaged object. The rear lens group includes at least three lens elements.

At least one lens surface of the rear lens group has at least one critical point in an off-axis region thereof. Each lens element of the rear lens group has at least one lens surface being aspheric.

When the total number of lens elements of the optical lens system is NL, an axial distance between an object-side surface of the object-side lens element and an image surface is TL, a maximum image height of the optical lens system is ImgH, an entrance pupil diameter of the optical lens system is EPD, and a minimum value among Abbe numbers of all lens elements of the optical lens system is Vmin, the following conditions are satisfied:

$9 \le NL \le 10$;

$TL/\mathrm{Img}H<3.0$;

$TL/EPD<4.0$; and $V\mathrm{min}<28$.

According to another aspect of the present disclosure, an image capturing unit includes the aforementioned optical lens system and an image sensor, wherein the image sensor is disposed on the image surface of the optical lens system.

According to another aspect of the present disclosure, an electronic device includes the aforementioned image capturing unit.

According to one aspect of the present disclosure, an optical lens system includes nine lens elements. The nine lens elements are, in order from an object side to an image side, a first lens element, a second lens element, a third lens element, a fourth lens element, a fifth lens element, a sixth lens element, a seventh lens element, an eighth lens element and a ninth lens element.

At least one lens surface of the seventh lens element, the eighth lens element and the ninth lens element has at least one critical point in an off-axis region thereof. Each of the seventh lens element, the eighth lens element and the ninth lens element has at least one lens surface being aspheric. At least five lens elements of the optical lens system are made of plastic material.

When an axial distance between an object-side surface of the first lens element and an image surface is TL, a maximum image height of the optical lens system is ImgH, and an entrance pupil diameter of the optical lens system is EPD, the following conditions are satisfied:

$TL/\mathrm{Img}H<3.0$; and $TL/EPD<4.0$.

According to one aspect of the present disclosure, an optical lens system includes ten lens elements. The ten lens elements are, in order from an object side to an image side, a first lens element, a second lens element, a third lens element, a fourth lens element, a fifth lens element, a sixth lens element, a seventh lens element, an eighth lens element, a ninth lens element and a tenth lens element.

At least one lens surface of the eighth lens element, the ninth lens element and tenth lens element has at least one critical point in an off-axis region thereof. Each of the eighth lens element, the ninth lens element and tenth lens element has at least one lens surface being aspheric. At least five lens elements of the optical lens system are made of plastic material.

When an axial distance between an object-side surface of the first lens element and an image surface is TL, a maximum image height of the optical lens system is ImgH, an entrance pupil diameter of the optical lens system is EPD, and a minimum value among Abbe numbers of all lens elements of the optical lens system is Vmin, the following conditions are satisfied:

$TL/\mathrm{Img}H<3.0;$ $TL/EPD<4.0;$ and $V\mathrm{min}<28.$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
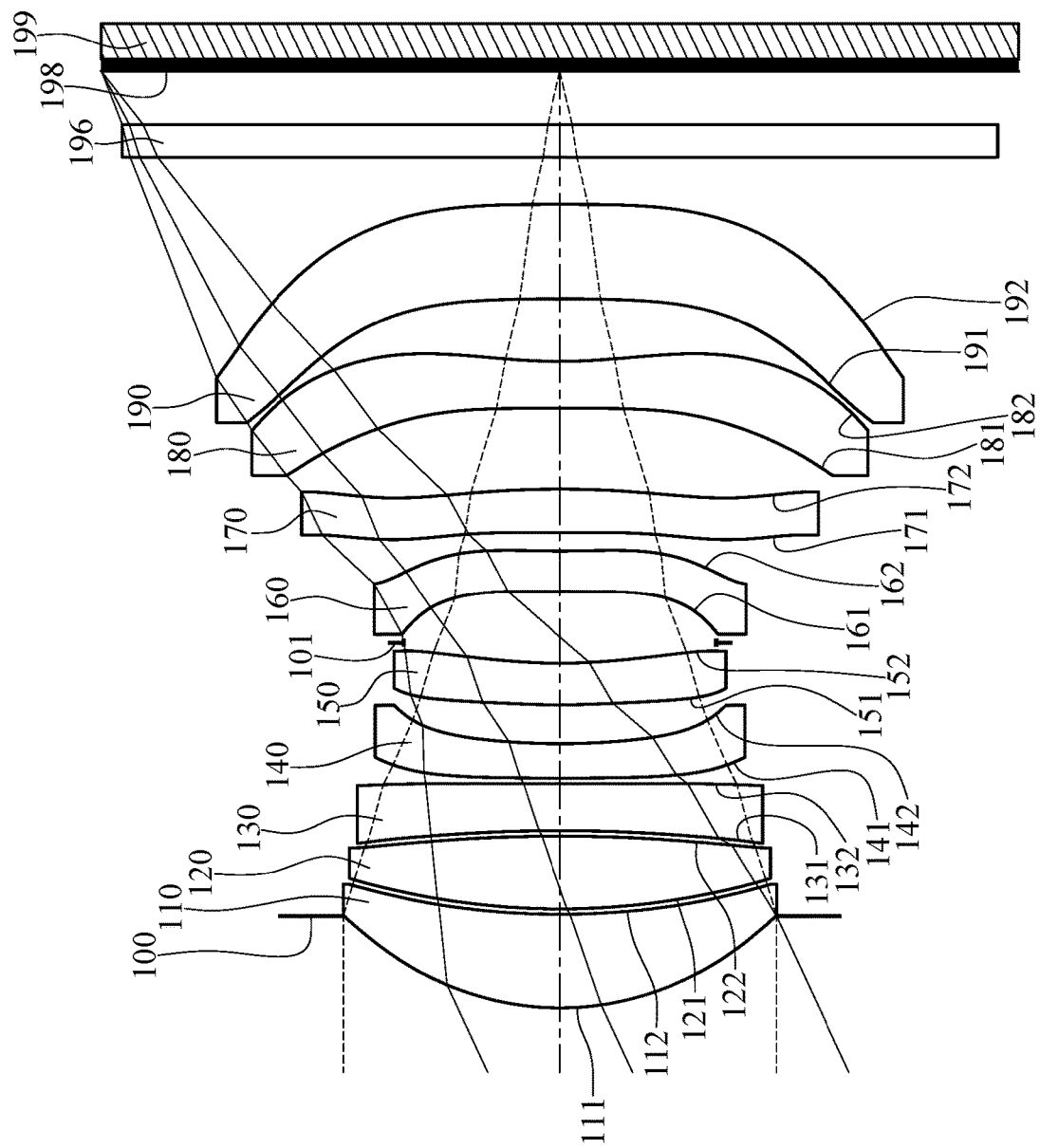
FIG. 1 is a schematic view of an image capturing unit according to the 1st embodiment of the present disclosure.

An optical lens system can include, in order from an object side to an image side, a front lens group, a middle lens group and a rear lens group, and the optical lens system includes nine or ten lens elements. Moreover, the rear lens group can include at least three lens elements. In the case of the optical lens system including nine lens elements, the nine lens elements are, in order from the object side to the image side, a first lens element, a second lens element, a third lens element, a fourth lens element, a fifth lens element, a sixth lens element, a seventh lens element, an eighth lens element and a ninth lens element. In the case of the optical lens system including ten lens elements, the ten lens elements are, in order from the object side to the image side, a first lens element, a second lens element, a third lens element, a fourth lens element, a fifth lens element, a sixth lens element, a seventh lens element, an eighth lens element, a ninth lens element and a tenth lens element. In one aspect of the present disclosure, the front lens group can have a total of three lens elements, and the rear lens group can have a total of three lens elements; namely, in the case of the optical lens system including nine lens elements, the front lens group can include, in order from the object side to the image side, the first lens element, the second lens element and the third lens element, and the rear lens group can include, in order from the object side to the image side, the seventh lens element, the eighth lens element and the ninth lens element; in the case of the optical lens system including ten lens elements, the front lens group can include, in order from the object side to the image side, the first lens element, the second lens element and the third lens element, and the rear lens group can include, in order from the object side to the image side, the eighth lens element, the ninth lens element and the tenth lens element.

Hereinafter, among all lens elements of the optical lens system, the lens element closest to an imaged object is defined as an object-side lens element, and the lens element closest to an image surface is defined as an image-side lens element. For example, in the case of the optical lens system including nine lens elements, the first lens element, closest to the imaged object, is the object-side lens element, and the ninth lens element, closest to the image surface, is the image-side lens element; in the case of the optical lens system including ten lens elements, the first lens element, closest to the imaged object, is the object-side lens element, and the tenth lens element, closest to the image surface, is the image-side lens element.

The first lens element can have an object-side surface being concave in a paraxial region thereof, and the object-side surface of the first lens element can have at least one convex critical point in an off-axis region thereof. Therefore, it is favorable for reducing the effective radius of the first lens element in a wide field of view configuration so as to effectively miniaturize the optical lens system, thereby becoming applicable to electronic devices with limited accommodation space. Please refer to FIG. 27, which shows a schematic view of a convex critical point C of the object-side surface 711 of the first lens element 710 according to the 7th embodiment of the present disclosure.

Figure 27:
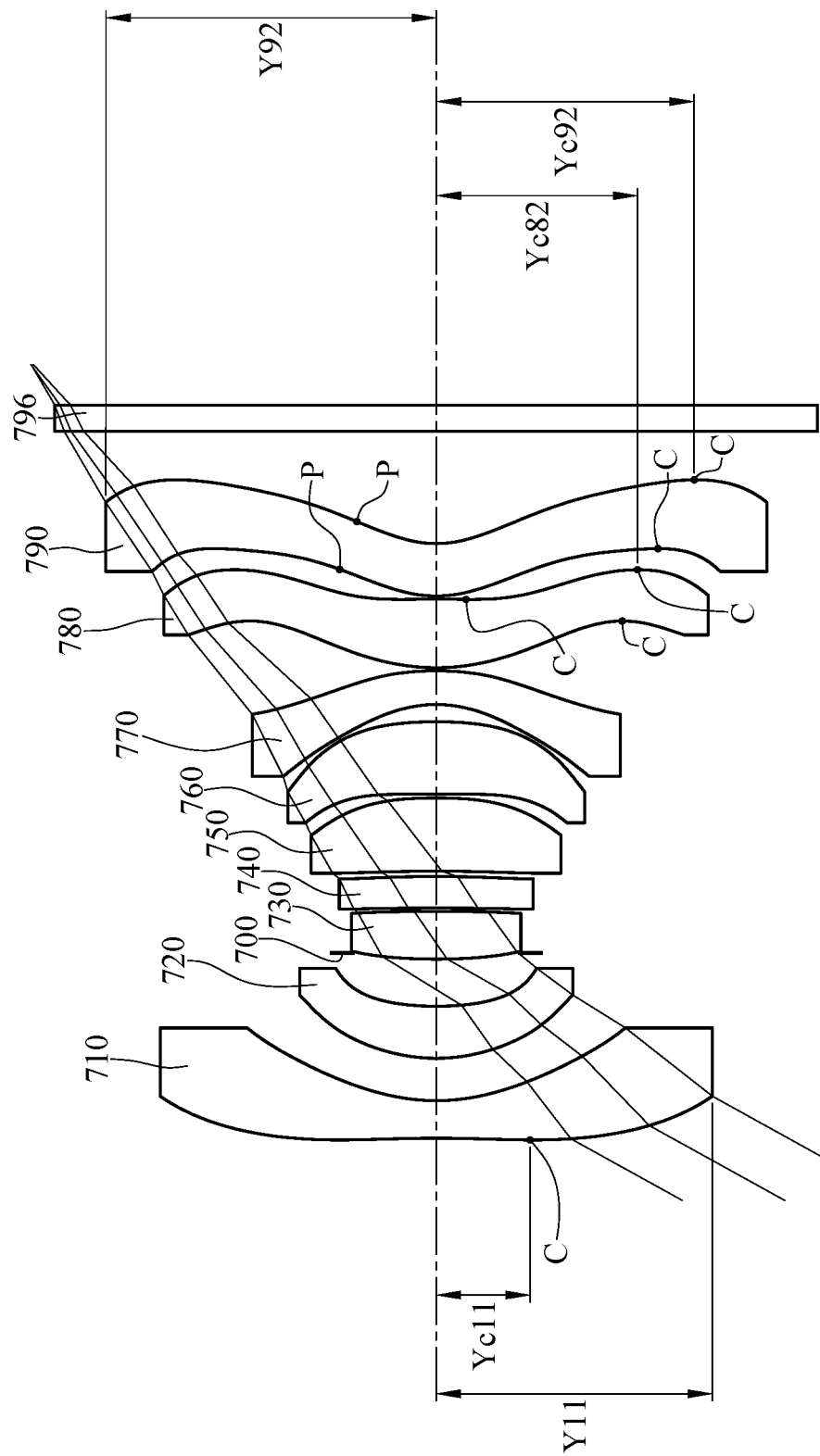
FIG. 27 shows a schematic view of Y11, Y92, Yc11, Yc82 and Yc92, as well as several inflection points and critical points according to the 7th embodiment of the present disclosure.
Figure 28:
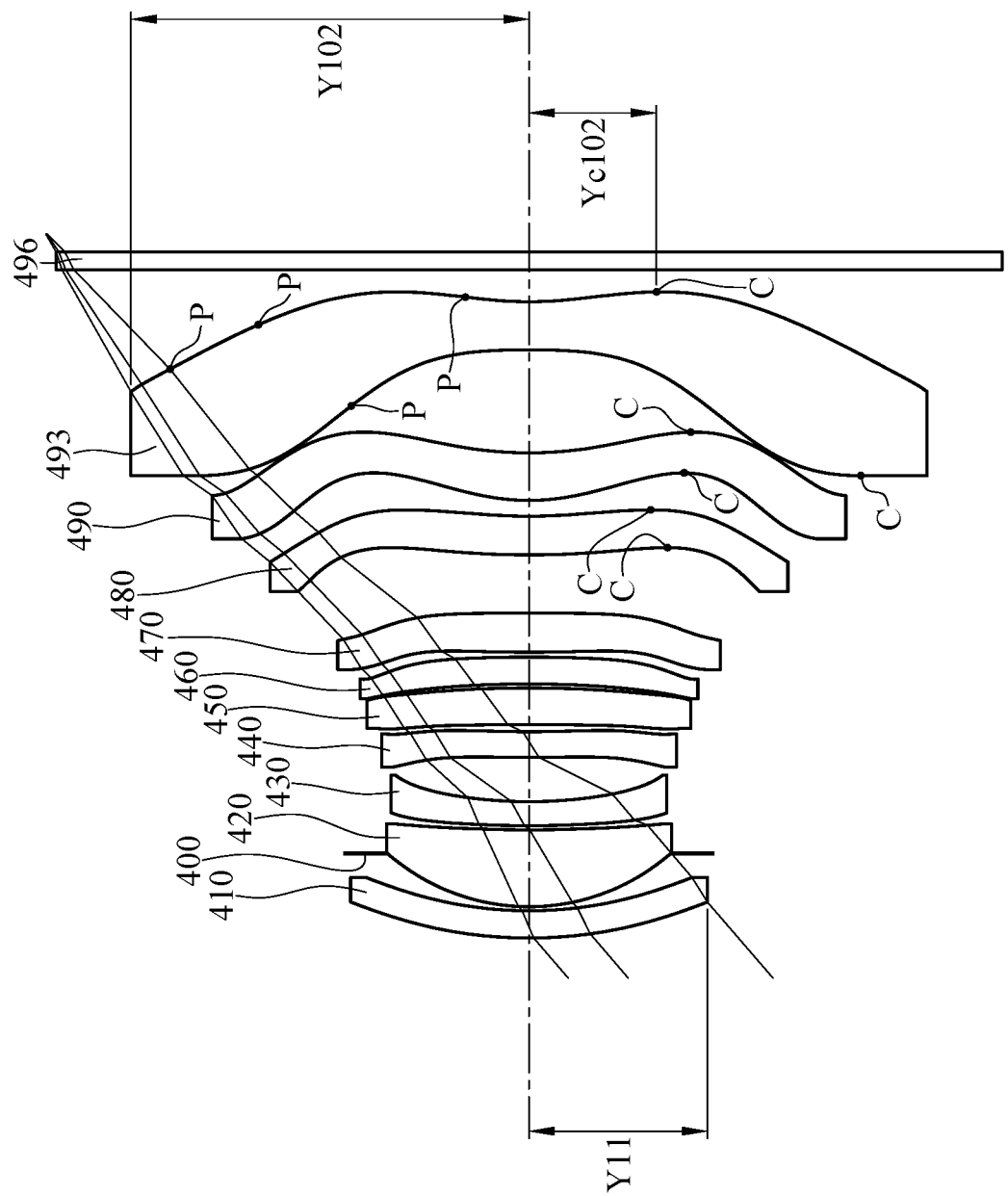
FIG. 28 shows a schematic view of Y11, Y102, Yc82, Yc92 and Yc102, as well as several inflection points and critical points according to the 4th embodiment of the present disclosure.

At least one lens surface of the rear lens group of the optical lens system has at least one critical point in an off-axis region thereof, and each lens element of the rear lens group has at least one lens surface being aspheric. For example, in the case of the optical lens system including nine lens elements and the rear lens group having a total of three lens elements, at least one lens surface of the seventh lens element, the eighth lens element and the ninth lens element has at least one critical point in an off-axis region thereof, and each of the seventh lens element, the eighth lens element and the ninth lens element has at least one lens surface being aspheric; in the case of the optical lens system including ten lens elements and the rear lens group having a total of three lens elements, at least one lens surface of the eighth lens element, the ninth lens element and the tenth lens element has at least one critical point in an off-axis region thereof, and each of the eighth lens element, the ninth lens element and the tenth lens element has at least one lens surface being aspheric. Therefore, it is favorable for providing better imaging capability with a suitable image sensor in aspects such as pixel size, resolution or chief ray angle. It is also favorable for providing sufficient design flexibility on the shape variation of the lens elements so as to meet requirements such as controlling the size of a lens. Moreover, at least one lens surface of the rear lens group of the optical lens system can have at least one critical point in an off-axis region thereof. Please refer to FIG. 27 and FIG. 28, FIG. 27 shows a schematic view of critical points C of the object-side surface 781 of the eighth lens element 780, the image-side surface 782 of the eighth lens element 780 and the image-side surface 792 of the ninth lens element 790 according to the 7th embodiment of the present disclosure, and FIG. 28 shows a schematic view of critical points C of the object-side surface 481 of the eighth lens element 480, the image-side surface 482 of the eighth lens element 480, the object-side 491 of the ninth lens element 490, the image-side surface 492 of the ninth lens element 490 and the image-side surface 495 of the tenth lens element 493 according to the 4th embodiment of the present disclosure. The aforementioned critical points according to the embodiments of the present disclosure in FIG. 27 and FIG. 28 are only exemplary. The other lens surfaces of the lens elements may also have one or more critical points.

In the optical lens system of the present disclosure, at least five lens elements can be made of plastic material. Therefore, it is favorable for increasing the shape variation of lens elements so as to reduce the size and weight of the optical lens system and correct aberrations, thus improving mass production and reducing manufacturing costs.

When an axial distance between the object-side surface of the first lens element and the image surface is TL, and a maximum image height of the optical lens system (half of a diagonal length of an effective photosensitive area of an image sensor) is ImgH, the following condition is satisfied: TL/ImgH<3.0. Therefore, it is favorable for balancing the miniaturization of the optical lens system and manufacturability of a lens module. Moreover, the following condition can also be satisfied: TL/ImgH<2.50. Moreover, the following condition can also be satisfied: TL/ImgH<1.60.

When the axial distance between the object-side surface of the first lens element and the image surface is TL, and an entrance pupil diameter of the optical lens system is EPD, the following condition is satisfied: TL/EPD<4.0. Therefore, it is favorable for featuring a large aperture of the optical lens system. Moreover, the following condition can also be satisfied: TL/EPD<3.0.

When a minimum value among Abbe numbers of all lens elements of the optical lens system is Vmin, the following condition can be satisfied: Vmin<28. Therefore, it is favorable for better correcting chromatic aberration. Moreover, the following condition can also be satisfied: Vmin<24. Moreover, the following condition can also be satisfied: Vmin<20.

When the total number of lens elements of the optical lens system is NL, the following condition can be satisfied: 9≤NL≤10. Therefore, it is favorable for providing better imaging capability with the suitable sensor in aspects such as pixel size, resolution or chief ray angle. It is also favorable for providing sufficient design flexibility on the lens elements so as to meet requirements such as controlling the size of a lens. Moreover, the following condition can also be satisfied: NL=10.

When a focal length of the optical lens system is f, and a composite focal length of the front lens group is fG1, the following condition can be satisfied: 0.25<fG1/f<8.0. Therefore, it is favorable for effectively ensuring sufficient positive refractive power on the object side of the optical lens system so as to further reduce the total track length of the optical lens system. Moreover, when the focal length of the optical lens system is f, and a composite focal length of the first lens element, the second lens element and the third lens element is f123, the following condition can be satisfied: 0.25<f123/f<8.0. Moreover, the following condition can also be satisfied: 0.30<f123/f<4.0. Moreover, the following condition can also be satisfied: 0.35<f123/f<4.0. It is noted that, in the case of the front lens group having a total of three lens elements, fG1 is f123.

When the axial distance between the object-side surface of the first lens element and the image surface is TL, and the focal length of the optical lens system is f, the following condition can be satisfied: TL/f<3.0. Therefore, it is favorable for effectively increasing flexibility in the size configuration of the optical lens system, thereby becoming more applicable regarding many requirements. Moreover, the following condition can also be satisfied: 0.70<TL/f<1.0. Moreover, the following condition can also be satisfied: 0.80<TL/f<2.0. Moreover, the following condition can also be satisfied: 1.45<TL/f<2.0. Moreover, the following condition can also be satisfied: 1.10<TL/f<1.35.

When the composite focal length of the first lens element, the second lens element and the third lens element is f123, and a composite focal length of the fourth lens element, the fifth lens element and the sixth lens element is f456, the following condition can be satisfied: −2.50<f123/f456. Therefore, it is favorable for balancing the refractive power of the middle lens group and the front lens group so as to allow better light convergence or correct aberrations. Moreover, the following condition can also be satisfied: −1.25<f123/f456. Moreover, the following condition can also be satisfied: −2.0<f123/f456<−1.0. Moreover, the following condition can also be satisfied: −0.50<f123/f456<1.25.

When an axial distance between the object-side surface of the first lens element and an image-side surface of the image-side lens element is Td, and a sum of central thicknesses of all lens elements of the optical lens system is ΣCT, the following condition can be satisfied: Td/ΣCT<2.0. Therefore, it is favorable for preventing axial distances between each of all adjacent lens elements from being overly large or small so as to improve space utilization efficiency of the lens elements. Moreover, the following condition can also be satisfied: Td/ΣCT<1.75. Moreover, the following condition can also be satisfied: 1.20<Td/ΣCT<1.70. Depending on the total number of lens elements in the optical lens system, Td can be an axial distance between the object-side surface of the first lens element and the image-side surface of the ninth or tenth lens element.

When a vertical distance between the critical point on the object-side surface of the first lens element and an optical axis is Yc11, and a maximum effective radius of the object-side surface of the first lens element is Y11, the following condition can be satisfied: Yc11/Y11<0.75. Therefore, it is favorable for reducing the effective radius of the first lens element in a wide field of view configuration so as to effectively miniaturize the optical lens system, thereby becoming applicable to electronic devices with limited accommodation space. Moreover, the following condition can also be satisfied: 0.05<Yc11/Y11<0.60. Please refer to FIG. 27, which shows a schematic view of Y11 and Yc11 according to the 7th embodiment of the present disclosure.

When a maximum field of view of the optical lens system is FOV, the following condition can be satisfied: 100 [deg.] <FOV<150 [deg.]. Therefore, it is favorable for featuring a wide field of view of the optical lens system.

According to the present disclosure, the optical lens system further includes an aperture stop, and the aperture stop can be disposed between the imaged object and the fourth lens element. Therefore, it is favorable for reducing the size of the optical lens system and adjusting the field of view so as to meet various requirements. Moreover, the aperture stop can also be disposed between the imaged object and the third lens element. Moreover, the aperture stop can also be disposed between the imaged object and the second lens element. Moreover, the aperture stop can also be disposed between the imaged object and the first lens element.

When an axial distance between the aperture stop and the image-side surface of the image-side lens element is Sd, and the axial distance between the object-side surface of the first lens element and the image-side surface of the image-side lens element is Td, the following condition can be satisfied: 0.60<Sd/Td<1.20. Therefore, it is favorable for positioning the aperture stop so as to better configure the aperture size, field of view and size distribution of the optical lens system. Moreover, the following condition can also be satisfied: 0.75<Sd/Td<1.0. Depending on the total number of lens elements in the optical lens system, Sd can be an axial distance between the aperture stop and the image-side surface of the ninth or tenth lens element, and Td can be the axial distance between the object-side surface of the first lens element and the image-side surface of the ninth or tenth lens element.

When an f-number of the optical lens system is Fno, the following condition can be satisfied: 1.0<Fno<2.20. Therefore, it is favorable for featuring a large aperture of the optical lens system. Moreover, the following condition can also be satisfied: 1.0<Fno<2.10. Moreover, the following condition can also be satisfied: 1.20<Fno<2.10.

When the total number of lens elements having an Abbe number smaller than 40 in the optical lens system is V40, the following condition can be satisfied: 4≤V40. Therefore, it is favorable for correcting chromatic aberration.

When the total number of lens elements having an Abbe number smaller than 30 in the optical lens system is V30, the following condition can be satisfied: 4≤V30. Therefore, it is favorable for further correcting chromatic aberration.

When the total number of lens elements having an Abbe number smaller than 20 in the optical lens system is V20, the following condition can be satisfied: 2≤V20. Therefore, it is favorable for further correcting chromatic aberration.

When an Abbe number of a lens element of the optical lens system is V, and a refractive index of the lens element of the optical lens system is N, at least one lens element of the optical lens system can satisfy the following condition: 6.0<V/N<12.0. Therefore, it is favorable for better correcting chromatic aberration. For example, when an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the tenth lens element is V10, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the tenth lens element is N10, and a refractive index of the i-th lens element is Ni, at least one lens element of the optical lens system can satisfy the following condition: 6.0<Vi/Ni<12.0, wherein, depending on the total number of lens elements in the optical lens system, i=1~9 or i=1~10. Moreover, at least one lens element of the optical lens system can also satisfy the following condition: 6.0<V/N<11.2. Moreover, at least one lens element of the optical lens system can also satisfy the following condition: 7.5<V/N<10. Moreover, at least one lens element of the optical lens system can also satisfy the following condition: 8.0<V/N<12.0.

When a curvature radius of the image-side surface of the ninth lens element is R18, and the maximum image height of the optical lens system is ImgH, the following condition can be satisfied: R18/ImgH<1.0. Therefore, it is favorable for reducing the back focal length so as to effectively utilize the limited space in the optical lens system. Moreover, the following condition can also be satisfied: R18/ImgH<0.60.

When a maximum value among maximum effective radii of all lens surfaces of the optical lens system is Ymax, and a minimum value among maximum effective radii of all lens surfaces of the optical lens system is Ymin, the following condition can be satisfied: 1.0<Ymax/Ymin<5.0. Therefore, it is favorable for effectively utilizing space by preventing one side of the barrel from being overly large so as to reduce the size of an image capturing unit. Moreover, the following condition can also be satisfied: 1.0<Ymax/Ymin<2.5.

When the axial distance between the object-side surface of the first lens element and the image surface is TL, and a maximum effective radius of the image-side surface of the ninth lens element is Y92, the following condition can be satisfied: TL/Y92<3.50. Therefore, it is favorable for properly balancing the miniaturization and manufacturability of the optical lens system. Moreover, the following condition can also be satisfied: TL/Y92<3.0. Please refer to FIG. 27, which shows a schematic view of Y92 according to the 7th embodiment of the present disclosure.

When a maximum effective radius of the image-side surface of the image-side lens element is Yi2, and an axial distance between the image-side surface of the image-side lens element and the image surface is BL, the following condition can be satisfied: 2.0<Yi2/BL<20, wherein, depending on the total number of lens elements in the optical lens system, i=9 or 10. Therefore, it is favorable for properly balancing the miniaturization and manufacturability of the optical lens system. For example, in the case of the optical lens system including nine lens elements, the maximum effective radius of the image-side surface of the ninth lens element is Y92, an axial distance between the image-side surface of the ninth lens element and the image surface is BL, and the following condition can be satisfied: 2.0<Y92/BL<20. Moreover, the following condition can also be satisfied: 2.50<Y92/BL<10; in the case of the optical lens system including ten lens elements, a maximum effective radius of the image-side surface of the tenth lens element is Y102, an axial distance between the image-side surface of the tenth lens element and the image surface is BL, and the following condition can be satisfied: 2.0<Y102/BL<20. Moreover, the following condition can also be satisfied: 4.0<Y102/BL<10. Please refer to FIG. 27 and FIG. 28, FIG. 27 shows a schematic view of Y92 according to the 7th embodiment of the present disclosure, and FIG. 28 shows a schematic view of Y102 according to the 4th embodiment of the present disclosure.

When a vertical distance between a critical point on the image-side surface of the eighth lens element and the optical axis is Yc82, and a vertical distance between a critical point on the image-side surface of the ninth lens element and the optical axis is Yc92, the following condition can be satisfied: 0.50<Yc92/Yc82<2.0. Therefore, it is favorable for providing better imaging capability with the proper sensor in aspects such as pixel size, resolution or chief ray angle. It is also favorable for providing sufficient design flexibility on the shape variation of the lens elements so as to meet requirements such as controlling the size of a lens. Moreover, the following condition can also be satisfied: 0.50<Yc92/Yc82<1.20. Moreover, when the vertical distance between the critical point on the image-side surface of the ninth lens element and the optical axis is Yc92, and a vertical distance between a critical point on the image-side surface of the tenth lens element and the optical axis is Yc102, the following condition can also be satisfied: 0.50<Yc102/Yc92<2.0. Moreover, the following condition can also be satisfied: 0.50<Yc102/Yc92<1.20. Please refer to FIG. 27 and FIG. 28, FIG. 27 shows a schematic view of Yc82 and Yc92 according to the 7th embodiment of the present disclosure, and FIG. 28 shows a schematic view of Yc82, Yc92 and Yc102 according to the 4th embodiment of the present disclosure.

When the focal length of the optical lens system is f, and a composite focal length of the middle lens group is fG2, the following condition can be satisfied: −0.75<f/fG2<2.0. Therefore, it is favorable for balancing the refractive power of the middle lens group and the front lens group so as to allow better light convergence or correct aberrations and to increase image quality. Moreover, the following condition can also be satisfied: −0.50<f/fG2<1.0. Moreover, the following condition can also be satisfied: −0.50<f/fG2<0.50.

When the focal length of the optical lens system is f, and a composite focal length of the rear lens group is fG3, the following condition can be satisfied: −2.50<f/fG3<0.60. Therefore, a proper configuration of rear lens group is favorable for correcting aberrations in the peripheral region and reducing the back focal length of the optical lens system. Moreover, the following condition can also be satisfied: −2.50<f/fG3<0. Moreover, the following condition can also be satisfied: −2.50<f/fG3<−1.0.

When the maximum effective radius of the object-side surface of the first lens element is Y11, and the maximum image height of the optical lens system is ImgH, the following condition can be satisfied: 0.2<Y11/ImgH<1.0. Therefore, it is favorable for adjusting the effective radius of the first lens element in a wide field of view configuration so as to effectively miniaturize the optical lens system, thereby becoming applicable to electronic devices with limited accommodation space.

When the focal length of the optical lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, a focal length of the ninth lens element is f9, and a focal length of the ten lens element is f10, the following conditions can be satisfied: −1.5<f/f1<4.0, −3.0<f/f2<2.0, −3.0<f/f3<3.0, −3.0<f/f4<3.0, −3.0<f/f5<3.0, −3.0<f/f6<3.0, −3.0<f/f7<3.0, −3.0<f/f8<3.0, −3.0<f/f9<3.0 and depending on the total number of lens elements in the optical lens system, −3.0<f/f10<3.0. Therefore, it is favorable for preventing excessive differences in refractive power of the lens elements and image overcorrections. It is also favorable for providing a proper shape variation for the lens elements so as to reduce the probability of image ghosting. Moreover, the following conditions can also be satisfied: −1.0<f/f1<2.50, −1.50<f/f2<1.0, −2.0<f/f3<2.0, −2.0<f/f4<2.0, −2.0<f/f5<2.0, −2.0<f/f6<2.0, −2.0<f/f7<2.0, −2.0<f/f8<2.0 and −2.0<f/f9<2.0. Moreover, when the focal length of the optical lens system is f, and a focal length of the i-th lens element is fi, at least two lens elements of the optical lens system can satisfy the following condition: |f/fi|<0.20, wherein, depending on the total number of lens elements in the optical lens system, i=1~9 or i=1~10. Moreover, at least three lens elements of the optical lens system can also satisfy the following condition: |f/fi|<0.20.

When the total number of inflection points of all lens elements of the optical lens system is NIF, the following condition can be satisfied: 20≤NIF. Therefore, it is favorable for providing better imaging capability with the proper sensor in aspects such as pixel size, resolution or chief ray angle. It is also favorable for providing sufficient design flexibility on the shape variation of the lens elements so as to meet requirements such as controlling the size of a lens. Moreover, the following condition can also be satisfied: 25≤NIF. Please refer to FIG. 27 and FIG. 28, FIG. 27 shows a schematic view of inflection points P of the object-side surface 791 of the ninth lens element 790 and the image-side surface 792 of the ninth lens element 790 according to the 7th embodiment of the present disclosure, and FIG. 28 shows a schematic view of inflection points P of the object-side surface 494 of the tenth lens element 493 and the image-side surface 495 of the tenth lens element 493 according to the 4th embodiment of the present disclosure. The aforementioned inflection points according to the embodiments of the present disclosure in FIG. 27 and FIG. 28 are only exemplary. The other lens surfaces of the lens elements may also have one or more inflection points.

Figure 29:
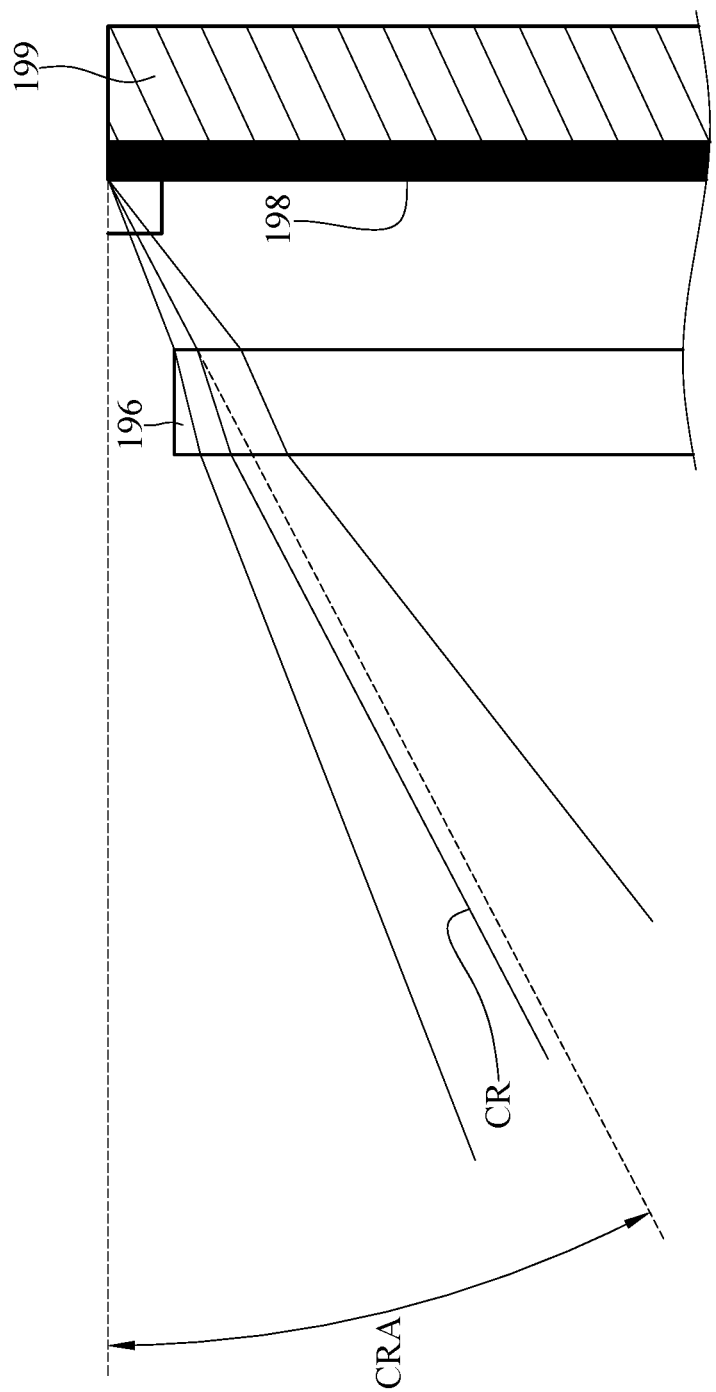
FIG. 29 shows a schematic view of CRA according to the 1st embodiment of the present disclosure.

When the axial distance between the object-side surface of the first lens element and the image surface is TL, the maximum image height of the optical lens system is ImgH, and a chief ray angle at a maximum image height position of the optical lens system is CRA, the following condition can be satisfied: TL/[ImgH×tan(CRA)]<3.0. Therefore, it is favorable for properly balancing the miniaturization and manufacturability of the optical lens system. Moreover, the following condition can also be satisfied: TL/[ImgH×tan(CRA)]<2.50. Please refer to FIG. 29, which shows a schematic view of CRA according to the 1st embodiment of the present disclosure, wherein a chief ray CR is projected on the image surface 198 at the maximum image height position, and the angle between a normal line of the image surface 198 and the chief ray CR is CRA.

When the focal length of the optical lens system is f, a curvature radius of the object-side surface of the ninth lens element is R17, and the curvature radius of the image-side surface of the ninth lens element is R18, the following condition can be satisfied: 1.0<|f/R17|+|f/R18|. Therefore, it is favorable for reducing the back focal length so as to effectively utilize the limited space in the optical lens system. Moreover, the following condition can also be satisfied: 2.0<|f/R17|+|f/R18|. Moreover, the following condition can also be satisfied: 3.0<|f/R17|+|f/R18|.

According to the present disclosure, the aforementioned features and conditions can be utilized in numerous combinations so as to achieve corresponding effects.

According to the present disclosure, the lens elements of the optical lens system can be made of either glass or plastic material. When the lens elements are made of glass material, the refractive power distribution of the optical lens system may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the optical lens system can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical lens system, based on the corresponding image sensor, can be flat or curved, especially a curved surface being concave facing towards the object side of the optical lens system.

According to the present disclosure, an image correction unit, such as a field flattener, can be optionally disposed between the lens element closest to the image side of the optical lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical lens system and the image surface to produce a telecentric effect, and thereby improves the image-sensing efficiency of an image sensor (for example, CCD or CMOS).

A middle stop disposed between the first lens element and the image surface is favorable for enlarging the viewing angle of the optical lens system and thereby provides a wider field of view for the same.

According to the present disclosure, the optical lens system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
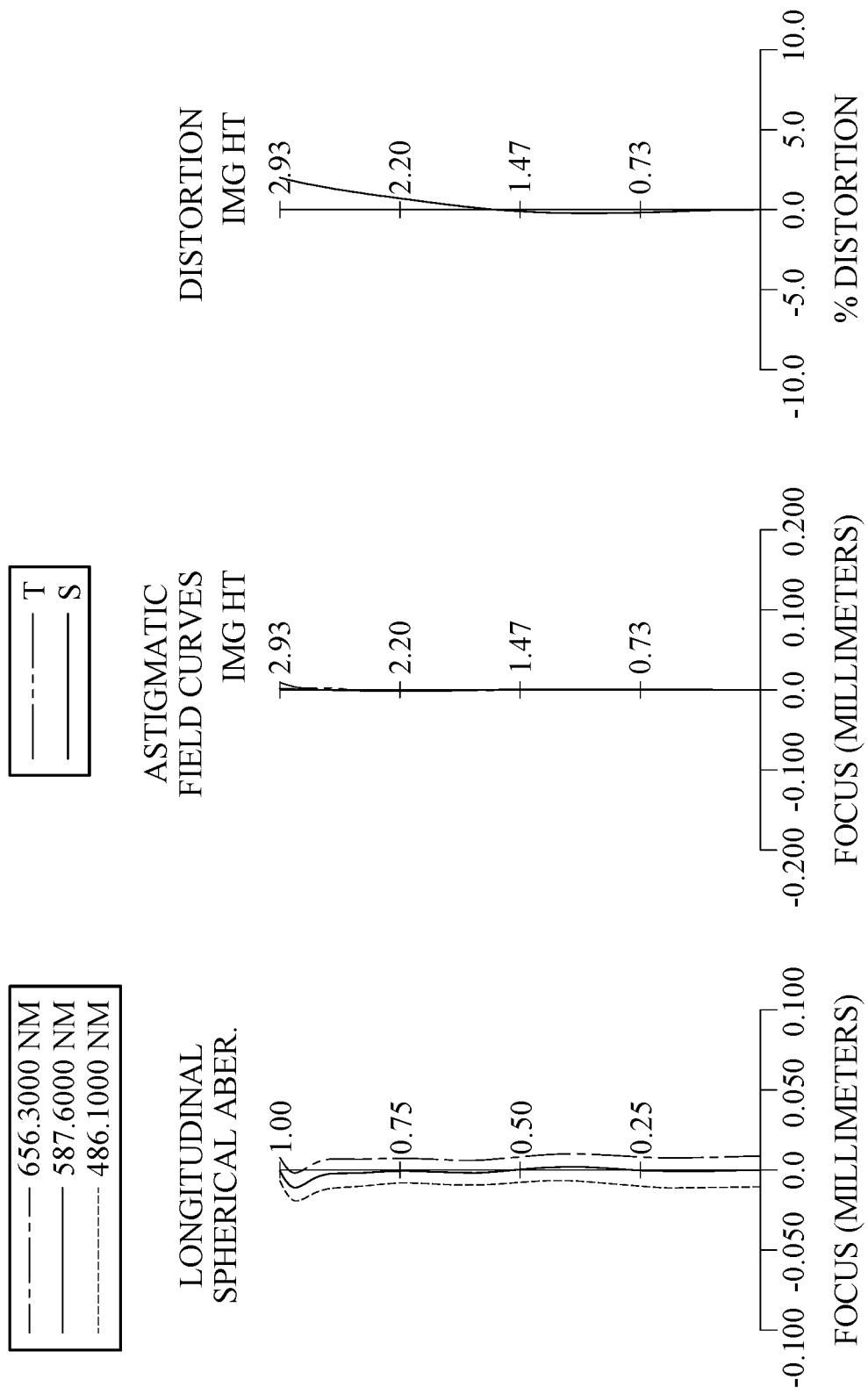
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical lens system (its reference numeral is omitted) of the present disclosure and an image sensor 199. The optical lens system includes, in order from an object side to an image side, an aperture stop 100, a first lens element 110, a second lens element 120, a third lens element 130, a fourth lens element 140, a fifth lens element 150, a stop 101, a sixth lens element 160, a seventh lens element 170, an eighth lens element 180, a ninth lens element 190, an IR-cut filter 196 and an image surface 198. In addition, the optical lens system has a configuration of a front lens group (the first lens element 110, the second lens element 120 and the third lens element 130), a middle lens group (the fourth lens element 140, the fifth lens element 150 and the sixth lens element 160) and a rear lens group (the seventh lens element 170, the eighth lens element 180 and the ninth lens element 190). The optical lens system includes nine lens elements (110~190) with no additional lens element disposed between each of the adjacent nine lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The image-side surface 122 of the second lens element 120 has one inflection point.

The third lens element 130 with negative refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has three inflection points.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has one inflection point.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has one inflection point. The image-side surface 162 of the sixth lens element 160 has two inflection points.

The seventh lens element 170 with positive refractive power has an object-side surface 171 being convex in a paraxial region thereof and an image-side surface 172 being convex in a paraxial region thereof. The seventh lens element 170 is made of plastic material and has the object-side surface 171 and the image-side surface 172 being both aspheric. The object-side surface 171 of the seventh lens element 170 has three inflection points. The image-side surface 172 of the seventh lens element 170 has two inflection points. The object-side surface 171 of the seventh lens element 170 has at least one critical point in an off-axis region thereof. The image-side surface 172 of the seventh lens element 170 has at least one critical point in an off-axis region thereof.

The eighth lens element 180 with negative refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has two inflection points. The image-side surface 182 of the eighth lens element 180 has one inflection point. The image-side surface 182 of the eighth lens element 180 has at least one critical point in an off-axis region thereof.

The ninth lens element 190 with negative refractive power has an object-side surface 191 being concave in a paraxial region thereof and an image-side surface 192 being convex in a paraxial region thereof. The ninth lens element 190 is made of plastic material and has the object-side surface 191 and the image-side surface 192 being both aspheric. The object-side surface 191 of the ninth lens element 190 has one inflection point. The image-side surface 192 of the ninth lens element 190 has one inflection point.

The IR-cut filter 196 is made of glass material and located between the ninth lens element 190 and the image surface 198, and will not affect the focal length of the optical lens system. The image sensor 199 is disposed on or near the image surface 198 of the optical lens system.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical lens system of the image capturing unit according to the 1st embodiment, when a focal length of the optical lens system is f, an f-number of the optical lens system is Fno, and half of a maximum field of view of the optical lens system is HFOV, these parameters have the following values: f=6.17 millimeters (mm), Fno=2.23, HFOV=25.0 degrees (deg.).

When the maximum field of view of the optical lens system is FOV, the following condition is satisfied: FOV=50.0 [deg.].

When an Abbe number of the first lens element 110 is V1, and a refractive index of the first lens element 110 is N1, the following condition is satisfied: V1/N1=36.26.

When an Abbe number of the second lens element 120 is V2, and a refractive index of the second lens element 120 is N2, the following condition is satisfied: V2/N2=36.26.

When an Abbe number of the third lens element 130 is V3, and a refractive index of the third lens element 130 is N3, the following condition is satisfied: V3/N3=16.09.

When an Abbe number of the fourth lens element 140 is V4, and a refractive index of the fourth lens element 140 is N4, the following condition is satisfied: V4/N4=14.31.

When an Abbe number of the fifth lens element 150 is V5, and a refractive index of the fifth lens element 150 is N5, the following condition is satisfied: V5/N5=23.91.

When an Abbe number of the sixth lens element 160 is V6, and a refractive index of the sixth lens element 160 is N6, the following condition is satisfied: V6/N6=11.65.

When an Abbe number of the seventh lens element 170 is V7, and a refractive index of the seventh lens element 170 is N7, the following condition is satisfied: V7/N7=14.31.

When an Abbe number of the eighth lens element 180 is V8, and a refractive index of the eighth lens element 180 is N8, the following condition is satisfied: V8/N8=36.26.

When an Abbe number of the ninth lens element 190 is V9, and a refractive index of the ninth lens element 190 is N9, the following condition is satisfied: V9/N9=11.65.

When a minimum value among Abbe numbers of all lens elements of the optical lens system is Vmin, the following condition is satisfied: Vmin=19.4. In this embodiment, among the nine lens elements (110~190), the Abbe number of the sixth lens element 160 is equal to the Abbe number of the ninth lens element 190, and both are smaller than the Abbe numbers of the other lens elements. Thus, Vmin is equal to the Abbe number of the sixth lens element 160 and the Abbe number of the ninth lens element 190.

When the total number of lens elements having the Abbe number smaller than 40 in the optical lens system is V40, the following condition is satisfied: V40=6.

When the total number of lens elements having the Abbe number smaller than 30 in the optical lens system is V30, the following condition is satisfied: V30=5.

When the total number of lens elements having the Abbe number smaller than 20 in the optical lens system is V20, the following condition is satisfied: V20=2.

When an axial distance between the aperture stop 100 and the image-side surface 192 of the ninth lens element 190 is Sd, and an axial distance between the object-side surface 111 of the first lens element 110 and the image-side surface 192 of the ninth lens element 190 is Td, the following condition is satisfied: Sd/Td=0.89.

When the axial distance between the object-side surface 111 of the first lens element 110 and the image-side surface 192 of the ninth lens element 190 is Td, and a sum of central thicknesses of all lens elements of the optical lens system is ΣCT, the following condition is satisfied: Td/ΣCT=1.56. In this embodiment, an axial distance between two adjacent lens elements is an air gap in a paraxial region between the two adjacent lens elements; ΣCT is the sum of the central thicknesses of the first lens element 110, the second lens element 120, the third lens element 130, the fourth lens element 140, the fifth lens element 150, the sixth lens element 160, the seventh lens element 170, the eighth lens element 180 and the ninth lens element 190.

When an axial distance between the object-side surface 111 of the first lens element 110 and the image surface 198 is TL, and a maximum image height of the optical lens system is ImgH, the following condition is satisfied: TL/ImgH=2.05.

When the axial distance between the object-side surface 111 of the first lens element 110 and the image surface 198 is TL, and an entrance pupil diameter of the optical lens system is EPD, the following condition is satisfied: TL/EPD=2.17.

When the axial distance between the object-side surface 111 of the first lens element 110 and the image surface 198 is TL, and the focal length of the optical lens system is f, the following condition is satisfied: TL/f=0.97.

When the axial distance between the object-side surface 111 of the first lens element 110 and the image surface 198 is TL, the maximum image height of the optical lens system is ImgH, and a chief ray angle at a maximum image height position of the optical lens system is CRA, the following condition is satisfied: TL/[ImgH×tan(CRA)]=3.90.

When a maximum effective radius of the object-side surface 111 of the first lens element 110 is Y11, and the maximum image height of the optical lens system is ImgH, the following condition is satisfied: Y11/ImgH=0.47.

When a maximum value among maximum effective radii of all lens surfaces of the optical lens system is Ymax, and a minimum value among maximum effective radii of all lens surfaces of the optical lens system is Ymin, the following condition is satisfied: Ymax/Ymin=2.18.

When the focal length of the optical lens system is f, and a composite focal length of the first lens element 110, the second lens element 120 and the third lens element 130 is f123, the following condition is satisfied: f123/f=0.54.

When the composite focal length of the first lens element 110, the second lens element 120 and the third lens element 130 is f123, and a composite focal length of the fourth lens element 140, the fifth lens element 150 and the sixth lens element 160 is f456, the following condition is satisfied: f123/f456=−0.93.

When a curvature radius of the image-side surface 192 of the ninth lens element 190 is R18, and the maximum image height of the optical lens system is ImgH, the following condition is satisfied: R18/ImgH=−11.64.

When the axial distance between the object-side surface 111 of the first lens element 110 and the image surface 198 is TL, and a maximum effective radius of the image-side surface 192 of the ninth lens element 190 is Y92, the following condition is satisfied: TL/Y92=2.73.

When the maximum effective radius of the image-side surface 192 of the ninth lens element 190 is Y92, and an axial distance between the image-side surface 192 of the ninth lens element 190 and the image surface 198 is BL, the following condition is satisfied: Y92/BL=2.58.

When the focal length of the optical lens system is f, and a composite focal length of the front lens group is fG1, the following condition is satisfied: fG1/f=0.54. In this embodiment, the composite focal length of the front lens group, namely fG1, is the composite focal length of the first lens element 110, the second lens element 120 and the third lens element 130, namely f123.

When the focal length of the optical lens system is f, and a composite focal length of the middle lens group is fG2, the following condition is satisfied: f/fG2=−0.16. In this embodiment, the composite focal length of the middle lens group, namely fG2, is the composite focal length of the fourth lens element 140, the fifth lens element 150 and the sixth lens element 160, namely f456.

When the focal length of the optical lens system is f, and a composite focal length of the rear lens group is fG3, the following condition is satisfied: f/fG3=−1.72. In this embodiment, the composite focal length of the rear lens group, namely fG3, is a composite focal length of the seventh lens element 170, the eighth lens element 180 and the ninth lens element 190, namely f789.

When the focal length of the optical lens system is f, and a focal length of the first lens element 110 is f1, the following condition is satisfied: f/f1=1.24. Moreover, the following condition can also be satisfied: |f/f1|=1.24.

When the focal length of the optical lens system is f, and a focal length of the second lens element 120 is f2, the following condition is satisfied: f/f2=1.03. Moreover, the following condition can also be satisfied: |f/f2|=1.03.

When the focal length of the optical lens system is f, and a focal length of the third lens element 130 is f3, the following condition is satisfied: f/f3=−0.35. Moreover, the following condition can also be satisfied: |f/f3|=0.35.

When the focal length of the optical lens system is f, and a focal length of the fourth lens element 140 is f4, the following condition is satisfied: f/f4=−0.71. Moreover, the following condition can also be satisfied: |f/f4|=0.71.

When the focal length of the optical lens system is f, and a focal length of the fifth lens element 150 is f5, the following condition is satisfied: f/f5=−0.39. Moreover, the following condition can also be satisfied: |f/f5|=0.39.

When the focal length of the optical lens system is f, and a focal length of the sixth lens element 160 is f6, the following condition is satisfied: f/f6=−0.52. Moreover, the following condition can also be satisfied: |f/f6|=0.52.

When the focal length of the optical lens system is f, and a focal length of the seventh lens element 170 is f7, the following condition is satisfied: f/f7=0.79. Moreover, the following condition can also be satisfied: |f/f7|=0.79.

When the focal length of the optical lens system is f, and a focal length of the eighth lens element 180 is f8, the following condition is satisfied: f/f8=−1.05. Moreover, the following condition can also be satisfied: |f/f8|=1.05.

When the focal length of the optical lens system is f, and a focal length of the ninth lens element 190 is f9, the following condition is satisfied: f/f9=−0.01. Moreover, the following condition can also be satisfied: |f/f9|=0.01.

When the focal length of the optical lens system is f, a curvature radius of the object-side surface 191 of the ninth lens element 190 is R17, and the curvature radius of the image-side surface 192 of the ninth lens element 190 is R18, the following condition is satisfied: |f/R17|+|f/R18|=0.37.

When the total number of inflection points of all lens elements of the optical lens system is NIF, the following condition is satisfied: NIF=19.

The detailed optical data of the 1st embodiment are shown in Table 1 and the aspheric surface data are shown in Table 2 below.

TABLE 1

1st Embodiment
f = 6.17 mm, Fno = 2.23, HFOV = 25.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.588 | | | | |
| 2 | Lens 1 | 1.825 | (ASP) | 0.600 | Plastic | 1.544 | 56.0 | 4.99 |
| 3 | | 4.920 | (ASP) | 0.035 | | | | |
| 4 | Lens 2 | 4.650 | (ASP) | 0.469 | Plastic | 1.544 | 56.0 | 6.00 |
| 5 | | −10.540 | (ASP) | 0.035 | | | | |
| 6 | Lens 3 | −9.781 | (ASP) | 0.300 | Plastic | 1.614 | 26.0 | −17.50 |
| 7 | | −110.999 | (ASP) | 0.035 | | | | |
| 8 | Lens 4 | 26.779 | (ASP) | 0.220 | Plastic | 1.633 | 23.4 | −8.67 |
| 9 | | 4.537 | (ASP) | 0.249 | | | | |
| 10 | Lens 5 | 5.649 | (ASP) | 0.265 | Plastic | 1.566 | 37.4 | −15.83 |
| 11 | | 3.406 | (ASP) | 0.132 | | | | |
| 12 | Stop | Plano | | 0.330 | | | | |
| 13 | Lens 6 | 34.240 | (ASP) | 0.260 | Plastic | 1.669 | 19.4 | −11.98 |
| 14 | | 6.473 | (ASP) | 0.117 | | | | |
| 15 | Lens 7 | 30.108 | (ASP) | 0.280 | Plastic | 1.633 | 23.4 | 7.82 |
| 16 | | −5.896 | (ASP) | 0.516 | | | | |
| 17 | Lens 8 | 11443.228 | (ASP) | 0.300 | Plastic | 1.544 | 56.0 | −5.89 |
| 18 | | 3.204 | (ASP) | 0.403 | | | | |
| 19 | Lens 9 | −32.425 | (ASP) | 0.605 | Plastic | 1.669 | 19.4 | −1106.63 |
| 20 | | −34.163 | (ASP) | 0.300 | | | | |

TABLE 1-continued

1st Embodiment
f = 6.17 mm, Fno = 2.23, HFOV = 25.0 deg.

| Surface # | | Curvature Radius | Thickness | Material | Index | Abbe # | Focal Length |
|---|---|---|---|---|---|---|---|
| 21 | IR-cut Filter | Plano | 0.210 | Glass | 1.517 | 64.2 | — |
| 22 | | Plano | 0.341 | | | | |
| 23 | Image | Plano | 0.000 | | | | |

Note:
Reference wavelength is 587.6 nm (d-line).
An effective radius of the stop 101 (Surface 12) is 1.000 mm.

TABLE 2

Aspheric Coefficients

| Surface # | 2 | 3 | 4 | 5 | 6 |
|---|---|---|---|---|---|
| k = | −1.6793E−01 | 0.0000E+00 | 0.0000E+00 | 0.0000E+00 | 0.0000E+00 |
| A4 = | −1.3041E−03 | 4.0322E−03 | 6.1661E−03 | −3.4810E−03 | −6.8672E−03 |
| A6 = | −1.0934E−03 | −3.0686E−02 | −4.6970E−02 | −4.3724E−02 | 3.0033E−03 |
| A8 = | 1.5592E−03 | 8.4270E−02 | 1.1338E−01 | 1.6017E−01 | 8.3513E−02 |
| A10 = | −1.9917E−03 | −1.0310E−01 | −1.4059E−01 | −2.4696E−01 | −1.8767E−01 |
| A12 = | 1.0940E−03 | 6.8342E−02 | 9.5747E−02 | 2.0272E−01 | 1.7689E−01 |
| A14 = | −3.1815E−04 | −2.4640E−02 | −3.4746E−02 | −8.5562E−02 | −8.0436E−02 |
| A16 = | — | 3.7822E−03 | 5.3305E−03 | 1.4560E−02 | 1.4446E−02 |

| Surface # | 7 | 8 | 9 | 10 | 11 |
|---|---|---|---|---|---|
| k = | 9.0000E+01 | 9.0000E+01 | −8.0832E+01 | −4.6264E+00 | 2.6355E+00 |
| A4 = | −2.6456E−02 | −1.6636E−02 | 9.0066E−02 | −1.1511E−01 | −1.2541E−01 |
| A6 = | 1.6704E−01 | 1.7327E−01 | −8.7433E−02 | 1.6017E−01 | 1.4180E−01 |
| A8 = | −3.3425E−01 | −3.0664E−01 | 2.1656E−01 | −1.6660E−01 | −1.6573E−01 |
| A10 = | 3.1555E−01 | 3.4115E−01 | −1.9265E−01 | 2.0921E−01 | 1.1980E−01 |
| A12 = | −1.4899E−01 | −1.8510E−01 | 1.4104E−01 | −1.3241E−01 | −5.3045E−02 |
| A14 = | 2.8373E−02 | 3.7946E−02 | −4.5541E−02 | 3.7179E−02 | 9.8558E−04 |

| Surface # | 13 | 14 | 15 | 16 | 17 |
|---|---|---|---|---|---|
| k = | −9.0000E+01 | 2.1728E+01 | −9.0000E+01 | −8.6774E+00 | 9.0000E+01 |
| A4 = | −2.7200E−01 | −3.9601E−01 | −1.6301E−01 | 2.2421E−02 | −1.0861E−01 |
| A6 = | 2.3641E−01 | 3.6315E−01 | 5.5860E−02 | −5.0471E−02 | 5.4741E−02 |
| A8 = | −5.2267E−01 | −4.5543E−01 | 1.6811E−01 | 1.1346E−01 | −5.3788E−02 |
| A10 = | 6.2974E−01 | 4.9388E−01 | −1.8889E−01 | −8.7887E−02 | 4.4537E−02 |
| A12 = | −6.3791E−01 | −4.1117E−01 | 8.6161E−02 | 3.2900E−02 | −1.9231E−02 |
| A14 = | 3.6579E−01 | 2.2228E−01 | −1.9034E−02 | −6.1886E−03 | 3.9517E−03 |
| A16 = | −7.5884E−02 | −4.9505E−02 | 1.6730E−03 | 4.6835E−04 | −3.0633E−04 |

| Surface # | 18 | 19 | 20 |
|---|---|---|---|
| k = | −2.8333E+01 | 8.3542E+01 | −2.3015E+01 |
| A4 = | −7.0600E−02 | −1.0569E−01 | −9.6782E−02 |
| A6 = | 1.5218E−02 | 6.3432E−02 | 4.4691E−02 |
| A8 = | −1.1209E−02 | −5.0764E−02 | −2.5110E−02 |
| A10 = | 6.5934E−03 | 2.4963E−02 | 9.5726E−03 |
| A12 = | −1.7756E−03 | −7.1068E−03 | −2.1794E−03 |
| A14 = | 1.7921E−04 | 1.1148E−03 | 2.5905E−04 |
| A16 = | −2.2417E−06 | −7.3451E−05 | −1.1934E−05 |

In Table 1, the curvature radius, the thickness and the focal length are shown in millimeters (mm). Surface numbers 0-23 represent the surfaces sequentially arranged from the object side to the image side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
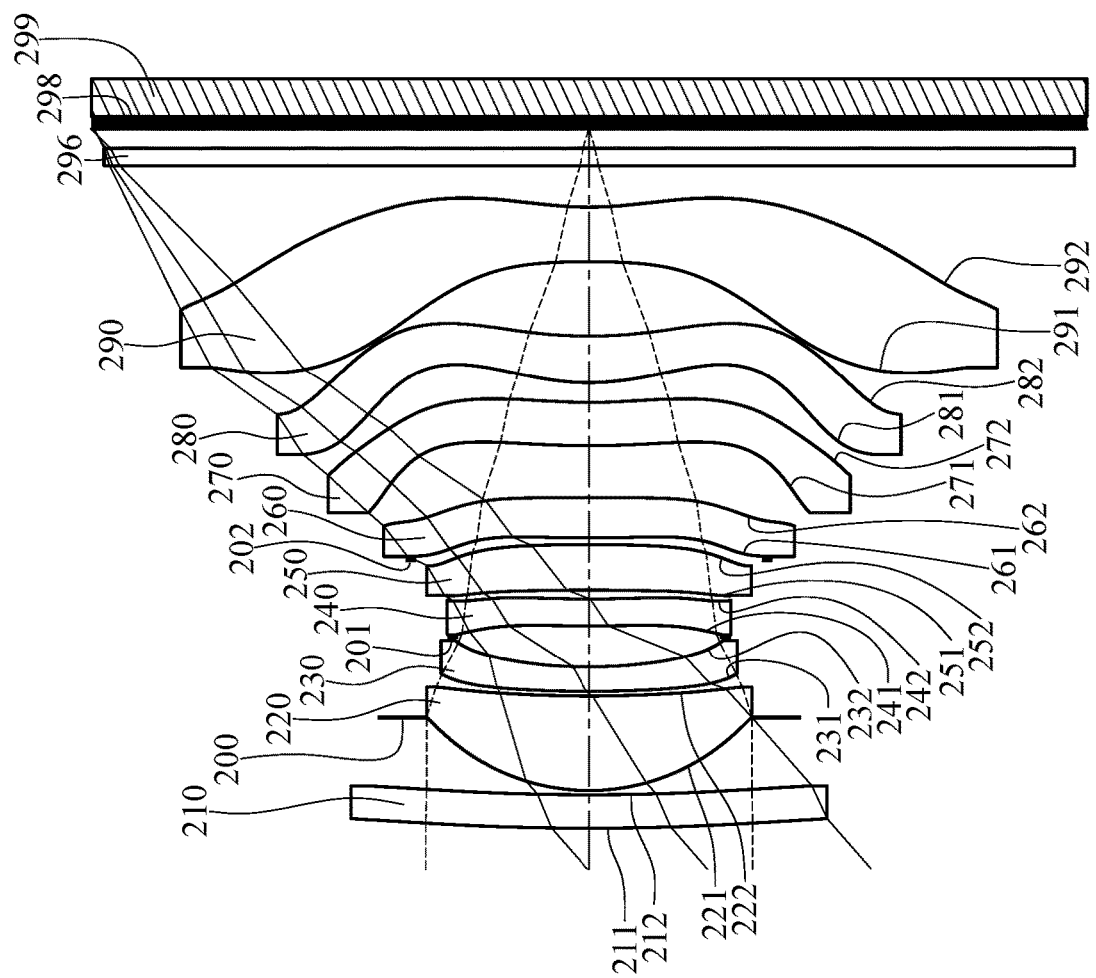
FIG. 3 is a schematic view of an image capturing unit according to the 2nd embodiment of the present disclosure.
Figure 4:
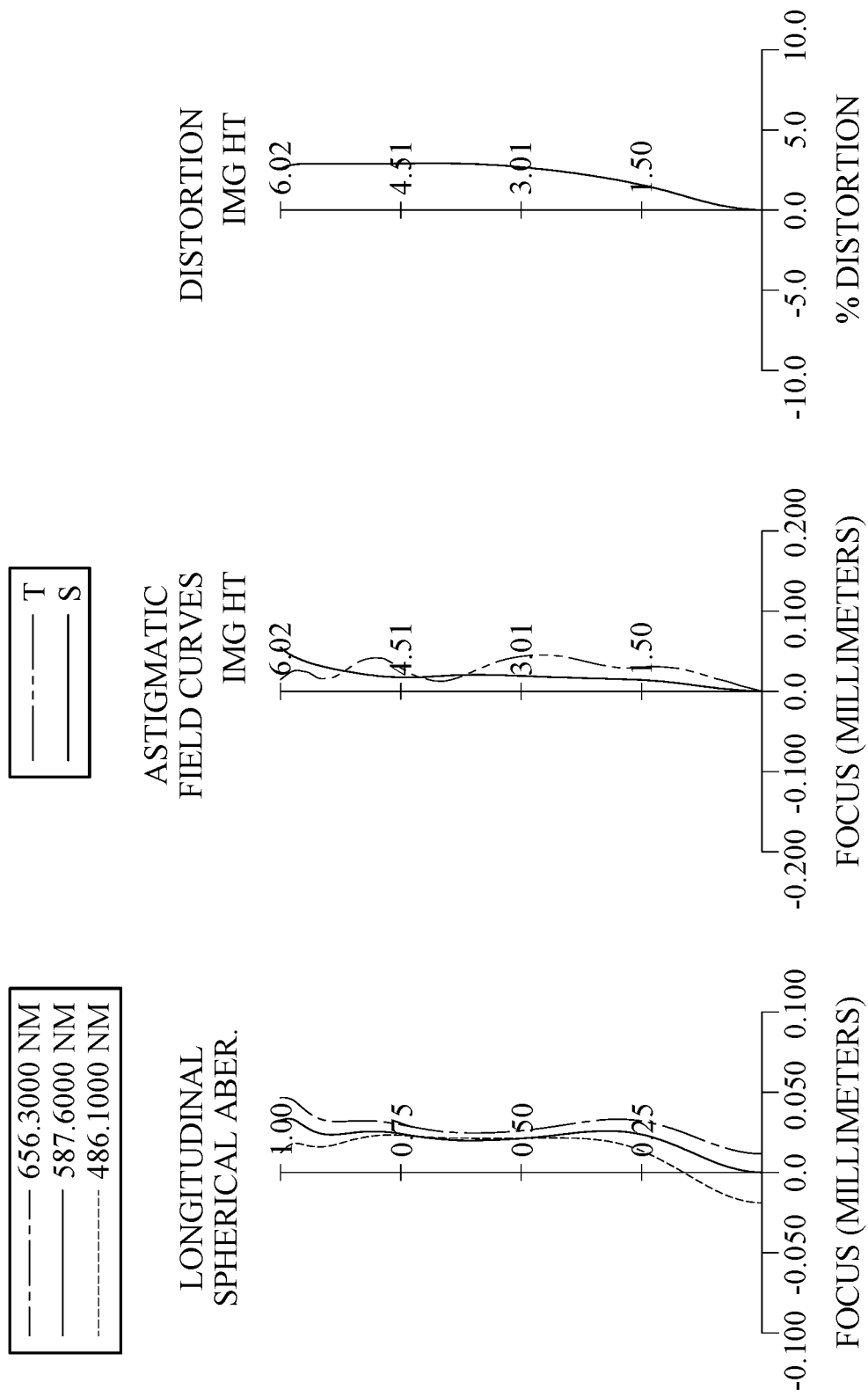
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical lens system (its reference numeral is omitted) of the present disclosure and an image sensor 299. The optical lens system includes, in order from an object side to an image side, a first lens element 210, an aperture stop 200, a second lens element 220, a third lens element 230, a stop 201, a fourth lens element 240, a fifth lens element 250, a stop 202, a sixth lens element 260, a seventh lens element 270, an eighth lens element 280, a ninth lens element 290, an IR-cut filter 296 and an image surface 298. In addition, the optical lens system has a configuration of a front lens group (the first lens element 210, the second lens element 220 and the third lens element 230), a middle lens group (the fourth lens element 240, the fifth lens element 250 and the sixth lens element 260) and a rear lens group (the seventh lens element 270, the eighth lens element 280 and the ninth lens element 290). The optical lens system includes nine lens elements (210~290) with no additional lens element disposed between each of the adjacent nine lens elements.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has two inflection points. The image-side surface 212 of the first lens element 210 has two inflection points.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point. The image-side surface 222 of the second lens element 220 has one inflection point.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point. The image-side surface 242 of the fourth lens element 240 has two inflection points.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has one inflection point. The image-side surface 252 of the fifth lens element 250 has one inflection point.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has three inflection points. The image-side surface 262 of the sixth lens element 260 has three inflection points.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has two inflection points. The image-side surface 272 of the seventh lens element 270 has two inflection points. The object-side surface 271 of the seventh lens element 270 has at least one critical point in an off-axis region thereof. The image-side surface 272 of the seventh lens element 270 has at least one critical point in an off-axis region thereof.

The eighth lens element 280 with positive refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has three inflection points. The image-side surface 282 of the eighth lens element 280 has two inflection points. The object-side surface 281 of the eighth lens element 280 has at least one critical point in an off-axis region thereof. The image-side surface 282 of the eighth lens element 280 has at least one critical point in an off-axis region thereof.

The ninth lens element 290 with negative refractive power has an object-side surface 291 being concave in a paraxial region thereof and an image-side surface 292 being concave in a paraxial region thereof. The ninth lens element 290 is made of plastic material and has the object-side surface 291 and the image-side surface 292 being both aspheric. The object-side surface 291 of the ninth lens element 290 has two inflection points. The image-side surface 292 of the ninth lens element 290 has three inflection points. The object-side surface 291 of the ninth lens element 290 has at least one critical point in an off-axis region thereof. The image-side surface 292 of the ninth lens element 290 has at least one critical point in an off-axis region thereof.

The IR-cut filter 296 is made of glass material and located between the ninth lens element 290 and the image surface 298, and will not affect the focal length of the optical lens system. The image sensor 299 is disposed on or near the image surface 298 of the optical lens system.

When a vertical distance between a critical point on the image-side surface 282 of the eighth lens element 280 and the optical axis is Yc82, and a vertical distance between a critical point on the image-side surface 292 of the ninth lens element 290 and the optical axis is Yc92, the following condition is satisfied: Yc92/Yc82=0.88.

The detailed optical data of the 2nd embodiment are shown in Table 3 and the aspheric surface data are shown in Table 4 below.

TABLE 3

2nd Embodiment
f = 6.73 mm, Fno = 1.70, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 35.063 | (ASP) | 0.402 | Plastic | 1.686 | 18.4 | −427.34 |
| 2 | | 31.171 | (ASP) | 0.939 | | | | |
| 3 | Ape. Stop | Plano | | −0.889 | | | | |
| 4 | Lens 2 | 2.610 | (ASP) | 1.145 | Plastic | 1.544 | 56.0 | 5.77 |
| 5 | | 13.052 | (ASP) | 0.057 | | | | |
| 6 | Lens 3 | 11.632 | (ASP) | 0.300 | Plastic | 1.669 | 19.5 | −16.85 |
| 7 | | 5.665 | (ASP) | 0.369 | | | | |
| 8 | Stop | Plano | | 0.132 | | | | |
| 9 | Lens 4 | 17.822 | (ASP) | 0.324 | Plastic | 1.686 | 18.4 | −84.08 |
| 10 | | 13.515 | (ASP) | 0.111 | | | | |
| 11 | Lens 5 | −21.027 | (ASP) | 0.553 | Plastic | 1.544 | 56.0 | 72.86 |
| 12 | | −13.866 | (ASP) | −0.184 | | | | |
| 13 | Stop | Plano | | 0.263 | | | | |
| 14 | Lens 6 | 24.350 | (ASP) | 0.486 | Plastic | 1.544 | 56.0 | 48.15 |
| 15 | | 343.512 | (ASP) | 0.631 | | | | |
| 16 | Lens 7 | 10.761 | (ASP) | 0.525 | Plastic | 1.566 | 37.4 | −30.34 |
| 17 | | 6.499 | (ASP) | 0.241 | | | | |
| 18 | Lens 8 | 2.918 | (ASP) | 0.566 | Plastic | 1.544 | 56.0 | 9.74 |
| 19 | | 6.049 | (ASP) | 0.903 | | | | |
| 20 | Lens 9 | −12.001 | (ASP) | 0.663 | Plastic | 1.534 | 55.9 | −5.82 |
| 21 | | 4.276 | (ASP) | 0.500 | | | | |
| 22 | IR-cut Filter | Plano | | 0.210 | Glass | 1.517 | 64.2 | — |
| 23 | | Plano | | 0.233 | | | | |
| 24 | Image | Plano | | 0.000 | | | | |

Note:
Reference wavelength is 587.6 nm (d-line).
An effective radius of the stop 201 (Surface 8) is 1.615 mm.
An effective radius of the image-side surface 242 (Surface 10) is 1.720 mm.
An effective radius of the stop 202 (Surface 13) is 2.121 mm.

TABLE 4

Aspheric Coefficients

| Surface # | 1 | 2 | 4 | 5 | 6 |
|---|---|---|---|---|---|
| k = | 0.0000E+00 | 0.0000E+00 | −5.6854E−01 | −9.8912E+01 | 2.9317E+01 |
| A4 = | 8.2853E−04 | 7.9731E−04 | 2.8294E−03 | −1.6374E−02 | −2.7342E−02 |
| A6 = | −2.0426E−04 | −2.1767E−04 | 3.7305E−03 | 1.9113E−02 | 2.8532E−02 |
| A8 = | 3.3835E−05 | 3.3657E−05 | −3.3618E−03 | −8.3544E−03 | −1.4515E−02 |
| A10 = | −5.2654E−06 | −6.6067E−06 | 2.1010E−03 | 1.3383E−03 | 4.1124E−03 |
| A12 = | 3.1313E−07 | 4.9053E−07 | −7.2817E−04 | 1.9086E−04 | −5.2045E−04 |
| A14 = | — | — | 1.3481E−04 | −8.9688E−05 | 2.1430E−05 |
| A16 = | — | — | −1.0708E−05 | 7.5511E−06 | 5.2132E−07 |

| Surface # | 7 | 9 | 10 | 11 | 12 |
|---|---|---|---|---|---|
| k = | 8.4227E+00 | 9.7302E−01 | 2.5499E+01 | −3.3794E+01 | 3.5640E+01 |
| A4 = | −1.3268E−02 | −3.0466E−02 | −1.1479E−02 | 3.1180E−02 | 4.9191E−02 |
| A6 = | 1.3692E−02 | −2.5916E−03 | −3.6334E−02 | −6.4580E−02 | −9.4395E−02 |
| A8 = | −9.2563E−03 | 3.5771E−03 | 5.3363E−02 | 8.9593E−02 | 8.1175E−02 |
| A10 = | 4.0087E−03 | −3.5610E−03 | −5.1619E−02 | −8.4614E−02 | −3.8351E−02 |
| A12 = | −1.0264E−03 | 2.0689E−03 | 2.9788E−02 | 4.7694E−02 | 6.9345E−03 |
| A14 = | 1.4729E−04 | −4.6011E−04 | −9.5772E−03 | −1.5448E−02 | 1.6356E−03 |
| A16 = | — | 2.9441E−05 | 1.6258E−03 | 2.6818E−03 | −1.0845E−03 |
| A18 = | — | — | −1.1559E−04 | −1.9373E−04 | 2.0871E−04 |
| A20 = | — | — | — | — | −1.4446E−05 |

| Surface # | 14 | 15 | 16 | 17 | 18 |
|---|---|---|---|---|---|
| k = | −9.9000E+01 | −9.9000E+01 | 9.2943E+00 | −5.3014E+01 | −1.1729E+00 |
| A4 = | 3.2079E−02 | −3.4384E−03 | −1.3332E−02 | −2.5696E−02 | −3.3909E−02 |
| A6 = | −8.2039E−02 | −1.4274E−02 | 5.0372E−03 | 7.5864E−03 | 2.8139E−03 |
| A8 = | 5.8017E−02 | 3.7941E−03 | −6.3266E−03 | −3.0138E−03 | −2.5176E−03 |
| A10 = | −2.0884E−02 | 1.5266E−03 | 3.4717E−03 | 8.1875E−04 | 1.2147E−03 |

TABLE 4-continued

| Aspheric Coefficients | | | | | |
|---|---|---|---|---|---|
| A12 = | 1.4514E−03 | −1.6237E−03 | −1.2525E−03 | −1.7883E−04 | −3.2496E−04 |
| A14 = | 1.5110E−03 | 5.8732E−04 | 2.8990E−04 | 2.9004E−05 | 4.9268E−05 |
| A16 = | −5.1651E−04 | −1.0480E−04 | −4.1139E−05 | −2.8961E−06 | −4.1600E−06 |
| A18 = | 6.6464E−05 | 9.1807E−06 | 3.2252E−06 | 1.5277E−07 | 1.8286E−07 |
| A20 = | −3.1367E−06 | −3.1548E−07 | −1.0550E−07 | −3.2345E−09 | −3.2735E−09 |

| Surface # | 19 | 20 | 21 |
|---|---|---|---|
| k = | −1.7515E+01 | 4.5409E+00 | −4.2995E−01 |
| A4 = | 2.1587E−02 | −4.1903E−02 | −4.3037E−02 |
| A6 = | −1.8281E−02 | 4.2900E−03 | 6.8263E−03 |
| A8 = | 5.2094E−03 | 3.4806E−04 | −8.7168E−04 |
| A10 = | −9.3311E−04 | −1.0470E−04 | 8.2718E−05 |
| A12 = | 1.0622E−04 | 1.0102E−05 | −5.4237E−06 |
| A14 = | −7.4962E−06 | −5.4345E−07 | 2.2875E−07 |
| A16 = | 3.1209E−07 | 1.7435E−08 | −5.7501E−09 |
| A18 = | −6.7367E−09 | −3.1427E−10 | 7.6186E−11 |
| A20 = | 5.2090E−11 | 2.4666E−12 | −3.9430E−13 |

In the 2nd embodiment, the equation of the aspheric surface profiles of the aforementioned lens elements is the same as the equation of the 1st embodiment. Also, except for the Yc82 and Yc92 mentioned in this embodiment, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.73 | R18/ImgH | 0.71 |
| Fno | 1.70 | TL/Y92 | 1.71 |
| HFOV [deg.] | 41.0 | Y92/BL | 5.25 |
| FOV [deg.] | 82.0 | Yc92/Yc82 | 0.88 |
| V1/N1 | 10.90 | fG1/f | 1.20 |
| V2/N2 | 36.26 | f/fG2 | −0.53 |
| V3/N3 | 11.65 | f/fG3 | 0.15 |
| V4/N4 | 10.90 | f/f1 | −0.02 |
| V5/N5 | 36.26 | |f/f1| | 0.02 |
| V6/N6 | 36.26 | f/f2 | 1.17 |
| V7/N7 | 23.91 | |f/f2| | 1.17 |
| V8/N8 | 36.26 | f/f3 | −0.40 |
| V9/N9 | 36.46 | |f/f3| | 0.40 |
| Vmin | 18.4 | f/f4 | −0.08 |
| V40 | 4 | |f/f4| | 0.08 |
| V30 | 3 | f/f5 | 0.09 |
| V20 | 3 | |f/f5| | 0.09 |
| Sd/Td | 0.82 | f/f6 | 0.14 |
| Td/ΣCT | 1.52 | |f/f6| | 0.14 |
| TL/ImgH | 1.41 | f/f7 | −0.22 |
| TL/EPD | 2.14 | |f/f7| | 0.22 |
| TL/f | 1.26 | f/f8 | 0.69 |
| TL/[ImgH × tan(CRA)] | 2.10 | |f/f8| | 0.69 |
| Y11/ImgH | 0.48 | f/f9 | −1.16 |
| Ymax/Ymin | 3.07 | |f/f9| | 1.16 |
| f123/f | 1.20 | |f/R17| + |f/R18| | 2.13 |
| f123/f456 | 0.18 | NIF | 31 |

3rd Embodiment

Figure 5:
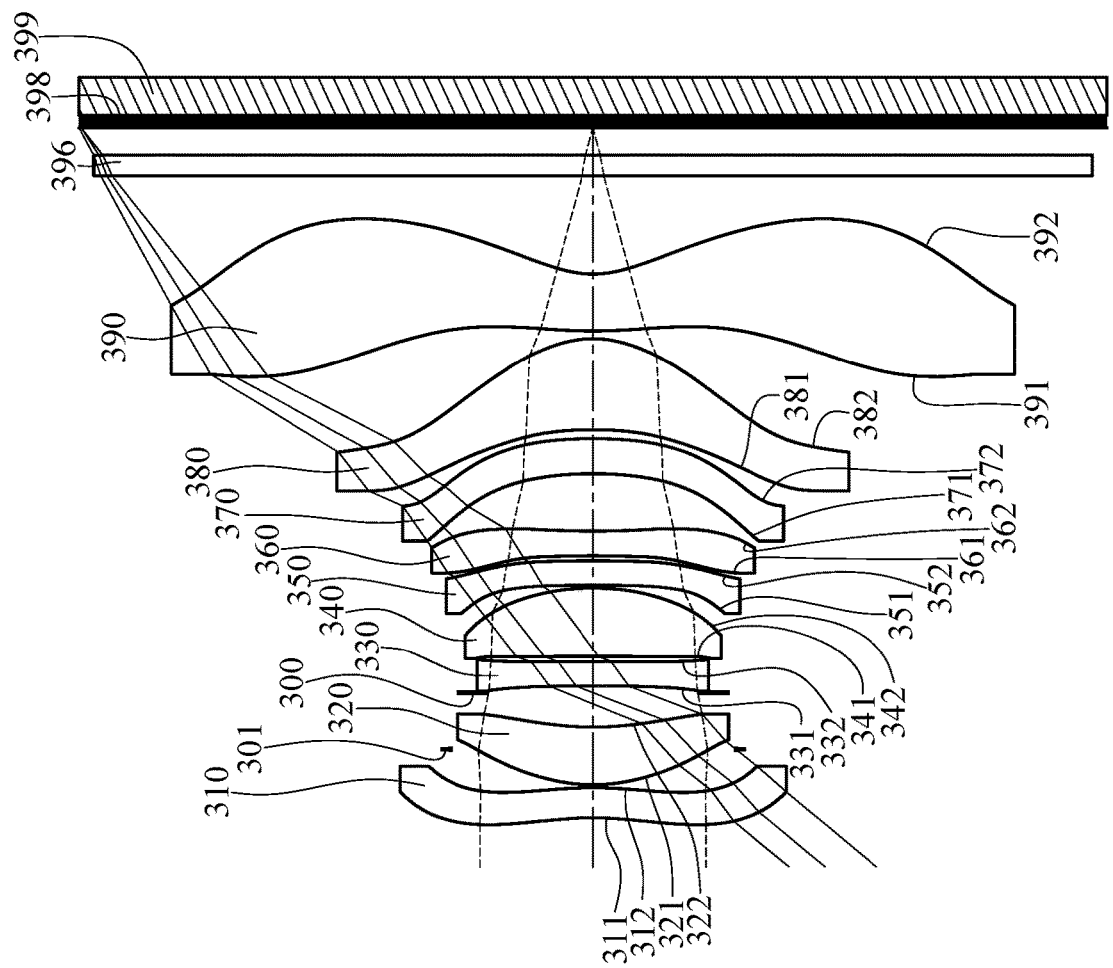
FIG. 5 is a schematic view of an image capturing unit according to the 3rd embodiment of the present disclosure.
Figure 6:
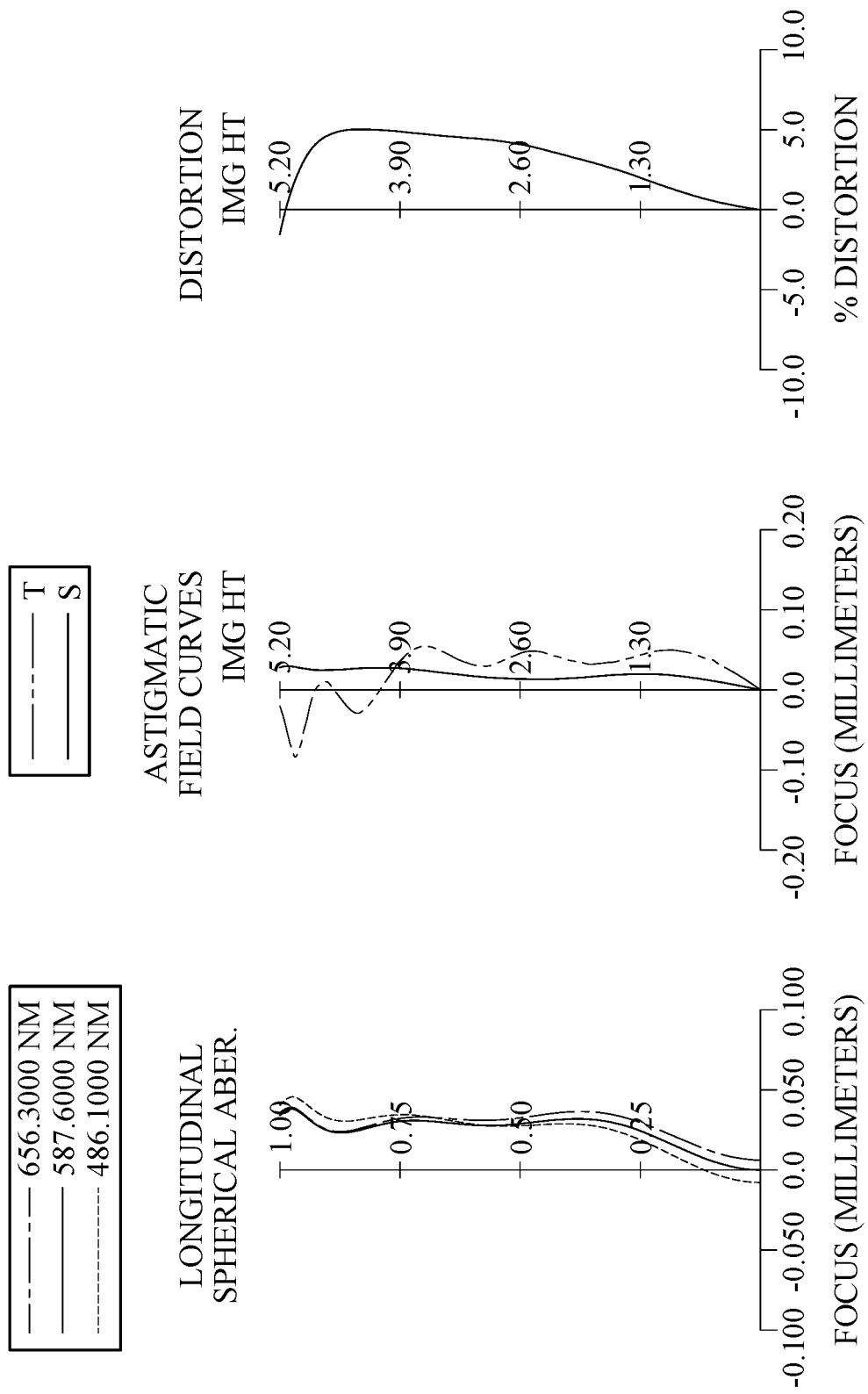
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical lens system (its reference numeral is omitted) of the present disclosure and an image sensor 399. The optical lens system includes, in order from an object side to an image side, a first lens element 310, a stop 301, a second lens element 320, an aperture stop 300, a third lens element 330, a fourth lens element 340, a fifth lens element 350, a sixth lens element 360, a seventh lens element 370, an eighth lens element 380, a ninth lens element 390, an IR-cut filter 396 and an image surface 398. In addition, the optical lens system has a configuration of a front lens group (the first lens element 310, the second lens element 320 and the third lens element 330), a middle lens group (the fourth lens element 340, the fifth lens element 350 and the sixth lens element 360) and a rear lens group (the seventh lens element 370, the eighth lens element 380 and the ninth lens element 390). The optical lens system includes nine lens elements (310~390) with no additional lens element disposed between each of the adjacent nine lens elements.

The first lens element 310 with negative refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has one inflection point. The object-side surface 311 of the first lens element 310 has at least one convex critical point in an off-axis region thereof.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point. The image-side surface 322 of the second lens element 320 has one inflection point.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has two inflection points.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has two inflection points.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has four inflection points.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has two inflection points. The image-side surface 362 of the sixth lens element 360 has two inflection points.

The seventh lens element 370 with negative refractive power has an object-side surface 371 being concave in a paraxial region thereof and an image-side surface 372 being convex in a paraxial region thereof. The seventh lens element 370 is made of plastic material and has the object-side surface 371 and the image-side surface 372 being both aspheric. The object-side surface 371 of the seventh lens element 370 has one inflection point. The image-side surface 372 of the seventh lens element 370 has one inflection point.

The eighth lens element 380 with positive refractive power has an object-side surface 381 being concave in a paraxial region thereof and an image-side surface 382 being convex in a paraxial region thereof. The eighth lens element 380 is made of plastic material and has the object-side surface 381 and the image-side surface 382 being both aspheric. The object-side surface 381 of the eighth lens element 380 has two inflection points. The image-side surface 382 of the eighth lens element 380 has two inflection points.

The ninth lens element 390 with negative refractive power has an object-side surface 391 being convex in a paraxial region thereof and an image-side surface 392 being concave in a paraxial region thereof. The ninth lens element 390 is made of plastic material and has the object-side surface 391 and the image-side surface 392 being both aspheric. The object-side surface 391 of the ninth lens element 390 has three inflection points. The image-side surface 392 of the ninth lens element 390 has three inflection points. The object-side surface 391 of the ninth lens element 390 has at least one critical point in an off-axis region thereof. The image-side surface 392 of the ninth lens element 390 has at least one critical point in an off-axis region thereof.

The IR-cut filter 396 is made of glass material and located between the ninth lens element 390 and the image surface 398, and will not affect the focal length of the optical lens system. The image sensor 399 is disposed on or near the image surface 398 of the optical lens system.

When a vertical distance between the critical point on the object-side surface 311 of the first lens element 310 and the optical axis is Yc11, and a maximum effective radius of the object-side surface 311 of the first lens element 310 is Y11, the following condition can be satisfied: Yc11/Y11=0.54.

The detailed optical data of the 3rd embodiment are shown in Table 5 and the aspheric surface data are shown in Table 6 below.

TABLE 5

3rd Embodiment
f = 4.37 mm, Fno = 1.90, HFOV = 50.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.308 | (ASP) | 0.307 | Plastic | 1.544 | 56.0 | −40.52 |
| 2 | | −4.020 | (ASP) | 0.392 | | | | |
| 3 | Stop | Plano | | −0.362 | | | | |
| 4 | Lens 2 | 1.819 | (ASP) | 0.585 | Plastic | 1.554 | 48.0 | 6.97 |
| 5 | | 3.043 | (ASP) | 0.351 | | | | |
| 6 | Ape. Stop | Plano | | 0.067 | | | | |
| 7 | Lens 3 | −122.910 | (ASP) | 0.250 | Plastic | 1.582 | 30.2 | −66.90 |
| 8 | | 57.096 | (ASP) | 0.056 | | | | |
| 9 | Lens 4 | −82.680 | (ASP) | 0.695 | Plastic | 1.544 | 56.0 | 4.82 |
| 10 | | −2.551 | (ASP) | 0.030 | | | | |
| 11 | Lens 5 | −27.114 | (ASP) | 0.250 | Plastic | 1.669 | 19.4 | 15.02 |
| 12 | | −7.359 | (ASP) | 0.050 | | | | |
| 13 | Lens 6 | −7.038 | (ASP) | 0.250 | Plastic | 1.669 | 19.4 | −5.63 |
| 14 | | 8.229 | (ASP) | 0.585 | | | | |
| 15 | Lens 7 | −3.873 | (ASP) | 0.355 | Plastic | 1.669 | 19.4 | −22.02 |
| 16 | | −5.448 | (ASP) | 0.092 | | | | |
| 17 | Lens 8 | −4.216 | (ASP) | 0.930 | Plastic | 1.544 | 56.0 | 2.27 |
| 18 | | −1.029 | (ASP) | 0.078 | | | | |
| 19 | Lens 9 | 5.029 | (ASP) | 0.576 | Plastic | 1.559 | 40.4 | −2.34 |
| 20 | | 0.994 | (ASP) | 1.000 | | | | |
| 21 | IR-cut Filter | Plano | | 0.210 | Glass | 1.517 | 64.2 | — |
| 22 | | Plano | | 0.276 | | | | |
| 23 | Image | Plano | | 0.000 | | | | |

Note:
Reference wavelength is 587.6 nm (d-line).
An effective radius of the stop 301 (Surface 3) is 1.450 mm.
An effective radius of the image-side surface 362 (Surface 14) is 1.640 mm.
An effective radius of the image-side surface 382 (Surface 18) is 2.600 mm.

TABLE 6

| Aspheric Coefficients | | | | | |
|---|---|---|---|---|---|
| Surface # | 1 | 2 | 4 | 5 | 7 |
| k = | −2.7605E+01 | −1.7003E+01 | 3.7466E−01 | −1.3225E+01 | 0.0000E+00 |
| A4 = | 4.3230E−02 | 7.5283E−02 | −6.8422E−02 | −1.3774E−02 | −5.7229E−02 |
| A6 = | −1.1289E−02 | −3.5253E−02 | 4.6100E−02 | 1.1404E−02 | 5.5294E−02 |
| A8 = | 6.6762E−03 | 2.7773E−02 | −4.7179E−02 | −1.0375E−02 | −6.3097E−02 |
| A10 = | −2.2968E−03 | −1.2927E−02 | 2.7307E−02 | 1.0794E−03 | 6.5118E−02 |
| A12 = | 4.5163E−04 | 3.5466E−03 | −9.6095E−03 | −1.8226E−03 | −4.8355E−02 |
| A14 = | −3.5887E−05 | −4.0603E−04 | 6.9830E−04 | 8.3651E−04 | 1.4740E−02 |
| Surface # | 8 | 9 | 10 | 11 | 12 |
| k = | 0.0000E+00 | 0.0000E+00 | −1.7707E+01 | 3.2297E+01 | 7.5739E+00 |
| A4 = | −5.6244E−02 | −2.8896E−02 | −1.6643E−01 | −2.0600E−02 | 3.1120E−01 |
| A6 = | 9.1441E−02 | 7.2705E−02 | 1.1345E−01 | −1.8363E−01 | −9.8179E−01 |
| A8 = | −4.8442E−03 | −3.0977E−02 | 3.4243E−02 | 3.9111E−01 | 1.3113E+00 |
| A10 = | −6.4169E−02 | −2.2148E−02 | −2.0102E−01 | −3.9788E−01 | −9.4369E−01 |
| A12 = | 4.0956E−02 | 1.6116E−02 | 1.8585E−01 | 1.8298E−01 | 3.7563E−01 |
| A14 = | −7.2519E−03 | −3.5511E−03 | −7.4357E−02 | −3.3286E−02 | −7.6535E−02 |
| A16 = | — | — | 1.1038E−02 | 9.9649E−04 | 6.1010E−03 |
| Surface # | 13 | 14 | 15 | 16 | 17 |
| k = | 4.4512E+00 | 1.6420E+01 | −1.3318E+00 | 0.0000E+00 | 5.5790E−01 |
| A4 = | 3.0721E−01 | 1.4198E−02 | −5.4244E−02 | −1.5305E−01 | −1.7101E−01 |
| A6 = | −9.5580E−01 | −1.8360E−01 | 6.1368E−02 | 2.1608E−01 | 2.3063E−01 |
| A8 = | 1.1580E+00 | 2.3441E−01 | −1.6746E−01 | −2.5954E−01 | −1.7387E−01 |
| A10 = | −7.4071E−01 | −1.6689E−01 | 2.0390E−01 | 2.0134E−01 | 8.2664E−02 |
| A12 = | 2.6595E−01 | 6.8778E−02 | −1.3491E−01 | −1.0209E−01 | −2.5556E−02 |
| A14 = | −5.0236E−02 | −1.5419E−02 | 5.0577E−02 | 3.3223E−02 | 5.1504E−03 |
| A16 = | 3.8393E−03 | 1.4511E−03 | −1.0069E−02 | −6.5329E−03 | −6.5033E−04 |
| A18 = | — | — | 8.2886E−04 | 6.9828E−04 | 4.6476E−05 |
| A20 = | — | — | — | −3.0997E−05 | −1.4294E−06 |
| Surface # | | 18 | 19 | 20 | |
| k = | | −3.9132E+00 | −1.5265E+01 | −4.7672E+00 | |
| A4 = | | −1.0023E−01 | −5.6010E−02 | −3.2736E−02 | |
| A6 = | | 4.8726E−02 | 1.2793E−02 | 7.2151E−03 | |
| A8 = | | −9.0677E−03 | −1.9254E−03 | −1.0843E−03 | |
| A10 = | | −2.0182E−03 | 2.1611E−04 | 9.6135E−05 | |
| A12 = | | 1.9703E−03 | −1.7214E−05 | −4.2968E−06 | |
| A14 = | | −5.7877E−04 | 9.4184E−07 | −2.6256E−09 | |
| A16 = | | 8.4738E−05 | −3.4903E−08 | 9.7083E−09 | |
| A18 = | | −6.2339E−06 | 8.2794E−10 | −4.0099E−10 | |
| A20 = | | 1.8361E−07 | −9.7308E−12 | 5.2589E−12 | |

In the 3rd embodiment, the equation of the aspheric surface profiles of the aforementioned lens elements is the same as the equation of the 1st embodiment. Also, except for the Yc11 mentioned in this embodiment, the definitions of these parameters shown in the following table are the same as those stated in the 1st and 2nd embodiments with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.37 | Yc11/Y11 | 0.54 |
| Fno | 1.90 | R18/ImgH | 0.19 |
| HFOV [deg.] | 50.3 | TL/Y92 | 1.64 |
| FOV [deg.] | 100.6 | Y92/BL | 2.89 |
| V1/N1 | 36.26 | fG1/f | 2.10 |
| V2/N2 | 30.89 | f/fG2 | 0.17 |
| V3/N3 | 19.11 | f/fG3 | 0.46 |
| V4/N4 | 36.26 | f/f1 | −0.11 |
| V5/N5 | 11.65 | |f/f1| | 0.11 |
| V6/N6 | 11.65 | f/f2 | 0.63 |
| V7/N7 | 11.65 | |f/f2| | 0.63 |

-continued

| 3rd Embodiment | | | |
|---|---|---|---|
| V8/N8 | 36.26 | f/f3 | −0.07 |
| V9/N9 | 25.95 | |f/f3| | 0.07 |
| Vmin | 19.4 | f/f4 | 0.91 |
| V40 | 4 | |f/f4| | 0.91 |
| V30 | 3 | f/f5 | 0.29 |
| V20 | 3 | |f/f5| | 0.29 |
| Sd/Td | 0.77 | f/f6 | −0.78 |
| Td/ΣCT | 1.32 | |f/f6| | 0.78 |
| TL/ImgH | 1.35 | f/f7 | −0.20 |
| TL/EPD | 3.06 | |f/f7| | 0.20 |
| TL/f | 1.61 | f/f8 | 1.93 |
| TL/[ImgH × tan(CRA)] | 2.12 | |f/f8| | 1.93 |
| Y11/ImgH | 0.38 | f/f9 | −1.87 |
| Ymax/Ymin | 4.00 | |f/f9| | 1.87 |
| f123/f | 2.10 | |f/R17| + |f/R18| | 5.26 |
| f123/f456 | 0.96 | NIF | 28 |

4th Embodiment

Figure 7:
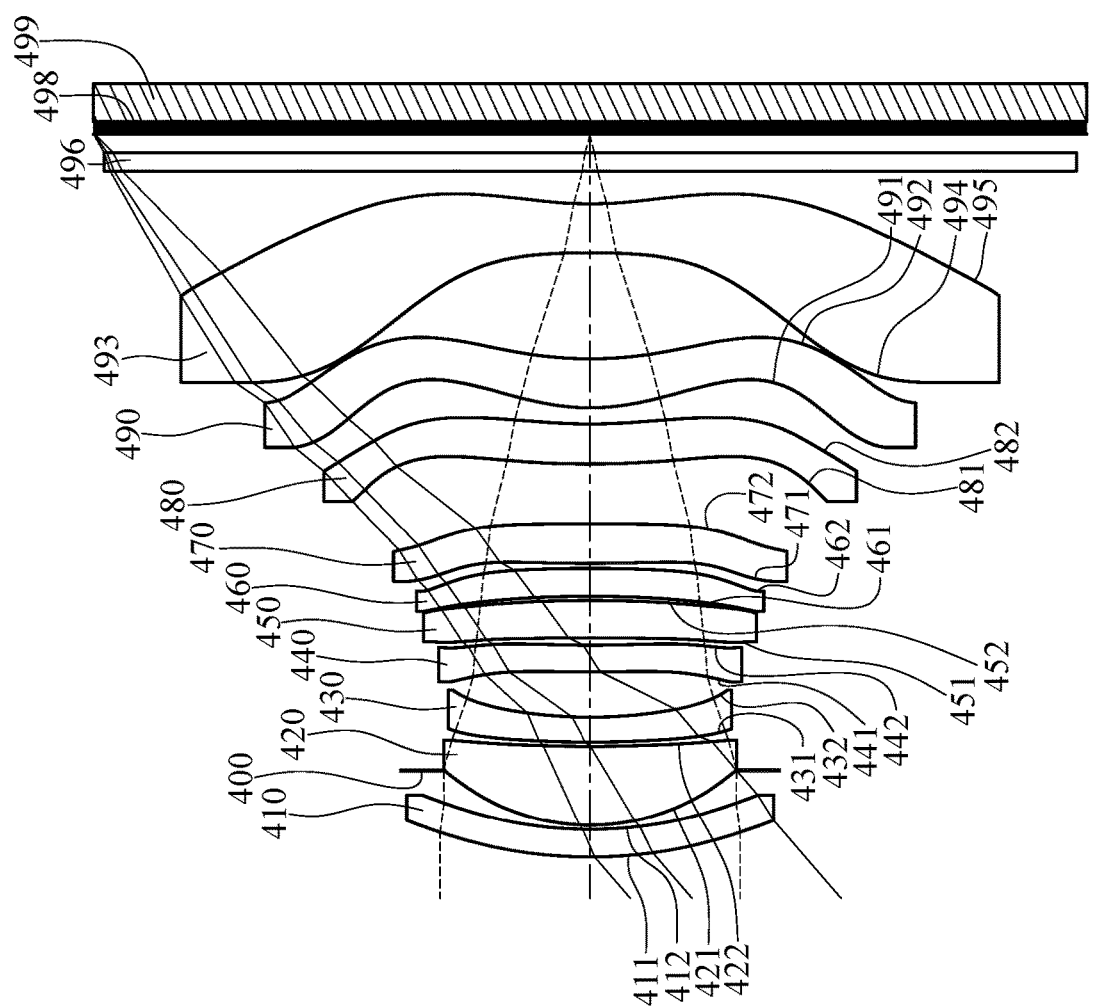
FIG. 7 is a schematic view of an image capturing unit according to the 4th embodiment of the present disclosure.
Figure 8:
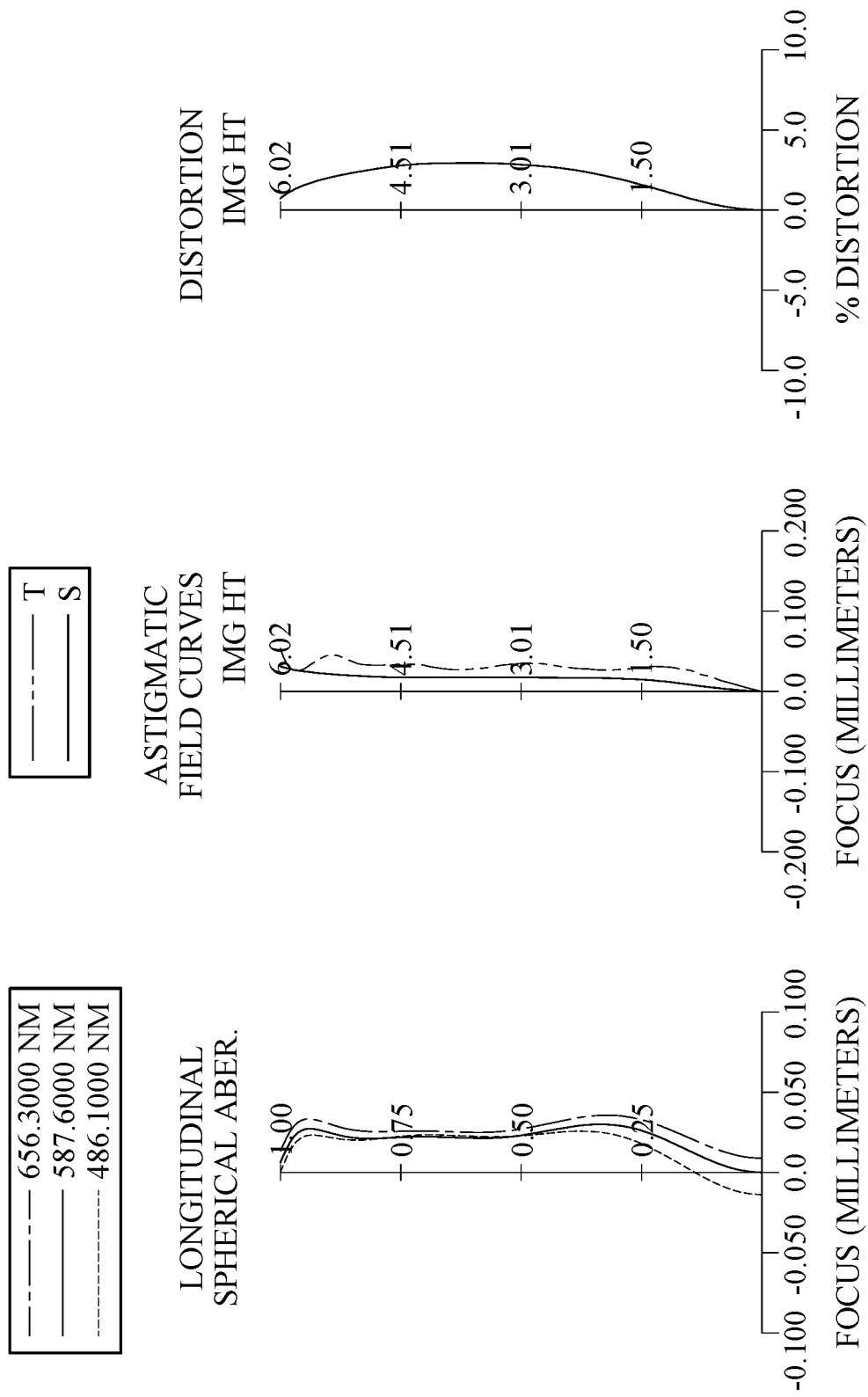
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical lens system (its reference numeral is omitted) of the present disclosure and an image sensor 499. The optical lens system includes, in order from an object side to an image side, a first lens element 410, an aperture stop 400, a second lens element 420, a third lens element 430, a fourth lens element 440, a fifth lens element 450, a sixth lens element 460, a seventh lens element 470, an eighth lens element 480, a ninth lens element 490, a tenth lens element 493, an IR-cut filter 496 and an image surface 498. In addition, the optical lens system has a configuration of a front lens group (the first lens element 410, the second lens element 420 and the third lens element 430), a middle lens group (the fourth lens element 440, the fifth lens element 450, the sixth lens element 460 and the seventh lens element 470) and a rear lens group (the eighth lens element 480, the ninth lens element 490 and the tenth lens element 493). The optical lens system includes ten lens elements (410~493) with no additional lens element disposed between each of the adjacent ten lens elements.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The image-side surface 422 of the second lens element 420 has one inflection point.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has two inflection points.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has one inflection point.

The sixth lens element 460 with negative refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has two inflection points. The image-side surface 462 of the sixth lens element 460 has one inflection point.

The seventh lens element 470 with positive refractive power has an object-side surface 471 being convex in a paraxial region thereof and an image-side surface 472 being convex in a paraxial region thereof. The seventh lens element 470 is made of plastic material and has the object-side surface 471 and the image-side surface 472 being both aspheric. The object-side surface 471 of the seventh lens element 470 has two inflection points. The image-side surface 472 of the seventh lens element 470 has two inflection points.

The eighth lens element 480 with negative refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has two inflection points. The image-side surface 482 of the eighth lens element 480 has two inflection points. The object-side surface 481 of the eighth lens element 480 has at least one critical point in an off-axis region thereof. The image-side surface 482 of the eighth lens element 480 has at least one critical point in an off-axis region thereof.

The ninth lens element 490 with positive refractive power has an object-side surface 491 being convex in a paraxial region thereof and an image-side surface 492 being concave in a paraxial region thereof. The ninth lens element 490 is made of plastic material and has the object-side surface 491 and the image-side surface 492 being both aspheric. The object-side surface 491 of the ninth lens element 490 has two inflection points. The image-side surface 492 of the ninth lens element 490 has two inflection points. The object-side surface 491 of the ninth lens element 490 has at least one critical point in an off-axis region thereof. The image-side surface 492 of the ninth lens element 490 has at least one critical point in an off-axis region thereof.

The tenth lens element 493 with negative refractive power has an object-side surface 494 being concave in a paraxial region thereof and an image-side surface 495 being concave in a paraxial region thereof. The tenth lens element 493 is made of plastic material and has the object-side surface 494 and the image-side surface 495 being both aspheric. The object-side surface 494 of the tenth lens element 493 has one inflection point. The image-side surface 495 of the tenth lens element 493 has three inflection points. The object-side surface 494 of the tenth lens element 493 has at least one critical point in an off-axis region thereof. The image-side surface 495 of the tenth lens element 493 has at least one critical point in an off-axis region thereof.

The IR-cut filter 496 is made of glass material and located between the tenth lens element 493 and the image surface 498, and will not affect the focal length of the optical lens system. The image sensor 499 is disposed on or near the image surface 498 of the optical lens system.

In the optical lens system of the 4th embodiment, when an Abbe number of the tenth lens element 493 is V10, and a refractive index of the tenth lens element 493 is N10, the following condition is satisfied: V10/N10=36.26.

When an axial distance between the object-side surface 411 of the first lens element 410 and the image surface 498 is TL, and a maximum effective radius of the image-side surface 492 of the ninth lens element 490 is Y92, the following condition is satisfied: TL/Y92=2.30.

When the maximum effective radius of the image-side surface 492 of the ninth lens element 490 is Y92, and an axial distance between the image-side surface 495 of the tenth lens element 493 and the image surface 498 is BL, the following condition is satisfied: Y92/BL=4.52.

When a maximum effective radius of the image-side surface 495 of the tenth lens element 493 is Y102, and the axial distance between the image-side surface 495 of the tenth lens element 493 and the image surface 498 is BL, the following condition is satisfied: Y102/BL=5.87.

When a vertical distance between the critical point on the image-side surface 492 of the ninth lens element 490 and the optical axis is Yc92, and a vertical distance between a critical point on the image-side surface 495 of the tenth lens element 493 and the optical axis is Yc102, the following condition is satisfied: Yc102/Yc92=0.80.

When a focal length of the optical lens system is f, and a focal length of the tenth lens element 493 is f10, the following condition is satisfied: f/f10=−1.18. Moreover, the following condition can also be satisfied: |f/f10|=1.18.

The detailed optical data of the 4th embodiment are shown in Table 7 and the aspheric surface data are shown in Table 8 below.

TABLE 7

4th Embodiment
f = 6.92 mm, Fno = 1.90, HFOV = 40.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.804 | (ASP) | 0.340 | Plastic | 1.698 | 16.3 | −77.56 |
| 2 | | 5.116 | (ASP) | 0.714 | | | | |
| 3 | Ape. Stop | Plano | | −0.664 | | | | |
| 4 | Lens 2 | 2.668 | (ASP) | 0.960 | Plastic | 1.544 | 56.0 | 5.83 |
| 5 | | 14.739 | (ASP) | 0.052 | | | | |
| 6 | Lens 3 | 11.579 | (ASP) | 0.300 | Plastic | 1.632 | 23.4 | −18.67 |
| 7 | | 5.785 | (ASP) | 0.554 | | | | |
| 8 | Lens 4 | 22.214 | (ASP) | 0.320 | Plastic | 1.679 | 18.4 | −68.78 |
| 9 | | 14.967 | (ASP) | 0.090 | | | | |
| 10 | Lens 5 | −26.198 | (ASP) | 0.456 | Plastic | 1.544 | 56.0 | 56.90 |
| 11 | | −14.277 | (ASP) | 0.050 | | | | |
| 12 | Lens 6 | −13.221 | (ASP) | 0.336 | Plastic | 1.544 | 56.0 | −230.67 |
| 13 | | −14.910 | (ASP) | 0.061 | | | | |
| 14 | Lens 7 | 25.075 | (ASP) | 0.488 | Plastic | 1.544 | 56.0 | 35.59 |
| 15 | | −84.415 | (ASP) | 0.727 | | | | |
| 16 | Lens 8 | 11.455 | (ASP) | 0.483 | Plastic | 1.566 | 37.4 | −26.58 |
| 17 | | 6.404 | (ASP) | 0.197 | | | | |
| 18 | Lens 9 | 2.672 | (ASP) | 0.595 | Plastic | 1.544 | 56.0 | 9.30 |
| 19 | | 5.221 | (ASP) | 1.286 | | | | |
| 20 | Lens 10 | −11.835 | (ASP) | 0.600 | Plastic | 1.544 | 56.0 | −5.86 |
| 21 | | 4.446 | (ASP) | 0.400 | | | | |
| 22 | IR-cut Filter | Plano | | 0.224 | Glass | 1.517 | 64.2 | — |
| 23 | | Plano | | 0.223 | | | | |
| 24 | Image | Plano | | 0.000 | | | | |

Note:
Reference wavelength is 587.6 nm (d-line).
An effective radius of the image-side surface 442 (Surface 9) is 1.840 mm.
An effective radius of the object-side surface 481 (Surface 16) is 2.880 mm.

TABLE 8

Aspheric Coefficients

| Surface # | 1 | 2 | 4 | 5 | 6 |
|---|---|---|---|---|---|
| k = | 0.0000E+00 | 0.0000E+00 | −5.9430E−01 | −9.9000E+01 | 2.9591E+01 |
| A4 = | 2.3116E−03 | 1.7773E−03 | 1.9916E−03 | −1.3812E−02 | −2.2832E−02 |
| A6 = | −5.3226E−04 | −6.3132E−04 | 2.8058E−03 | 1.3767E−02 | 2.0383E−02 |
| A8 = | 5.9465E−05 | 1.1600E−04 | −2.0750E−03 | −5.2656E−03 | −9.1391E−03 |
| A10 = | −1.2959E−05 | −3.9980E−05 | 1.1612E−03 | 7.2540E−04 | 2.2915E−03 |
| A12 = | 1.0253E−06 | 4.4559E−06 | −3.5204E−04 | 9.2161E−05 | −2.4965E−04 |
| A14 = | — | — | 5.6453E−05 | −3.8291E−05 | 9.1996E−06 |
| A16 = | — | — | −4.3988E−06 | 2.6164E−06 | 4.4867E−08 |

| Surface # | 7 | 8 | 9 | 10 | 11 |
|---|---|---|---|---|---|
| k = | 7.8245E+00 | −9.9000E+01 | 2.5537E+01 | 7.0724E+00 | 0.0000E+00 |
| A4 = | −1.0574E−02 | −2.5790E−02 | −1.0209E−02 | 2.0760E−02 | 1.6339E−02 |
| A6 = | 9.5190E−03 | −1.5441E−03 | −2.3560E−02 | −3.2850E−02 | −5.2186E−02 |
| A8 = | −5.7311E−03 | 2.2248E−03 | 2.9653E−02 | 3.6832E−02 | 7.9685E−02 |
| A10 = | 2.2703E−03 | −1.9584E−03 | −2.4979E−02 | −2.9761E−02 | −6.8943E−02 |

TABLE 8-continued

Aspheric Coefficients

| | | | | | |
|---|---|---|---|---|---|
| A12 = | −4.8411E−04 | 1.0015E−03 | 1.2569E−02 | 1.4315E−02 | 3.5732E−02 |
| A14 = | 6.2907E−05 | −1.9472E−04 | −3.4972E−03 | −3.8706E−03 | −1.1240E−02 |
| A16 = | — | 1.1509E−05 | 5.1034E−04 | 5.5089E−04 | 2.0956E−03 |
| A18 = | — | — | −3.1014E−05 | −3.2281E−05 | −2.1226E−04 |
| A20 = | — | — | — | 0.0000E+00 | 8.9387E−06 |

| Surface # | 12 | 13 | 14 | 15 | 16 |
|---|---|---|---|---|---|
| k = | 0.0000E+00 | 3.6000E+01 | 7.2427E+01 | 0.0000E+00 | 1.1457E+01 |
| A4 = | 1.3474E−02 | 3.1888E−02 | 2.0976E−02 | −4.4671E−03 | −1.6882E−04 |
| A6 = | −4.6993E−02 | −5.2120E−02 | −4.2634E−02 | −3.2101E−03 | 2.0457E−03 |
| A8 = | 6.9915E−02 | 3.6698E−02 | 1.8290E−02 | −5.2196E−03 | −4.5158E−03 |
| A10 = | −5.6023E−02 | −1.2394E−02 | 8.6839E−04 | 5.5854E−03 | 2.2684E−03 |
| A12 = | 2.5088E−02 | −8.0381E−04 | −5.0707E−03 | −2.6644E−03 | −6.4763E−04 |
| A14 = | −6.0816E−03 | 2.1544E−03 | 2.4128E−03 | 7.1343E−04 | 1.1250E−04 |
| A16 = | 6.6376E−04 | −7.2762E−04 | −5.2277E−04 | −1.0684E−04 | −1.1735E−05 |
| A18 = | −2.1497E−06 | 1.0668E−04 | 5.5078E−05 | 8.3002E−06 | 6.7426E−07 |
| A20 = | −3.6439E−06 | −5.9743E−06 | −2.2856E−06 | −2.6039E−07 | −1.6316E−08 |

| Surface # | 17 | 18 | 19 | 20 | 21 |
|---|---|---|---|---|---|
| k = | −2.0082E+01 | −1.0553E+00 | −7.4031E+00 | 3.5331E+00 | −4.4334E−01 |
| A4 = | −2.2377E−02 | −2.6287E−02 | 1.9358E−02 | −3.7321E−02 | −3.6468E−02 |
| A6 = | 1.0414E−02 | 1.3096E−03 | −1.3864E−02 | 4.3071E−03 | 5.6082E−03 |
| A8 = | −5.1324E−03 | −9.0966E−04 | 3.7053E−03 | −2.1549E−04 | −7.3519E−04 |
| A10 = | 1.6029E−03 | 3.8499E−04 | −6.4989E−04 | 2.2528E−05 | 7.0988E−05 |
| A12 = | −3.3026E−04 | −9.1871E−05 | 7.5563E−05 | −3.3830E−06 | −4.6463E−06 |
| A14 = | 4.3506E−05 | 1.2430E−05 | −5.6923E−06 | 2.7952E−07 | 1.9688E−07 |
| A16 = | −3.4492E−06 | −9.3070E−07 | 2.6635E−07 | −1.2493E−08 | −5.1459E−09 |
| A18 = | 1.4860E−07 | 3.6100E−08 | −6.9974E−09 | 2.9408E−10 | 7.5484E−11 |
| A20 = | −2.6619E−09 | −5.6881E−10 | 7.8330E−11 | −2.8987E−12 | −4.7959E−13 |

In the 4th embodiment, the equation of the aspheric surface profiles of the aforementioned lens elements is the same as the equation of the 1st embodiment. Also, except for the V10, N10, Y102, Yc102 and f10 mentioned in this embodiment, the definitions of these parameters shown in the following table are the same as those stated in the 1st to 3rd embodiments with corresponding values for the 4th embodiment, so an explanation in this regard will not be provided again.

Moreover, these parameters can be calculated from Table 7 and Table 8 as the following values and satisfy the following conditions:

4th Embodiment

| | | | |
|---|---|---|---|
| f [mm] | 6.92 | Y92/BL | 4.52 |
| Fno | 1.90 | Y102/BL | 5.87 |
| HFOV [deg.] | 40.7 | Yc92/Yc82 | 1.35 |
| FOV [deg.] | 81.4 | Yc102/Yc92 | 0.80 |
| V1/N1 | 9.60 | fG1/f | 1.29 |
| V2/N2 | 36.26 | f/fG2 | −0.50 |
| V3/N3 | 14.34 | f/fG3 | 0.19 |
| V4/N4 | 10.98 | f/f1 | −0.09 |
| V5/N5 | 36.26 | |f/f1| | 0.09 |
| V6/N6 | 36.26 | f/f2 | 1.19 |
| V7/N7 | 36.26 | |f/f2| | 1.19 |
| V8/N8 | 23.91 | f/f3 | −0.37 |
| V9/N9 | 36.26 | |f/f3| | 0.37 |
| V10/N10 | 36.26 | f/f4 | −0.10 |
| Vmin | 16.3 | |f/f4| | 0.10 |
| V40 | 4 | f/f5 | 0.12 |
| V30 | 3 | |f/f5| | 0.12 |
| V20 | 2 | f/f6 | −0.03 |
| Sd/Td | 0.87 | |f/f6| | 0.03 |
| Td/ΣCT | 1.63 | f/f7 | 0.19 |
| TL/ImgH | 1.46 | |f/f7| | 0.19 |
| TL/EPD | 2.41 | f/f8 | −0.26 |
| TL/f | 1.27 | |f/f8| | 0.26 |
| TL/[ImgH × tan(CRA)] | 2.21 | f/f9 | 0.74 |
| Y11/ImgH | 0.37 | |f/f9| | 0.74 |
| Ymax/Ymin | 2.92 | f/f10 | −1.18 |
| f123/f | 1.29 | |f/f10| | 1.18 |
| f123/f456 | −0.01 | |f/R17| + |f/R18| | 3.92 |
| R18/ImgH | 0.87 | NIF | 25 |
| TL/Y92 | 2.30 | — | — |

5th Embodiment

Figure 9:
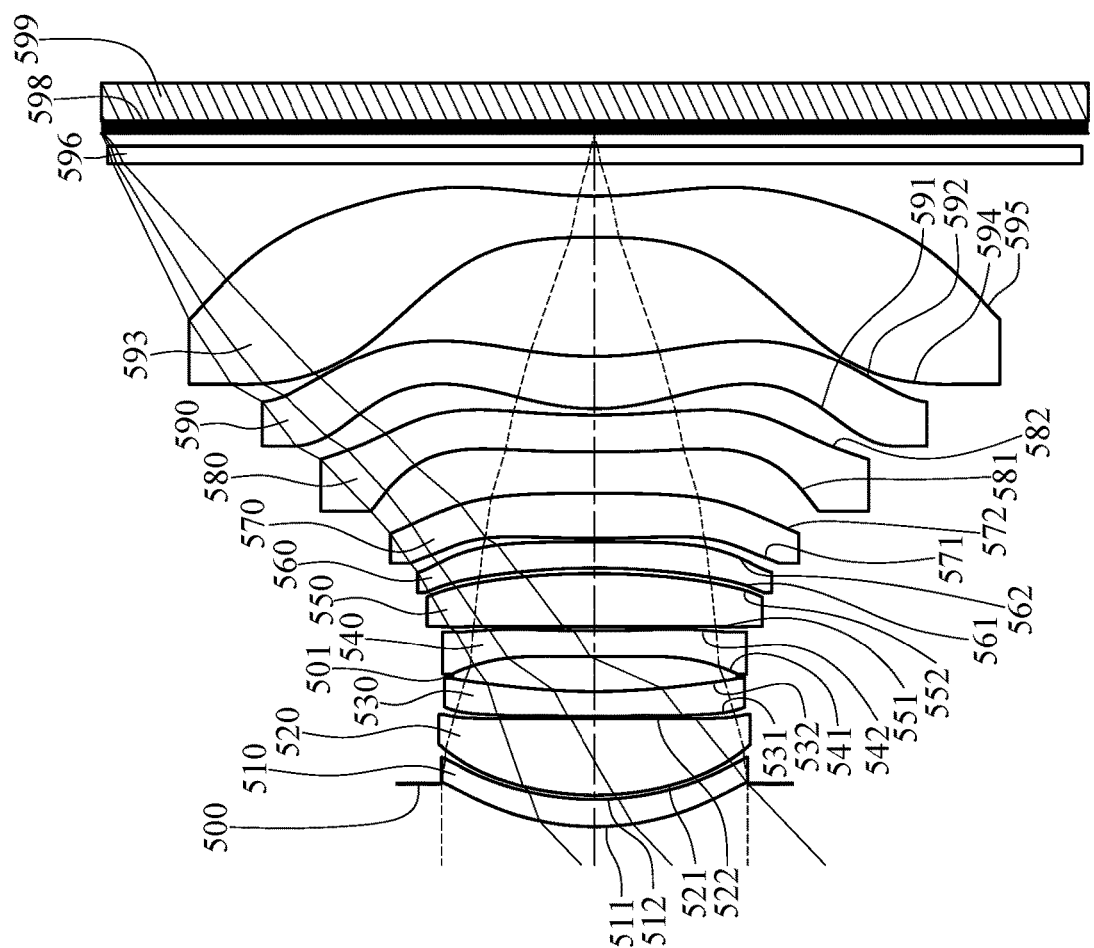
FIG. 9 is a schematic view of an image capturing unit according to the 5th embodiment of the present disclosure.
Figure 10:
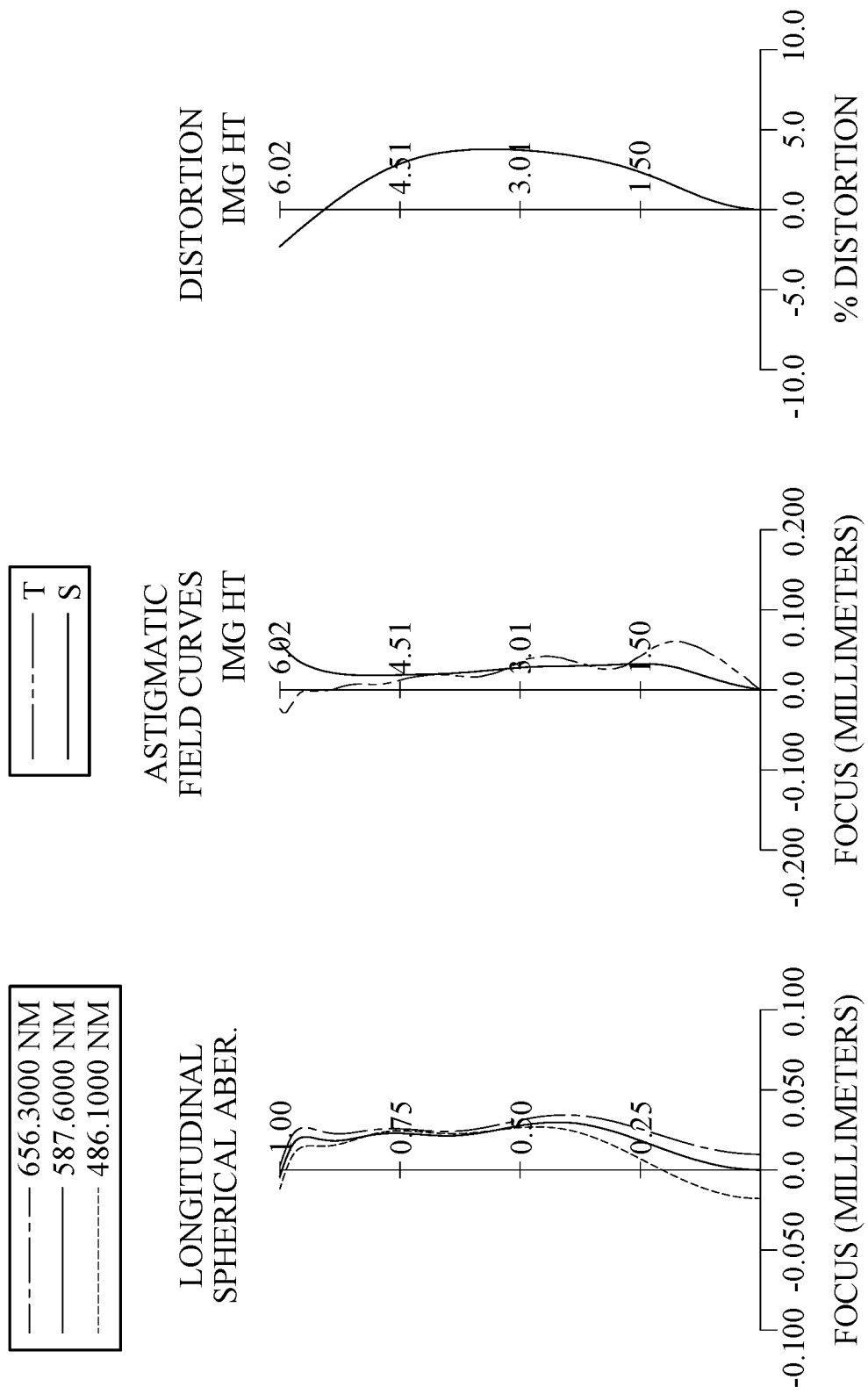
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical lens system (its reference numeral is omitted) of the present disclosure and an image sensor 599. The optical lens system includes, in order from an object side to an image side, an aperture stop 500, a first lens element 510, a second lens element 520, a third lens element 530, a stop 501, a fourth lens element 540, a fifth lens element 550, a sixth lens element 560, a seventh lens element 570, an eighth lens element 580, a ninth lens element 590, a tenth lens element 593, an IR-cut filter 596 and an image surface 598. In addition, the optical lens system has a configuration of a front lens group (the first lens element 510, the second lens element 520 and the third lens element 530), a middle lens group (the fourth lens element 540, the fifth lens element 550, the sixth lens element 560 and the seventh lens element 570) and a rear lens group (the eighth lens element 580, the ninth lens element 590 and the tenth lens element 593). The optical lens system includes ten lens elements (510~593) with no additional lens element disposed between each of the adjacent ten lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point. The image-side surface 512 of the first lens element 510 has one inflection point.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The image-side surface 522 of the second lens element 520 has two inflection points.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has two inflection points.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has one inflection point. The image-side surface 542 of the fourth lens element 540 has two inflection points.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has three inflection points.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The image-side surface 562 of the sixth lens element 560 has one inflection point.

The seventh lens element 570 with positive refractive power has an object-side surface 571 being convex in a paraxial region thereof and an image-side surface 572 being convex in a paraxial region thereof. The seventh lens element 570 is made of plastic material and has the object-side surface 571 and the image-side surface 572 being both aspheric. The object-side surface 571 of the seventh lens element 570 has three inflection points. The image-side surface 572 of the seventh lens element 570 has three inflection points.

The eighth lens element 580 with negative refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has two inflection points. The image-side surface 582 of the eighth lens element 580 has two inflection points. The object-side surface 581 of the eighth lens element 580 has at least one critical point in an off-axis region thereof. The image-side surface 582 of the eighth lens element 580 has at least one critical point in an off-axis region thereof.

The ninth lens element 590 with positive refractive power has an object-side surface 591 being convex in a paraxial region thereof and an image-side surface 592 being concave in a paraxial region thereof. The ninth lens element 590 is made of plastic material and has the object-side surface 591 and the image-side surface 592 being both aspheric. The object-side surface 591 of the ninth lens element 590 has two inflection points. The image-side surface 592 of the ninth lens element 590 has two inflection points. The object-side surface 591 of the ninth lens element 590 has at least one critical point in an off-axis region thereof. The image-side surface 592 of the ninth lens element 590 has at least one critical point in an off-axis region thereof.

The tenth lens element 593 with negative refractive power has an object-side surface 594 being concave in a paraxial region thereof and an image-side surface 595 being concave in a paraxial region thereof. The tenth lens element 593 is made of plastic material and has the object-side surface 594 and the image-side surface 595 being both aspheric. The object-side surface 594 of the tenth lens element 593 has one inflection point. The image-side surface 595 of the tenth lens element 593 has two inflection points. The object-side surface 594 of the tenth lens element 593 has at least one critical point in an off-axis region thereof. The image-side surface 595 of the tenth lens element 593 has at least one critical point in an off-axis region thereof.

The IR-cut filter 596 is made of glass material and located between the tenth lens element 593 and the image surface 598, and will not affect the focal length of the optical lens system. The image sensor 599 is disposed on or near the image surface 598 of the optical lens system.

The detailed optical data of the 5th embodiment are shown in Table 9 and the aspheric surface data are shown in Table 10 below.

TABLE 9

5th Embodiment
f = 6.48 mm, Fno = 1.73, HFOV = 43.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.528 | | | | |
| 2 | Lens 1 | 3.231 | (ASP) | 0.333 | Plastic | 1.553 | 47.4 | 37.28 |
| 3 | | 3.690 | (ASP) | 0.051 | | | | |
| 4 | Lens 2 | 3.654 | (ASP) | 0.938 | Plastic | 1.544 | 55.9 | 7.04 |
| 5 | | 72.560 | (ASP) | 0.030 | | | | |
| 6 | Lens 3 | 38.009 | (ASP) | 0.301 | Plastic | 1.620 | 22.1 | −16.07 |

TABLE 9-continued

5th Embodiment
f = 6.48 mm, Fno = 1.73, HFOV = 43.5 deg.

| Surface # | | Curvature Radius | | Thickness | Material | Index | Abbe # | Focal Length |
|---|---|---|---|---|---|---|---|---|
| 7 | | 7.870 | (ASP) | 0.191 | | | | |
| 8 | Stop | Plano | | 0.237 | | | | |
| 9 | Lens 4 | 23.519 | (ASP) | 0.322 | Plastic | 1.652 | 19.1 | −53.77 |
| 10 | | 14.000 | (ASP) | 0.052 | | | | |
| 11 | Lens 5 | −282.183 | (ASP) | 0.648 | Plastic | 1.544 | 55.9 | 19.16 |
| 12 | | −10.055 | (ASP) | 0.069 | | | | |
| 13 | Lens 6 | −8.270 | (ASP) | 0.323 | Plastic | 1.548 | 49.5 | −26.80 |
| 14 | | −19.189 | (ASP) | 0.040 | | | | |
| 15 | Lens 7 | 22.280 | (ASP) | 0.550 | Plastic | 1.544 | 55.9 | 23.18 |
| 16 | | −28.759 | (ASP) | 0.506 | | | | |
| 17 | Lens 8 | 95.919 | (ASP) | 0.449 | Plastic | 1.565 | 34.0 | −23.67 |
| 18 | | 11.716 | (ASP) | 0.077 | | | | |
| 19 | Lens 9 | 2.605 | (ASP) | 0.651 | Plastic | 1.544 | 55.9 | 9.52 |
| 20 | | 4.787 | (ASP) | 1.458 | | | | |
| 21 | Lens 10 | −8.922 | (ASP) | 0.500 | Plastic | 1.544 | 55.9 | −6.06 |
| 22 | | 5.331 | (ASP) | 0.400 | | | | |
| 23 | IR-cut Filter | Plano | | 0.210 | Glass | 1.517 | 64.2 | — |
| 24 | | Plano | | 0.156 | | | | |
| 25 | Image | Plano | | 0.000 | | | | |

Note:
Reference wavelength is 587.6 nm (d-line).
An effective radius of the stop 501 (Surface 8) is 1.747 mm.
An effective radius of the image-side surface 542 (Surface 10) is 1.858 mm.
An effective radius of the object-side surface 591 (Surface 19) is 3.650 mm.

TABLE 10

Aspheric Coefficients

| Surface # | 2 | 3 | 4 | 5 | 6 |
|---|---|---|---|---|---|
| k = | 0.0000E+00 | 0.0000E+00 | −5.5599E−01 | −9.4677E+01 | 9.9000E+01 |
| A4 = | −9.6148E−04 | 1.1000E−03 | 3.9311E−02 | −1.6633E−02 | −1.7503E−02 |
| A6 = | −5.2582E−04 | −5.1250E−04 | −1.1610E−02 | 9.9845E−03 | 1.1403E−02 |
| A8 = | 3.2245E−04 | 7.7047E−04 | 1.4692E−03 | 2.3866E−03 | 4.9620E−03 |
| A10 = | −1.2429E−04 | −8.6841E−05 | −4.6584E−04 | −5.6708E−03 | −8.7207E−03 |
| A12 = | 1.2713E−06 | −2.9282E−05 | 1.1133E−04 | 2.8163E−03 | 4.2997E−03 |
| A14 = | — | — | −1.4341E−05 | −5.8923E−04 | −9.3874E−04 |
| A16 = | — | — | 5.5094E−07 | 4.6298E−05 | 7.8904E−05 |

| Surface # | 7 | 9 | 10 | 11 | 12 |
|---|---|---|---|---|---|
| k = | 5.8000E+00 | −9.3436E+01 | 2.8710E+01 | 9.9000E+01 | 0.0000E+00 |
| A4 = | −1.0666E−02 | −3.1433E−02 | −7.9835E−03 | 1.8965E−02 | −1.0506E−03 |
| A6 = | 4.5602E−03 | −1.4753E−03 | −2.5874E−02 | −2.9524E−02 | −1.0634E−02 |
| A8 = | −1.0141E−03 | 9.5486E−05 | 3.1817E−02 | 3.4658E−02 | 2.3137E−02 |
| A10 = | −6.3281E−04 | 6.9924E−04 | −2.5395E−02 | −2.8204E−02 | −2.3435E−02 |
| A12 = | 2.9375E−04 | −5.7856E−04 | 1.2187E−02 | 1.3510E−02 | 1.3202E−02 |
| A14 = | −2.6889E−05 | 2.4930E−04 | −3.2588E−03 | −3.6461E−03 | −4.4254E−03 |
| A16 = | — | −3.7249E−05 | 4.5525E−04 | 5.1782E−04 | 8.8192E−04 |
| A18 = | — | — | −2.6320E−05 | −3.0237E−05 | −9.7019E−05 |
| A20 = | — | — | — | — | 4.5535E−06 |

| Surface # | 13 | 14 | 15 | 16 | 17 |
|---|---|---|---|---|---|
| k = | −1.2230E+01 | 3.4648E+01 | 3.8332E+01 | −1.0000E+00 | 9.1532E+01 |
| A4 = | 2.4890E−04 | 3.3679E−02 | 2.3511E−02 | −2.5420E−03 | 3.7359E−02 |
| A6 = | −6.0502E−03 | −6.3170E−02 | −5.0265E−02 | −6.6426E−03 | −2.4266E−02 |
| A8 = | 1.5382E−02 | 5.1623E−02 | 3.0301E−02 | −1.1550E−03 | 3.8397E−03 |
| A10 = | −1.5221E−02 | −2.6277E−02 | −8.8556E−03 | 3.3808E−03 | 1.2409E−03 |
| A12 = | 7.3944E−03 | 7.6373E−03 | −3.6833E−04 | −1.9736E−03 | −8.4900E−04 |
| A14 = | −1.8603E−03 | −1.0832E−03 | 1.0002E−03 | 5.8231E−04 | 2.1396E−04 |
| A16 = | 2.0918E−04 | 1.6885E−05 | −2.7007E−04 | −9.3250E−05 | −2.8686E−05 |
| A18 = | −1.9830E−06 | 1.3495E−05 | 3.0704E−05 | 7.6953E−06 | 2.0061E−06 |
| A20 = | −9.7698E−07 | −1.1256E−06 | −1.3160E−06 | −2.5623E−07 | −5.7137E−08 |

| Surface # | 18 | 19 | 20 | 21 | 22 |
|---|---|---|---|---|---|
| k = | −7.7786E+00 | −1.1031E+00 | −9.8973E+00 | 1.3192E+00 | −5.9689E−01 |
| A4 = | 1.8270E−02 | −3.1780E−02 | 4.5688E−03 | −3.3054E−02 | −2.4788E−02 |
| A6 = | −2.2166E−02 | −2.8956E−03 | −9.8562E−03 | −5.1413E−04 | 1.4625E−03 |

TABLE 10-continued

| Aspheric Coefficients | | | | |
|---|---|---|---|---|
| A8 = | 8.2314E−03 | 2.2804E−03 | 3.1152E−03 | 1.0738E−03 | 1.2944E−04 |
| A10 = | −1.9400E−03 | −5.3913E−04 | −5.6029E−04 | −1.4471E−04 | −3.2090E−05 |
| A12 = | 2.9045E−04 | 6.4959E−05 | 6.2557E−05 | 9.2679E−06 | 2.8216E−06 |
| A14 = | −2.6351E−05 | −4.1826E−06 | −4.3832E−06 | −3.1459E−07 | −1.4001E−07 |
| A16 = | 1.3693E−06 | 1.3726E−07 | 1.8783E−07 | 4.8493E−09 | 4.0932E−09 |
| A18 = | −3.6185E−08 | −1.7912E−09 | −4.5040E−09 | 5.5135E−14 | −6.5465E−11 |
| A20 = | 3.4851E−10 | −8.8137E−13 | 4.6340E−11 | −6.3217E−13 | 4.4173E−13 |

In the 5th embodiment, the equation of the aspheric surface profiles of the aforementioned lens elements is the same as the equation of the 1st embodiment. Also, the definitions of these parameters shown in the following table are the same as those stated in the 1st to 4th embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.48 | Y92/BL | 5.31 |
| Fno | 1.73 | Y102/BL | 6.47 |
| HFOV [deg.] | 43.5 | Yc92/Yc82 | 1.32 |
| FOV [deg.] | 87.0 | Yc102/Yc92 | 0.85 |
| V1/N1 | 30.52 | fG1/f | 1.37 |
| V2/N2 | 36.23 | f/fG2 | −3.19 |
| V3/N3 | 13.64 | f/fG3 | 0.26 |
| V4/N4 | 11.56 | f/f1 | 0.17 |
| V5/N5 | 36.23 | |f/f1| | 0.17 |
| V6/N6 | 31.98 | f/f2 | 0.92 |
| V7/N7 | 36.23 | |f/f2| | 0.92 |
| V8/N8 | 21.72 | f/f3 | −0.40 |
| V9/N9 | 36.23 | |f/f3| | 0.40 |
| V10/N10 | 36.23 | f/f4 | −0.12 |
| Vmin | 19.1 | |f/f4| | 0.12 |
| V40 | 3 | f/f5 | 0.34 |
| V30 | 2 | |f/f5| | 0.34 |
| V20 | 1 | f/f6 | −0.24 |
| Sd/Td | 0.93 | |f/f6| | 0.24 |
| Td/ΣCT | 1.54 | f/f7 | 0.28 |
| TL/ImgH | 1.41 | |f/f7| | 0.28 |
| TL/EPD | 2.27 | f/f8 | −0.27 |
| TL/f | 1.31 | |f/f8| | 0.27 |
| TL/[ImgH × tan(CRA)] | 2.33 | f/f9 | 0.68 |
| Y11/ImgH | 0.31 | |f/f9| | 0.68 |
| Ymax/Ymin | 2.85 | f/f10 | −1.07 |
| f123/f | 1.37 | |f/f10| | 1.07 |
| f123/f456 | −0.03 | |f/R17| + |f/R18| | 3.84 |
| R18/ImgH | 0.80 | NIF | 30 |
| TL/Y92 | 2.09 | — | — |

6th Embodiment

Figure 11:
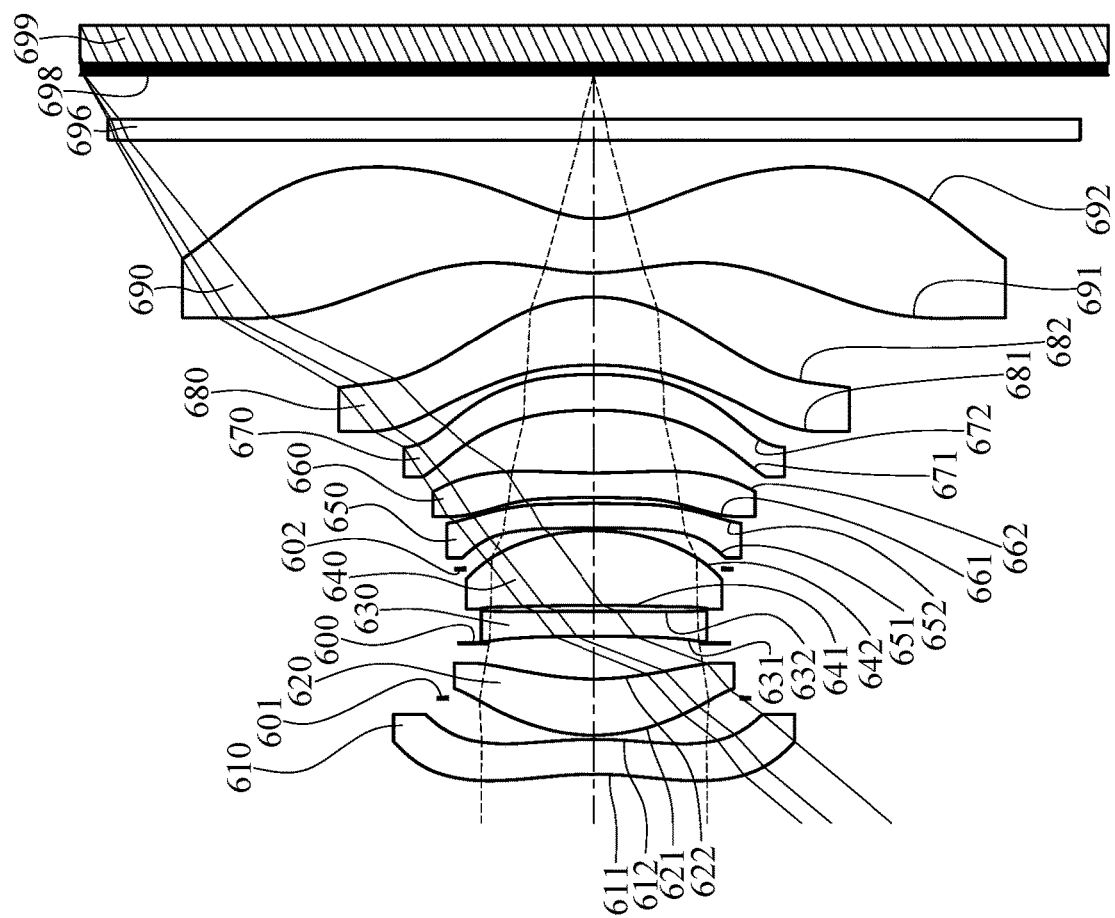
FIG. 11 is a schematic view of an image capturing unit according to the 6th embodiment of the present disclosure.
Figure 12:
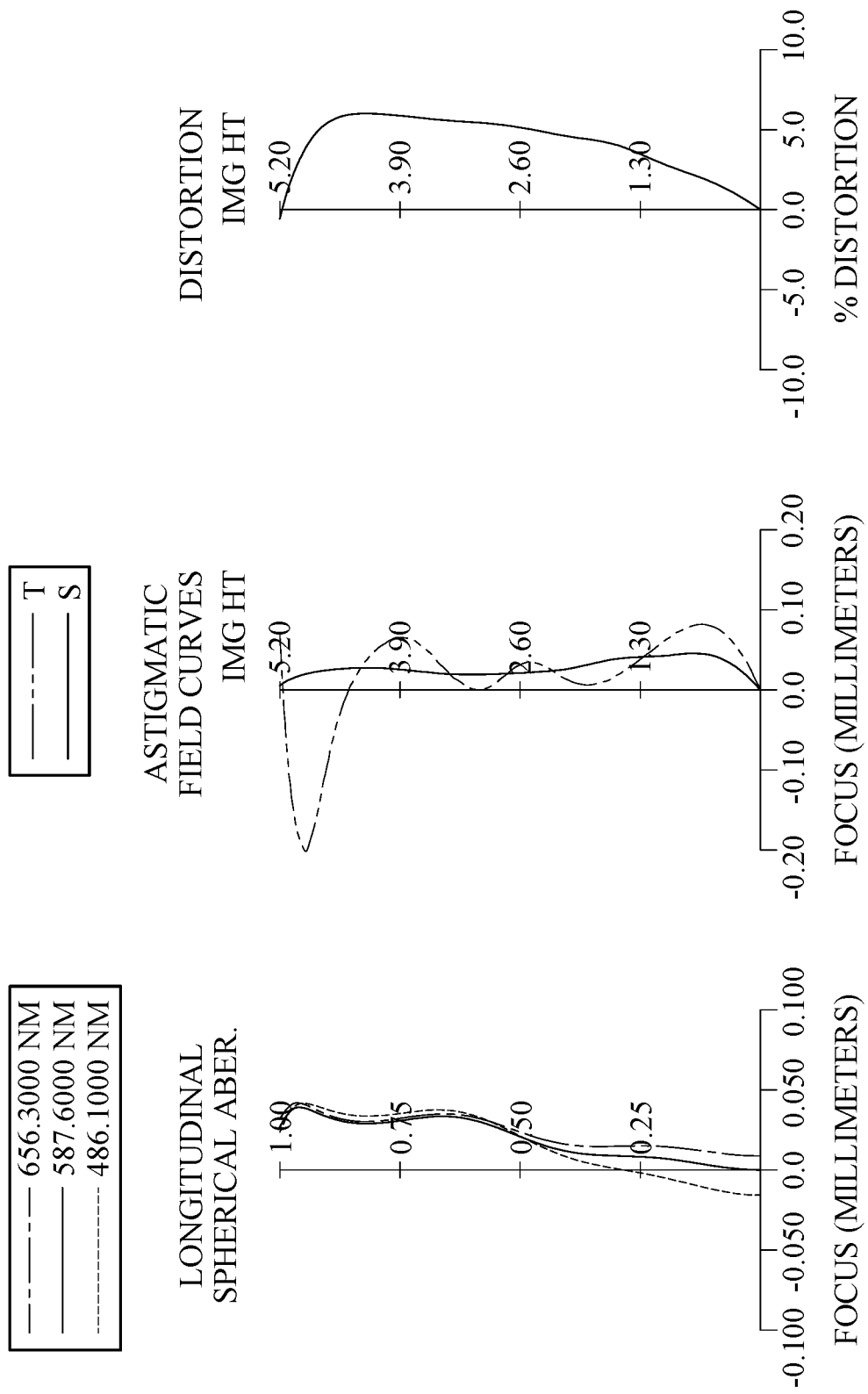
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical lens system (its reference numeral is omitted) of the present disclosure and an image sensor 699. The optical lens system includes, in order from an object side to an image side, a first lens element 610, a stop 601, a second lens element 620, an aperture stop 600, a third lens element 630, a fourth lens element 640, a stop 602, a fifth lens element 650, a sixth lens element 660, a seventh lens element 670, an eighth lens element 680, a ninth lens element 690, an IR-cut filter 696 and an image surface 698. In addition, the optical lens system has a configuration of a front lens group (the first lens element 610, the second lens element 620 and the third lens element 630), a middle lens group (the fourth lens element 640, the fifth lens element 650 and the sixth lens element 660) and a rear lens group (the seventh lens element 670, the eighth lens element 680 and the ninth lens element 690). The optical lens system includes nine lens elements (610~690) with no additional lens element disposed between each of the adjacent nine lens elements.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has two inflection points. The object-side surface 611 of the first lens element 610 has at least one convex critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has one inflection point. The image-side surface 622 of the second lens element 620 has one inflection point.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has three inflection points.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has two inflection points.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has three inflection points.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has one inflection point. The image-side surface 662 of the sixth lens element 660 has one inflection point.

The seventh lens element 670 with negative refractive power has an object-side surface 671 being concave in a paraxial region thereof and an image-side surface 672 being convex in a paraxial region thereof. The seventh lens element 670 is made of plastic material and has the object-side surface 671 and the image-side surface 672 being both aspheric. The object-side surface 671 of the seventh lens element 670 has two inflection points. The image-side surface 672 of the seventh lens element 670 has one inflection point.

The eighth lens element 680 with positive refractive power has an object-side surface 681 being concave in a paraxial region thereof and an image-side surface 682 being convex in a paraxial region thereof. The eighth lens element 680 is made of plastic material and has the object-side surface 681 and the image-side surface 682 being both aspheric. The object-side surface 681 of the eighth lens element 680 has one inflection point. The image-side surface 682 of the eighth lens element 680 has two inflection points.

The ninth lens element 690 with negative refractive power has an object-side surface 691 being convex in a paraxial region thereof and an image-side surface 692 being concave in a paraxial region thereof. The ninth lens element 690 is made of plastic material and has the object-side surface 691 and the image-side surface 692 being both aspheric. The object-side surface 691 of the ninth lens element 690 has two inflection points. The image-side surface 692 of the ninth lens element 690 has two inflection points. The object-side surface 691 of the ninth lens element 690 has at least one critical point in an off-axis region thereof. The image-side surface 692 of the ninth lens element 690 has at least one critical point in an off-axis region thereof.

The IR-cut filter 696 is made of glass material and located between the ninth lens element 690 and the image surface 698, and will not affect the focal length of the optical lens system. The image sensor 699 is disposed on or near the image surface 698 of the optical lens system.

The detailed optical data of the 6th embodiment are shown in Table 11 and the aspheric surface data are shown in Table 12 below.

TABLE 11

6th Embodiment
f = 4.37 mm, Fno = 1.90, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.399 | (ASP) | 0.354 | Plastic | 1.544 | 56.0 | −49.72 |
| 2 | | −4.030 | (ASP) | 0.418 | | | | |
| 3 | Stop | Plano | | −0.376 | | | | |
| 4 | Lens 2 | 1.831 | (ASP) | 0.573 | Plastic | 1.562 | 43.2 | 7.80 |
| 5 | | 2.790 | (ASP) | 0.362 | | | | |
| 6 | Ape. Stop | Plano | | 0.071 | | | | |
| 7 | Lens 3 | −138.708 | (ASP) | 0.261 | Plastic | 1.562 | 43.2 | −143.75 |
| 8 | | 193.583 | (ASP) | 0.061 | | | | |
| 9 | Lens 4 | −27.403 | (ASP) | 0.757 | Plastic | 1.544 | 56.0 | 4.93 |
| 10 | | −2.467 | (ASP) | −0.388 | | | | |
| 11 | Stop | Plano | | 0.418 | | | | |
| 12 | Lens 5 | −24.338 | (ASP) | 0.250 | Plastic | 1.705 | 14.0 | 14.48 |
| 13 | | −7.223 | (ASP) | 0.060 | | | | |
| 14 | Lens 6 | −6.777 | (ASP) | 0.252 | Plastic | 1.672 | 15.8 | −5.71 |
| 15 | | 8.983 | (ASP) | 0.635 | | | | |
| 16 | Lens 7 | −3.768 | (ASP) | 0.364 | Plastic | 1.669 | 19.4 | −40.13 |
| 17 | | −4.553 | (ASP) | 0.095 | | | | |
| 18 | Lens 8 | −4.045 | (ASP) | 0.700 | Plastic | 1.544 | 56.0 | 4.94 |
| 19 | | −1.713 | (ASP) | 0.245 | | | | |
| 20 | Lens 9 | 1.886 | (ASP) | 0.554 | Plastic | 1.559 | 40.4 | −5.74 |
| 21 | | 1.062 | (ASP) | 0.800 | | | | |
| 22 | IR-cut Filter | Plano | | 0.210 | Glass | 1.517 | 64.2 | — |
| 23 | | Plano | | 0.247 | | | | |
| 24 | Image | Plano | | 0.000 | | | | |

Note:
Reference wavelength is 587.6 nm (d-line).
An effective radius of the stop 601 (Surface 3) is 1.500 mm.
An effective radius of the stop 602 (Surface 11) is 1.320 mm.
An effective radius of the image-side surface 662 (Surface 15) is 1.641 mm.

TABLE 12

Aspheric Coefficients

| Surface # | 1 | 2 | 4 | 5 | 7 |
|---|---|---|---|---|---|
| k = | −3.1763E+01 | −1.8678E+01 | 3.5714E−01 | −1.2827E+01 | 0.0000E+00 |
| A4 = | 3.7244E−02 | 8.5518E−02 | −5.7941E−02 | −8.7577E−03 | −5.9168E−02 |

TABLE 12-continued

| Aspheric Coefficients | | | | | |
|---|---|---|---|---|---|
| A6 = | −1.0429E−02 | −8.5860E−02 | 1.2295E−02 | −2.4800E−02 | 6.0477E−02 |
| A8 = | 1.4093E−02 | 1.3572E−01 | 3.0304E−03 | 1.9599E−01 | −7.2738E−02 |
| A10 = | −1.2511E−02 | −1.4523E−01 | −1.1473E−02 | −5.7863E−01 | 8.2985E−02 |
| A12 = | 6.9838E−03 | 1.0341E−01 | 5.5832E−03 | 9.2493E−01 | −6.4699E−02 |
| A14 = | −2.4133E−03 | −4.7587E−02 | −1.5189E−03 | −8.7802E−01 | 1.9029E−02 |
| A16 = | 5.0284E−04 | 1.3558E−02 | — | 4.9042E−01 | — |
| A18 = | −5.7461E−05 | −2.1599E−03 | — | −1.4885E−01 | — |
| A20 = | 2.7400E−06 | 1.4574E−04 | — | 1.8947E−02 | — |

| Surface # | 8 | 9 | 10 | 12 | 13 |
|---|---|---|---|---|---|
| k = | 0.0000E+00 | 0.0000E+00 | −1.4519E+01 | −8.9940E+01 | 1.7196E+00 |
| A4 = | −6.5746E−02 | −3.0706E−02 | −1.5548E−01 | 1.8748E−02 | 3.1780E−01 |
| A6 = | 1.0890E−01 | 4.4469E−02 | 3.1139E−02 | −3.4907E−01 | −1.0554E+00 |
| A8 = | −2.6873E−02 | 4.8744E−02 | 2.1105E−01 | 7.0875E−01 | 1.4795E+00 |
| A10 = | −4.1010E−02 | −1.2363E−01 | −4.0610E−01 | −7.5096E−01 | −1.1411E+00 |
| A12 = | 3.0209E−02 | 8.5100E−02 | 3.2311E−01 | 4.1421E−01 | 5.0024E−01 |
| A14 = | −7.5845E−03 | −2.2913E−02 | −1.2311E−01 | −1.1589E−01 | −1.1651E−01 |
| A16 = | — | — | 1.8222E−02 | 1.3263E−02 | 1.1210E−02 |

| Surface # | 14 | 15 | 16 | 17 | 18 |
|---|---|---|---|---|---|
| k = | 7.6506E+00 | 1.4595E+01 | −3.6230E+00 | 0.0000E+00 | 4.5225E−01 |
| A4 = | 2.8406E−01 | 4.2408E−03 | −6.0345E−02 | −1.4703E−01 | −1.2865E−01 |
| A6 = | −9.5695E−01 | −1.8903E−01 | 6.7894E−02 | 1.9098E−01 | 1.1341E−01 |
| A8 = | 1.1955E+00 | 2.5915E−01 | −1.3499E−01 | −2.4743E−01 | −3.8812E−02 |
| A10 = | −7.8902E−01 | −2.0146E−01 | 1.3505E−01 | 2.1899E−01 | −2.8531E−03 |
| A12 = | 2.9815E−01 | 9.7161E−02 | −7.5687E−02 | −1.2598E−01 | 6.7853E−03 |
| A14 = | −6.1047E−02 | −2.8924E−02 | 2.4244E−02 | 4.5603E−02 | −2.3287E−03 |
| A16 = | 5.2597E−03 | 4.8481E−03 | −4.0912E−03 | −9.8514E−03 | 3.8560E−04 |
| A18 = | — | −3.3532E−04 | 2.8001E−04 | 1.1543E−03 | −3.2398E−05 |
| A20 = | — | −3.3938E−06 | — | −5.6441E−05 | 1.1066E−06 |

| Surface # | 19 | 20 | 21 |
|---|---|---|---|
| k = | −4.5773E+00 | −1.5742E+01 | −3.8031E+00 |
| A4 = | −1.4972E−01 | −7.1715E−02 | −4.9895E−02 |
| A6 = | 1.2736E−01 | 1.5729E−02 | 1.2417E−02 |
| A8 = | −6.5458E−02 | −1.5654E−03 | −2.0414E−03 |
| A10 = | 2.2466E−02 | 1.6687E−06 | 2.1392E−04 |
| A12 = | −4.9016E−03 | 1.9655E−05 | −1.4114E−05 |
| A14 = | 6.6257E−04 | −2.4667E−06 | 5.4116E−07 |
| A16 = | −5.3615E−05 | 1.4721E−07 | −9.3316E−09 |
| A18 = | 2.3805E−06 | −4.4777E−09 | −2.3253E−11 |
| A20 = | −4.4850E−08 | 5.5706E−11 | 2.0650E−12 |

In the 6th embodiment, the equation of the aspheric surface profiles of the aforementioned lens elements is the same as the equation of the 1st embodiment. Also, the definitions of these parameters shown in the following table are the same as those stated in the 1st to 5th embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.37 | Yc11/Y11 | 0.52 |
| Fno | 1.90 | R18/ImgH | 0.20 |
| HFOV [deg.] | 50.0 | TL/Y92 | 1.70 |
| FOV [deg.] | 100.0 | Y92/BL | 2.88 |
| V1/N1 | 36.26 | fG1/f | 2.17 |
| V2/N2 | 27.66 | f/fG2 | 0.17 |
| V3/N3 | 27.66 | f/fG3 | 0.45 |
| V4/N4 | 36.26 | f/f1 | −0.09 |
| V5/N5 | 8.21 | |f/f1| | 0.09 |
| V6/N6 | 9.44 | f/f2 | 0.56 |
| V7/N7 | 11.65 | |f/f2| | 0.56 |
| V8/N8 | 36.26 | f/f3 | −0.03 |
| V9/N9 | 25.95 | |f/f3| | 0.03 |

-continued

| 6th Embodiment | | | |
|---|---|---|---|
| Vmin | 14.0 | f/f4 | 0.89 |
| V40 | 3 | |f/f4| | 0.89 |
| V30 | 3 | f/f5 | 0.30 |
| V20 | 3 | |f/f5| | 0.30 |
| Sd/Td | 0.77 | f/f6 | −0.77 |
| Td/ΣCT | 1.39 | |f/f6| | 0.77 |
| TL/ImgH | 1.37 | f/f7 | −0.11 |
| TL/EPD | 3.10 | |f/f7| | 0.11 |
| TL/f | 1.63 | f/f8 | 0.89 |
| TL/[ImgH × tan(CRA)] | 2.17 | |f/f8| | 0.89 |
| Y11/ImgH | 0.39 | f/f9 | −0.76 |
| Ymax/Ymin | 3.93 | |f/f9| | 0.76 |
| f123/f | 2.17 | |f/R17| + |f/R18| | 6.43 |
| f123/f456 | 0.98 | NIF | 25 |

7th Embodiment

Figure 13:
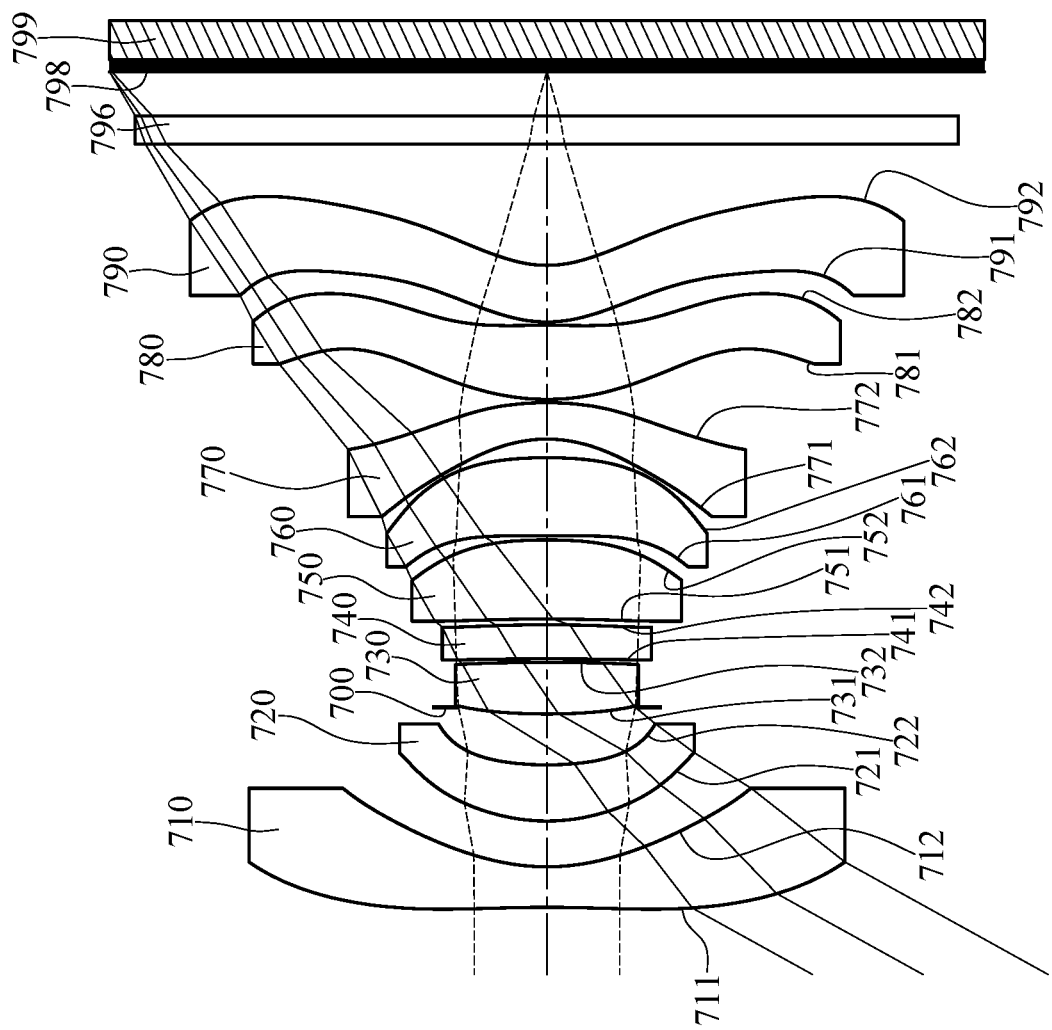
FIG. 13 is a schematic view of an image capturing unit according to the 7th embodiment of the present disclosure.
Figure 14:
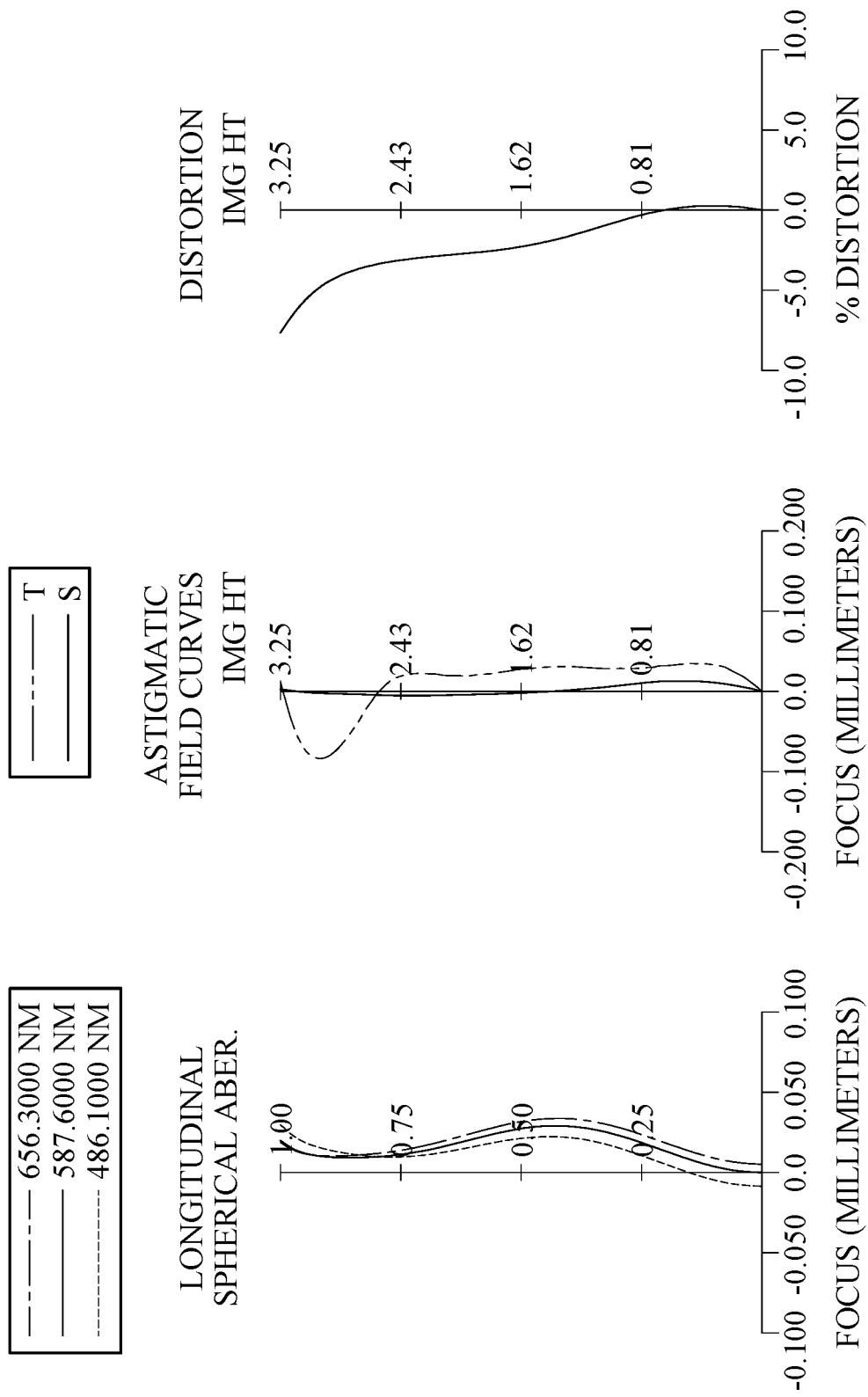
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical lens system (its reference numeral is omitted) of the present disclosure and an image sensor 799. The optical lens system includes, in order from an object side to an image side, a first lens element 710, a second lens element 720, an aperture stop 700, a third lens element 730, a fourth lens element 740, a fifth lens element 750, a sixth lens element 760, a seventh lens element 770, an eighth lens element 780, a ninth lens element 790, an IR-cut filter 796 and an image surface 798. In addition, the optical lens system has a configuration of a front lens group (the first lens element 710, the second lens element 720 and the third lens element 730), a middle lens group (the fourth lens element 740, the fifth lens element 750 and the sixth lens element 760) and a rear lens group (the seventh lens element 770, the eighth lens element 780 and the ninth lens element 790). The optical lens system includes nine lens elements (710~790) with no additional lens element disposed between each of the adjacent nine lens elements.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The object-side surface 711 of the first lens element 710 has at least one convex critical point in an off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has one inflection point.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has one inflection point. The image-side surface 742 of the fourth lens element 740 has one inflection point.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has one inflection point.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has two inflection points. The image-side surface 762 of the sixth lens element 760 has one inflection point.

The seventh lens element 770 with negative refractive power has an object-side surface 771 being concave in a paraxial region thereof and an image-side surface 772 being convex in a paraxial region thereof. The seventh lens element 770 is made of plastic material and has the object-side surface 771 and the image-side surface 772 being both aspheric. The image-side surface 772 of the seventh lens element 770 has two inflection points.

The eighth lens element 780 with positive refractive power has an object-side surface 781 being convex in a paraxial region thereof and an image-side surface 782 being convex in a paraxial region thereof. The eighth lens element 780 is made of plastic material and has the object-side surface 781 and the image-side surface 782 being both aspheric. The object-side surface 781 of the eighth lens element 780 has two inflection points. The image-side surface 782 of the eighth lens element 780 has two inflection points. The object-side surface 781 of the eighth lens element 780 has at least one critical point in an off-axis region thereof. The image-side surface 782 of the eighth lens element 780 has at least one critical point in an off-axis region thereof.

The ninth lens element 790 with positive refractive power has an object-side surface 791 being convex in a paraxial region thereof and an image-side surface 792 being concave in a paraxial region thereof. The ninth lens element 790 is made of plastic material and has the object-side surface 791 and the image-side surface 792 being both aspheric. The object-side surface 791 of the ninth lens element 790 has one inflection point. The image-side surface 792 of the ninth lens element 790 has one inflection point. The object-side surface 791 of the ninth lens element 790 has at least one critical point in an off-axis region thereof. The image-side surface 792 of the ninth lens element 790 has at least one critical point in an off-axis region thereof.

The IR-cut filter 796 is made of glass material and located between the ninth lens element 790 and the image surface 798, and will not affect the focal length of the optical lens system. The image sensor 799 is disposed on or near the image surface 798 of the optical lens system.

The detailed optical data of the 7th embodiment are shown in Table 13 and the aspheric surface data are shown in Table 14 below.

TABLE 13

7th Embodiment
f = 1.94 mm, Fno = 1.80, HFOV = 61.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −9.253 | (ASP) | 0.300 | Plastic | 1.515 | 56.4 | −2.60 |
| 2 | | 1.585 | (ASP) | 0.340 | | | | |
| 3 | Lens 2 | 1.416 | (ASP) | 0.417 | Plastic | 1.603 | 28.5 | 4.83 |
| 4 | | 2.449 | (ASP) | 0.428 | | | | |

TABLE 13-continued

7th Embodiment
f = 1.94 mm, Fno = 1.80, HFOV = 61.0 deg.

| Surface # | | Curvature Radius | | Thickness | Material | Index | Abbe # | Focal Length |
|---|---|---|---|---|---|---|---|---|
| 5 | Ape. Stop | Plano | | −0.050 | | | | |
| 6 | Lens 3 | 4.816 | (ASP) | 0.383 | Plastic | 1.561 | 44.9 | 6.68 |
| 7 | | −16.463 | (ASP) | 0.026 | | | | |
| 8 | Lens 4 | −34.681 | (ASP) | 0.253 | Plastic | 1.705 | 14.0 | 21.68 |
| 9 | | −10.642 | (ASP) | 0.043 | | | | |
| 10 | Lens 5 | −12.975 | (ASP) | 0.587 | Plastic | 1.544 | 55.9 | 9.75 |
| 11 | | −3.823 | (ASP) | 0.029 | | | | |
| 12 | Lens 6 | 13.918 | (ASP) | 0.581 | Plastic | 1.544 | 55.9 | 5.14 |
| 13 | | −3.442 | (ASP) | 0.138 | | | | |
| 14 | Lens 7 | −1.019 | (ASP) | 0.270 | Plastic | 1.705 | 14.0 | −2.63 |
| 15 | | −2.508 | (ASP) | 0.025 | | | | |
| 16 | Lens 8 | 1.721 | (ASP) | 0.550 | Plastic | 1.544 | 55.9 | 2.68 |
| 17 | | −8.460 | (ASP) | 0.025 | | | | |
| 18 | Lens 9 | 0.961 | (ASP) | 0.420 | Plastic | 1.686 | 18.4 | 22.10 |
| 19 | | 0.844 | (ASP) | 0.900 | | | | |
| 20 | IR-cut Filter | Plano | | 0.210 | Glass | 1.517 | 64.2 | — |
| 21 | | Plano | | 0.326 | | | | |
| 22 | Image | Plano | | 0.000 | | | | |

Note:
Reference wavelength is 587.6 nm (d-line).
An effective radius of the image-side surface 752 (Surface 11) is 1.641 mm.

TABLE 14

Aspheric Coefficients

| Surface # | 1 | 2 | 3 | 4 | 6 |
|---|---|---|---|---|---|
| k = | −9.9000E+01 | −1.1771E+00 | −1.3175E−01 | 1.2504E+00 | 1.0644E+01 |
| A4 = | 4.5384E−02 | −7.1232E−02 | −6.1680E−02 | 1.7384E−01 | 2.2696E−02 |
| A6 = | −1.3036E−02 | 5.4256E−02 | 4.8706E−02 | 1.2218E−01 | 2.4872E−01 |
| A8 = | 2.2684E−03 | −3.1587E−02 | 3.0972E−02 | 1.6907E−01 | −8.0017E−01 |
| A10 = | 5.7127E−05 | 1.0229E−02 | 3.5091E−02 | 1.3801E−01 | 1.4222E+00 |
| A12 = | −9.5168E−05 | −1.1484E−03 | −4.5936E−02 | 1.2989E−01 | −9.5420E−01 |
| A14 = | 1.5751E−05 | — | — | — | — |
| A16 = | −8.6958E−07 | — | — | — | — |

| Surface # | 7 | 8 | 9 | 10 | 11 |
|---|---|---|---|---|---|
| k = | −1.3209E+02 | −9.0000E+01 | 1.1011E+01 | −9.0000E+01 | −8.3462E+01 |
| A4 = | −3.7929E−03 | −8.0903E−03 | 5.8780E−04 | 9.3497E−03 | −4.3391E−01 |
| A6 = | −2.5504E−02 | −9.9521E−03 | 2.5898E−02 | −1.3547E−03 | 4.4622E−01 |
| A8 = | −2.1902E−02 | −7.3864E−04 | 2.1032E−02 | 1.1352E−02 | −4.8801E−01 |
| A10 = | −4.6500E−02 | 3.7562E−02 | 1.5374E−02 | 1.4705E−02 | 3.4653E−01 |
| A12 = | 1.1864E−01 | 3.1735E−02 | 2.4543E−02 | −4.7343E−03 | −9.8873E−02 |

| Surface # | 12 | 13 | 14 | 15 | 16 |
|---|---|---|---|---|---|
| k = | −9.0000E+01 | −6.0303E+00 | −2.4609E+00 | 9.4936E−01 | −4.2285E+00 |
| A4 = | −3.0722E−01 | −2.2022E−01 | −1.0153E−01 | −2.3031E−01 | 4.9015E−02 |
| A6 = | 2.4243E−01 | −1.6193E−01 | −9.1813E−03 | 4.2617E−01 | −1.6168E−02 |
| A8 = | −3.4992E−01 | 6.5946E−01 | 6.2771E−01 | −2.6914E−01 | −3.0452E−02 |
| A10 = | 2.6155E−01 | −8.6722E−01 | −1.0588E+00 | 6.2959E−02 | 1.9657E−02 |
| A12 = | 1.5498E−02 | 5.1168E−01 | 7.0239E−01 | 1.0890E−02 | −5.2042E−03 |
| A14 = | −1.6935E−01 | −1.3786E−01 | −1.9386E−01 | −7.7969E−03 | 6.8256E−04 |
| A16 = | 8.2569E−02 | 1.5680E−02 | 1.5224E−02 | 1.0161E−03 | −3.6504E−05 |

| Surface # | 17 | 18 | 19 |
|---|---|---|---|
| k = | −3.5452E+01 | −1.4298E+00 | −3.0786E+00 |
| A4 = | 3.9169E−01 | −3.0486E−01 | −1.1820E−01 |
| A6 = | −3.2789E−01 | 1.9978E−01 | 4.0393E−02 |
| A8 = | 1.3475E−01 | −1.3080E−01 | −5.1519E−03 |
| A10 = | −3.1783E−02 | 7.1937E−02 | −2.9329E−05 |
| A12 = | 4.2553E−03 | −2.6665E−02 | −6.9599E−05 |
| A14 = | −2.9887E−04 | 6.2276E−03 | 5.4905E−05 |
| A16 = | 8.5544E−06 | −8.8334E−04 | −1.0440E−05 |
| A18 = | — | 6.9623E−05 | 8.4381E−07 |
| A20 = | — | −2.3386E−06 | −2.5619E−08 |

In the 7th embodiment, the equation of the aspheric surface profiles of the aforementioned lens elements is the same as the equation of the 1st embodiment. Also, the definitions of these parameters shown in the following table are the same as those stated in the 1st to 6th embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.94 | R18/ImgH | 0.26 |
| Fno | 1.80 | TL/Y92 | 2.34 |
| HFOV [deg.] | 61.0 | Y92/BL | 1.84 |
| FOV [deg.] | 122.0 | Yc92/Yc82 | 1.28 |
| V1/N1 | 37.25 | fG1/f | 95.65 |
| V2/N2 | 17.78 | f/fG2 | 0.21 |
| V3/N3 | 28.76 | f/fG3 | 0.64 |
| V4/N4 | 8.21 | f/f1 | −0.75 |
| V5/N5 | 36.23 | |f/f1| | 0.75 |
| V6/N6 | 36.23 | f/f2 | 0.40 |
| V7/N7 | 8.21 | |f/f2| | 0.40 |
| V8/N8 | 36.23 | f/f3 | 0.29 |
| V9/N9 | 10.91 | |f/f3| | 0.29 |
| Vmin | 14.0 | f/f4 | 0.09 |
| V40 | 4 | |f/f4| | 0.09 |
| V30 | 4 | f/f5 | 0.20 |
| V20 | 3 | |f/f5| | 0.20 |
| Sd/Td | 0.69 | f/f6 | 0.38 |
| Td/ΣCT | 1.27 | |f/f6| | 0.38 |
| TL/ImgH | 1.91 | f/f7 | −0.74 |
| TL/EPD | 5.75 | |f/f7| | 0.74 |
| TL/f | 3.20 | f/f8 | 0.72 |
| TL/[ImgH × tan(CRA)] | 2.66 | |f/f8| | 0.72 |
| Y11/ImgH | 0.68 | f/f9 | 0.09 |
| Ymax/Ymin | 4.02 | |f/f9| | 0.09 |
| f123/f | 95.65 | |f/R17| + |f/R18| | 4.32 |
| f123/f456 | 61.49 | NIF | 16 |
| Yc11/Y11 | 0.35 | — | — |

8th Embodiment

Figure 15:
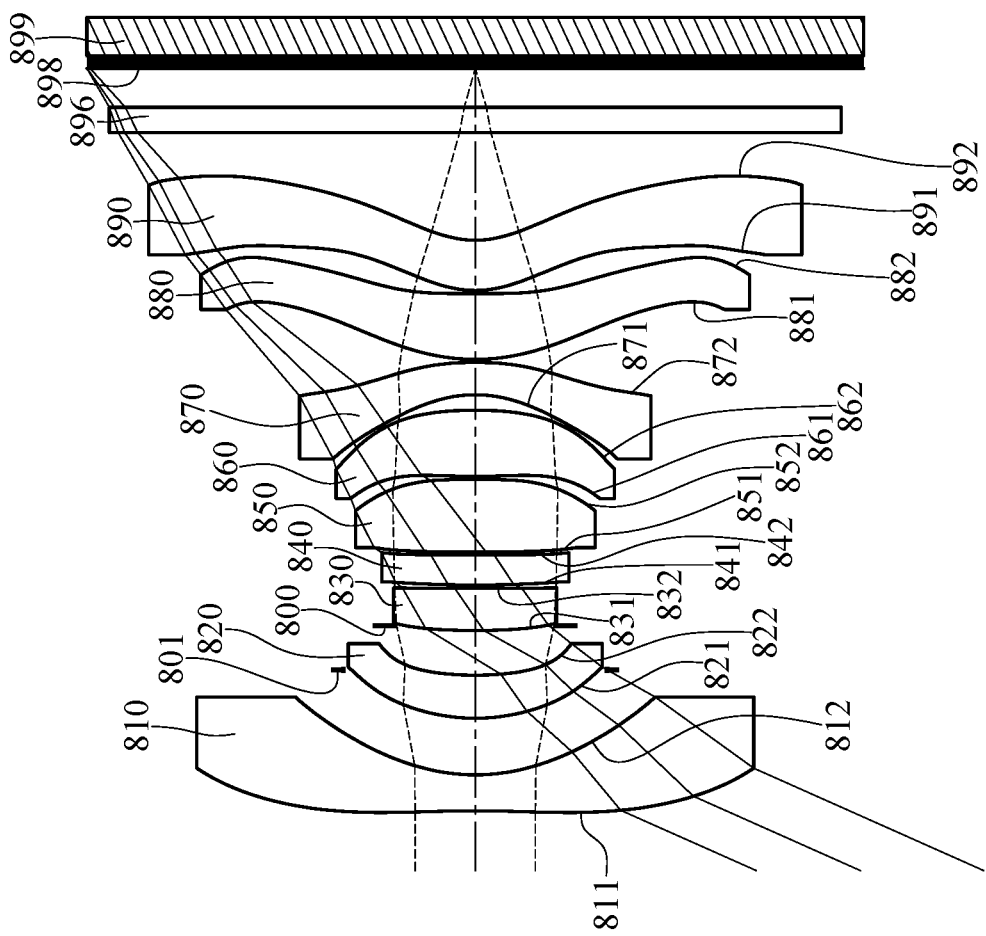
FIG. 15 is a schematic view of an image capturing unit according to the 8th embodiment of the present disclosure.
Figure 16:
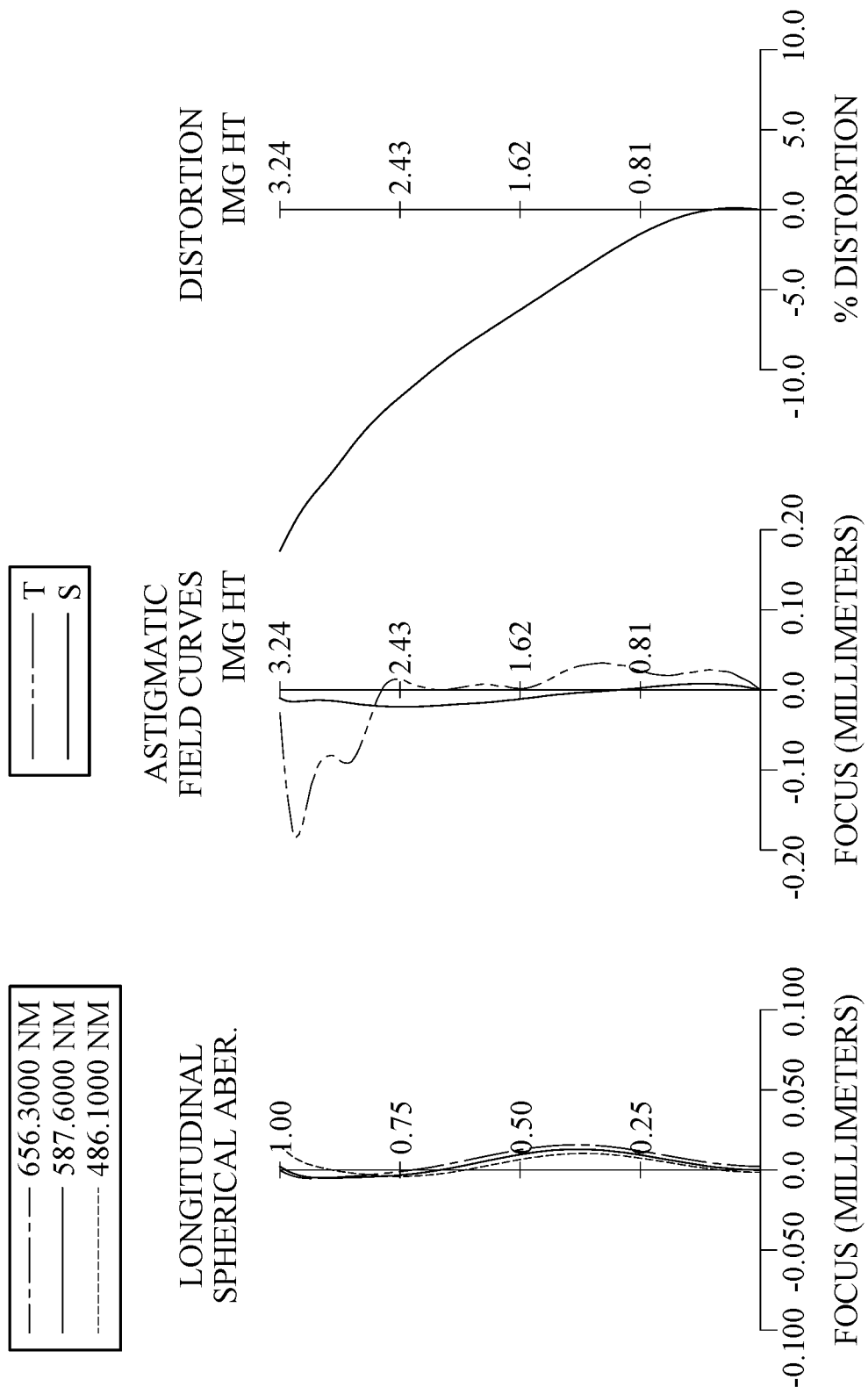
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical lens system (its reference numeral is omitted) of the present disclosure and an image sensor 899. The optical lens system includes, in order from an object side to an image side, a first lens element 810, a stop 801, a second lens element 820, an aperture stop 800, a third lens element 830, a fourth lens element 840, a fifth lens element 850, a sixth lens element 860, a seventh lens element 870, an eighth lens element 880, a ninth lens element 890, an IR-cut filter 896 and an image surface 898. In addition, the optical lens system has a configuration of a front lens group (the first lens element 810, the second lens element 820 and the third lens element 830), a middle lens group (the fourth lens element 840, the fifth lens element 850 and the sixth lens element 860) and a rear lens group (the seventh lens element 870, the eighth lens element 880 and the ninth lens element 890). The optical lens system includes nine lens elements (810~890) with no additional lens element disposed between each of the adjacent nine lens elements.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has one inflection point. The object-side surface 811 of the first lens element 810 has at least one convex critical point in an off-axis region thereof.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has one inflection point.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has one inflection point.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has two inflection points. The image-side surface 862 of the sixth lens element 860 has one inflection point.

The seventh lens element 870 with negative refractive power has an object-side surface 871 being concave in a paraxial region thereof and an image-side surface 872 being convex in a paraxial region thereof. The seventh lens element 870 is made of plastic material and has the object-side surface 871 and the image-side surface 872 being both aspheric. The image-side surface 872 of the seventh lens element 870 has two inflection points.

The eighth lens element 880 with positive refractive power has an object-side surface 881 being convex in a paraxial region thereof and an image-side surface 882 being convex in a paraxial region thereof. The eighth lens element 880 is made of plastic material and has the object-side surface 881 and the image-side surface 882 being both aspheric. The object-side surface 881 of the eighth lens element 880 has one inflection point. The image-side surface 882 of the eighth lens element 880 has two inflection points. The object-side surface 881 of the eighth lens element 880 has at least one critical point in an off-axis region thereof. The image-side surface 882 of the eighth lens element 880 has at least one critical point in an off-axis region thereof.

The ninth lens element 890 with positive refractive power has an object-side surface 891 being convex in a paraxial region thereof and an image-side surface 892 being concave in a paraxial region thereof. The ninth lens element 890 is made of plastic material and has the object-side surface 891 and the image-side surface 892 being both aspheric. The object-side surface 891 of the ninth lens element 890 has three inflection points. The image-side surface 892 of the ninth lens element 890 has one inflection point. The object-side surface 891 of the ninth lens element 890 has at least one critical point in an off-axis region thereof. The image-side surface 892 of the ninth lens element 890 has at least one critical point in an off-axis region thereof.

The IR-cut filter 896 is made of glass material and located between the ninth lens element 890 and the image surface 898, and will not affect the focal length of the optical lens system. The image sensor 899 is disposed on or near the image surface 898 of the optical lens system.

The detailed optical data of the 8th embodiment are shown in Table 15 and the aspheric surface data are shown in Table 16 below.

TABLE 15

8th Embodiment
f = 1.84 mm, Fno = 1.83, HFOV = 66.0 deg.

| Surface # |  | Curvature Radius |  | Thickness | Material | Index | Abbe # | Focal Length |
|---|---|---|---|---|---|---|---|---|
| 0 | Object | Plano | | Infinity | | | | |
| 1 | Lens 1 | −9.737 | (ASP) | 0.300 | Plastic | 1.544 | 56.0 | −2.51 |
| 2 | | 1.606 | (ASP) | 0.877 | | | | |
| 3 | Stop | Plano | | −0.404 | | | | |
| 4 | Lens 2 | 1.586 | (ASP) | 0.360 | Plastic | 1.603 | 28.5 | 5.44 |
| 5 | | 2.809 | (ASP) | 0.413 | | | | |
| 6 | Ape. Stop | Plano | | −0.040 | | | | |
| 7 | Lens 3 | 5.752 | (ASP) | 0.355 | Plastic | 1.559 | 40.4 | 9.75 |
| 8 | | −100.000 | (ASP) | 0.025 | | | | |
| 9 | Lens 4 | 9.623 | (ASP) | 0.250 | Plastic | 1.705 | 14.0 | 18.45 |
| 10 | | 36.593 | (ASP) | 0.025 | | | | |
| 11 | Lens 5 | 22.262 | (ASP) | 0.607 | Plastic | 1.544 | 56.0 | 17.47 |
| 12 | | −16.431 | (ASP) | 0.025 | | | | |
| 13 | Lens 6 | 4.226 | (ASP) | 0.553 | Plastic | 1.544 | 56.0 | 3.36 |
| 14 | | −3.073 | (ASP) | 0.129 | | | | |
| 15 | Lens 7 | −1.040 | (ASP) | 0.270 | Plastic | 1.705 | 14.0 | −2.52 |
| 16 | | −2.770 | (ASP) | 0.025 | | | | |
| 17 | Lens 8 | 1.694 | (ASP) | 0.550 | Plastic | 1.544 | 56.0 | 3.06 |
| 18 | | −82.250 | (ASP) | 0.025 | | | | |
| 19 | Lens 9 | 0.851 | (ASP) | 0.420 | Plastic | 1.607 | 26.6 | 9.60 |
| 20 | | 0.810 | (ASP) | 0.900 | | | | |
| 21 | IR-cut Filter | Plano | | 0.210 | Glass | 1.517 | 64.2 | — |
| 22 | | Plano | | 0.325 | | | | |
| 23 | Image | Plano | | 0.000 | | | | |

Note:
Reference wavelength is 587.6 nm (d-line).
An effective radius of the stop 801 (Surface 3) is 1.100 mm.
An effective radius of the image-side surface 852 (Surface 12) is 1.000 mm.

TABLE 16

Aspheric Coefficients

| Surface # | 1 | 2 | 4 | 5 | 7 |
|---|---|---|---|---|---|
| k = | −9.9000E+01 | −7.3530E−01 | −1.5542E−02 | −2.2508E+00 | 2.2028E+01 |
| A4 = | 4.1561E−02 | −5.1039E−02 | −5.9465E−02 | 1.5287E−01 | 4.1487E−02 |
| A6 = | −1.0786E−02 | 4.7740E−02 | 6.9452E−02 | 1.6362E−01 | 2.2306E−01 |
| A8 = | 1.4270E−03 | −3.2797E−02 | 3.1088E−02 | 1.9381E−01 | −7.6575E−01 |
| A10 = | 1.5132E−04 | 1.0588E−02 | 3.5147E−02 | −7.0816E−02 | 1.5440E+00 |
| A12 = | −7.6974E−05 | −1.1727E−03 | −5.6892E−02 | 2.7099E−01 | −1.0668E+00 |
| A14 = | 9.6940E−06 | — | — | — | — |
| A16 = | −4.1351E−07 | — | — | — | — |

| Surface # | 8 | 9 | 10 | 11 | 12 |
|---|---|---|---|---|---|
| k = | −9.0000E+01 | −2.1727E+01 | −3.5740E+01 | −7.3760E+01 | −3.9242E+01 |
| A4 = | 2.1511E−02 | −4.4415E−03 | −3.7344E−03 | 2.9832E−03 | −4.3340E−01 |
| A6 = | −2.8098E−02 | 5.1928E−03 | 4.6416E−02 | −3.8651E−03 | 4.4484E−01 |
| A8 = | 1.3833E−02 | 4.9030E−04 | 2.2994E−02 | 2.6758E−02 | −4.9113E−01 |
| A10 = | −7.6049E−04 | −3.2805E−04 | −2.5933E−03 | 4.1357E−02 | 3.4516E−01 |
| A12 = | 7.9684E−02 | −4.3063E−03 | −1.6788E−02 | −4.8197E−02 | −9.6778E−02 |

| Surface # | 13 | 14 | 15 | 16 | 17 |
|---|---|---|---|---|---|
| k = | −7.3785E+01 | −1.3321E+01 | −2.5779E+00 | 1.1823E+00 | −3.7547E+00 |
| A4 = | −3.2166E−01 | −1.4576E−01 | −1.2746E−02 | −2.2247E−01 | 6.3620E−02 |

TABLE 16-continued

| Aspheric Coefficients | | | | | |
|---|---|---|---|---|---|
| A6 = | 2.1187E−01 | −3.0991E−01 | −2.2671E−01 | 4.2920E−01 | −6.7763E−02 |
| A8 = | −9.2190E−02 | 5.2317E−01 | 7.2752E−01 | −2.9442E−01 | 1.8006E−02 |
| A10 = | −3.4918E−01 | −1.6948E−01 | −8.0456E−01 | 1.0047E−01 | 1.4198E−03 |
| A12 = | 7.1527E−01 | −3.3707E−01 | 2.9930E−01 | −1.0458E−02 | −1.6411E−03 |
| A14 = | −5.6465E−01 | 3.2199E−01 | 3.8876E−02 | −3.0970E−03 | 2.9371E−04 |
| A16 = | 1.7168E−01 | −7.8719E−02 | −3.5632E−02 | 7.1594E−04 | −1.7109E−05 |

| Surface # | 18 | 19 | 20 |
|---|---|---|---|
| k = | −9.0000E+01 | −1.4920E+00 | −2.7062E+00 |
| A4 = | 3.4564E−01 | −3.6156E−01 | −1.5043E−01 |
| A6 = | −3.3068E−01 | 2.6346E−01 | 6.7489E−02 |
| A8 = | 1.5453E−01 | −1.7477E−01 | −1.7689E−02 |
| A10 = | −4.0010E−02 | 8.8528E−02 | 3.3237E−03 |
| A12 = | 5.7236E−03 | −2.8960E−02 | −5.5787E−04 |
| A14 = | −4.2081E−04 | 5.8080E−03 | 7.9861E−05 |
| A16 = | 1.2302E−05 | −6.8847E−04 | −7.6730E−06 |
| A18 = | — | 4.4227E−05 | 4.0370E−07 |
| A20 = | — | −1.1860E−06 | −8.7794E−09 |

In the 8th embodiment, the equation of the aspheric surface profiles of the aforementioned lens elements is the same as the equation of the 1st embodiment. Also, the definitions of these parameters shown in the following table are the same as those stated in the 1st to 7th embodiments with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.84 | R18/ImgH | 0.25 |
| Fno | 1.83 | TL/Y92 | 2.28 |
| HFOV [deg.] | 66.0 | Y92/BL | 1.90 |
| FOV [deg.] | 132.0 | Yc92/Yc82 | 1.15 |
| V1/N1 | 36.26 | fG1/f | −8.07 |
| V2/N2 | 17.78 | f/fG2 | 0.15 |
| V3/N3 | 25.95 | f/fG3 | 0.71 |
| V4/N4 | 8.21 | f/f1 | −0.73 |
| V5/N5 | 36.26 | |f/f1| | 0.73 |
| V6/N6 | 36.26 | f/f2 | 0.34 |
| V7/N7 | 8.21 | |f/f2| | 0.34 |
| V8/N8 | 36.26 | f/f3 | 0.19 |
| V9/N9 | 16.57 | |f/f3| | 0.19 |
| Vmin | 14.0 | f/f4 | 0.10 |
| V40 | 4 | |f/f4| | 0.10 |
| V30 | 4 | f/f5 | 0.11 |
| V20 | 2 | |f/f5| | 0.11 |
| Sd/Td | 0.68 | f/f6 | 0.55 |
| Td/ΣCT | 1.30 | |f/f6| | 0.55 |
| TL/ImgH | 1.91 | f/f7 | −0.73 |
| TL/EPD | 6.18 | |f/f7| | 0.73 |
| TL/f | 3.38 | f/f8 | 0.60 |
| TL/[ImgH × tan(CRA)] | 2.74 | |f/f8| | 0.60 |
| Y11/ImgH | 0.72 | f/f9 | 0.19 |
| Ymax/Ymin | 4.12 | |f/f9| | 0.19 |
| f123/f | −8.07 | |f/R17| + |f/R18| | 4.42 |
| f123/f456 | −5.74 | NIF | 15 |
| Yc11/Y11 | 0.34 | — | — |

9th Embodiment

Figure 17:
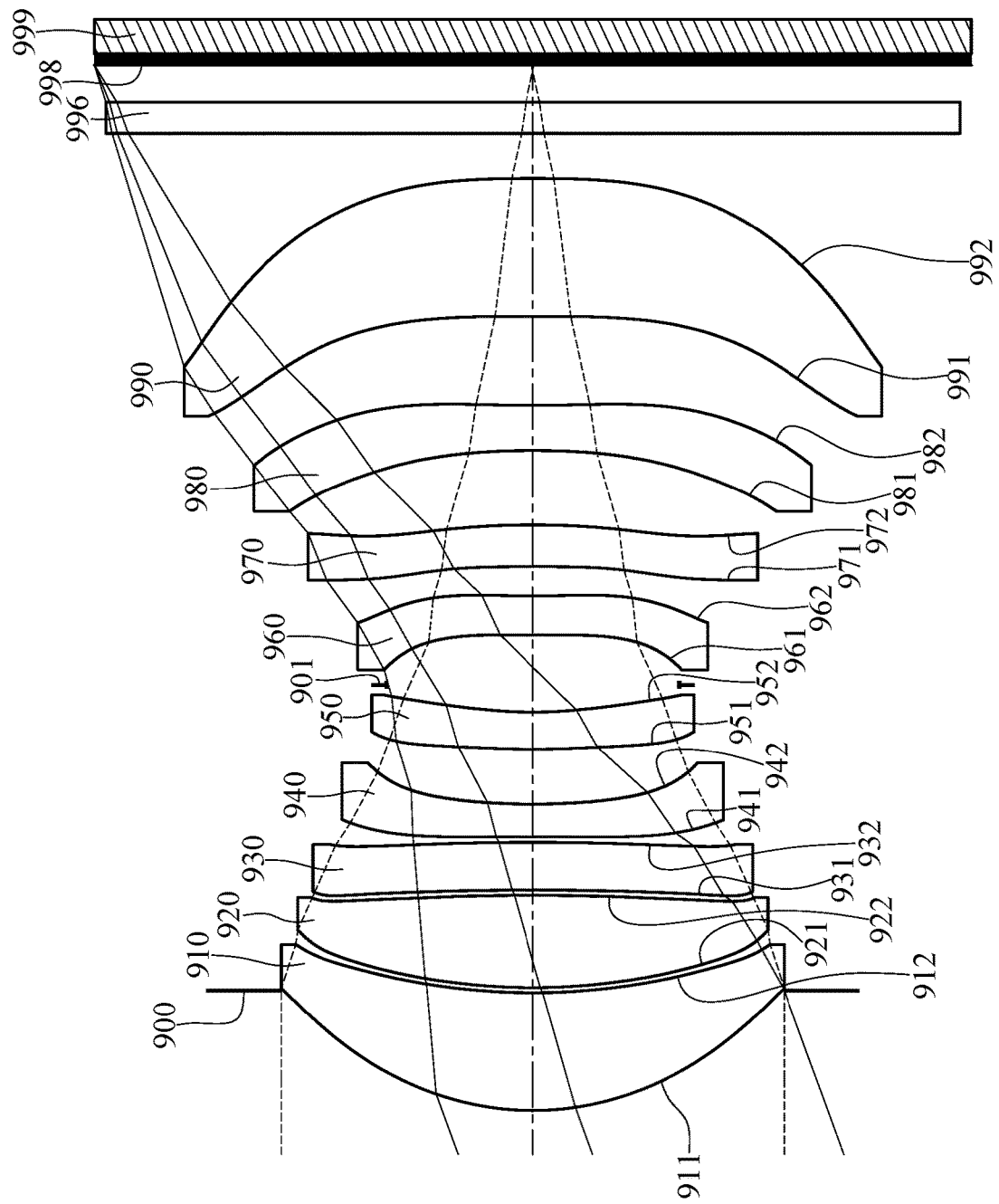
FIG. 17 is a schematic view of an image capturing unit according to the 9th embodiment of the present disclosure.
Figure 18:
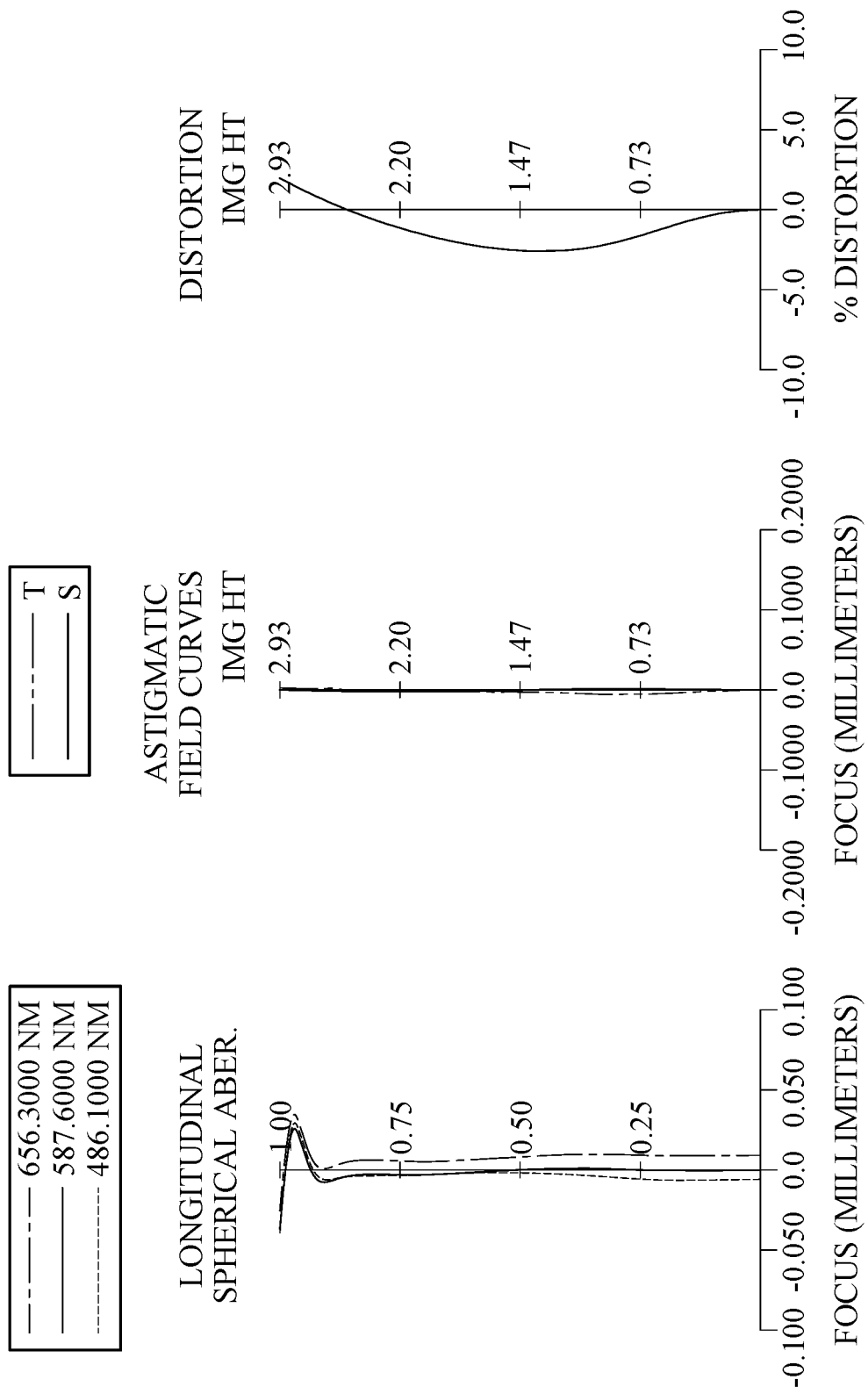
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical lens system (its reference numeral is omitted) of the present disclosure and an image sensor 999. The optical lens system includes, in order from an object side to an image side, an aperture stop 900, a first lens element 910, a second lens element 920, a third lens element 930, a fourth lens element 940, a fifth lens element 950, a stop 901, a sixth lens element 960, a seventh lens element 970, an eighth lens element 980, a ninth lens element 990, an IR-cut filter 996 and an image surface 998. In addition, the optical lens system has a configuration of a front lens group (the first lens element 910, the second lens element 920 and the third lens element 930), a middle lens group (the fourth lens element 940, the fifth lens element 950 and the sixth lens element 960) and a rear lens group (the seventh lens element 970, the eighth lens element 980 and the ninth lens element 990). The optical lens system includes nine lens elements (910~990) with no additional lens element disposed between each of the adjacent nine lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric. The image-side surface 922 of the second lens element 920 has three inflection points.

The third lens element 930 with positive refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has one inflection point. The image-side surface 932 of the third lens element 930 has one inflection point.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has one inflection points.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has one inflection point. The image-side surface 962 of the sixth lens element 960 has two inflection points.

The seventh lens element 970 with positive refractive power has an object-side surface 971 being concave in a paraxial region thereof and an image-side surface 972 being convex in a paraxial region thereof. The seventh lens element 970 is made of plastic material and has the object-side surface 971 and the image-side surface 972 being both aspheric. The object-side surface 971 of the seventh lens element 970 has two inflection points. The image-side surface 972 of the seventh lens element 970 has two inflection points. The image-side surface 972 of the seventh lens element 970 has at least one critical point in an off-axis region thereof.

The eighth lens element 980 with negative refractive power has an object-side surface 981 being concave in a paraxial region thereof and an image-side surface 982 being concave in a paraxial region thereof. The eighth lens element 980 is made of plastic material and has the object-side surface 981 and the image-side surface 982 being both aspheric. The image-side surface 982 of the eighth lens element 980 has one inflection point. The image-side surface 982 of the eighth lens element 980 has at least one critical point in an off-axis region thereof.

The ninth lens element 990 with positive refractive power has an object-side surface 991 being concave in a paraxial region thereof and an image-side surface 992 being convex in a paraxial region thereof. The ninth lens element 990 is made of plastic material and has the object-side surface 991 and the image-side surface 992 being both aspheric. The object-side surface 991 of the ninth lens element 990 has one inflection point. The image-side surface 992 of the ninth lens element 990 has one inflection point.

The IR-cut filter 996 is made of glass material and located between the ninth lens element 990 and the image surface 998, and will not affect the focal length of the optical lens system. The image sensor 999 is disposed on or near the image surface 998 of the optical lens system.

The detailed optical data of the 9th embodiment are shown in Table 17 and the aspheric surface data are shown in Table 18 below.

TABLE 17

9th Embodiment
f = 7.91 mm, Fno = 2.35, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.806 | | | | |
| 2 | Lens 1 | 1.956 | (ASP) | 0.791 | Plastic | 1.544 | 56.0 | 5.82 |
| 3 | | 4.388 | (ASP) | 0.035 | | | | |
| 4 | Lens 2 | 4.281 | (ASP) | 0.618 | Plastic | 1.544 | 56.0 | 6.33 |
| 5 | | −16.746 | (ASP) | 0.035 | | | | |
| 6 | Lens 3 | −19.794 | (ASP) | 0.318 | Plastic | 1.544 | 56.0 | 154.77 |
| 7 | | −16.117 | (ASP) | 0.036 | | | | |
| 8 | Lens 4 | −704.970 | (ASP) | 0.220 | Plastic | 1.650 | 21.8 | −6.95 |
| 9 | | 4.542 | (ASP) | 0.370 | | | | |
| 10 | Lens 5 | 6.518 | (ASP) | 0.250 | Plastic | 1.566 | 37.4 | −9.95 |
| 11 | | 2.980 | (ASP) | 0.180 | | | | |
| 12 | Stop | Plano | | 0.336 | | | | |
| 13 | Lens 6 | 94.505 | (ASP) | 0.260 | Plastic | 1.705 | 14.0 | −9.93 |
| 14 | | 6.513 | (ASP) | 0.196 | | | | |
| 15 | Lens 7 | −28.560 | (ASP) | 0.280 | Plastic | 1.680 | 18.4 | 10.28 |
| 16 | | −5.637 | (ASP) | 0.501 | | | | |
| 17 | Lens 8 | −5.292 | (ASP) | 0.300 | Plastic | 1.544 | 56.0 | −6.05 |
| 18 | | 8.888 | (ASP) | 0.595 | | | | |
| 19 | Lens 9 | −45.740 | (ASP) | 0.928 | Plastic | 1.705 | 14.0 | 24.08 |
| 20 | | −12.483 | (ASP) | 0.300 | | | | |
| 21 | IR-cut Filter | Plano | | 0.210 | Glass | 1.517 | 64.2 | — |
| 22 | | Plano | | 0.245 | | | | |
| 23 | Image | Plano | | 0.000 | | | | |

Note:
Reference wavelength is 587.6 nm (d-line).
An effective radius of the stop 901 (Surface 12) is 0.980 mm.
An effective radius of the object-side surface 991 (Surface 19) is 2.175 mm.

TABLE 18

Aspheric Coefficients

| Surface # | 2 | 3 | 4 | 5 | 6 |
|---|---|---|---|---|---|
| k = | −1.8549E−01 | −2.9534E−02 | 1.6783E−01 | −8.3288E+01 | 3.2245E+01 |
| A4 = | −1.6424E−04 | 1.2650E−02 | 1.0398E−02 | −2.3901E−02 | −6.4831E−03 |
| A6 = | −1.1346E−03 | −5.2591E−02 | −5.5053E−02 | 4.8300E−02 | 2.9401E−02 |
| A8 = | 3.9217E−04 | 8.1823E−02 | 9.3647E−02 | −2.4992E−02 | −2.9146E−02 |
| A10 = | −5.1517E−04 | −5.4826E−02 | −6.6200E−02 | −9.3294E−03 | 7.5550E−03 |
| A12 = | 3.6404E−04 | 1.3421E−02 | 1.8983E−02 | 1.6279E−02 | 4.2301E−03 |
| A14 = | −2.0122E−04 | 5.5420E−04 | −7.9181E−04 | −7.5082E−03 | −3.4924E−03 |
| A16 = | 3.2768E−05 | −4.5161E−04 | −3.0025E−04 | 1.3423E−03 | 8.3267E−04 |

| Surface # | 7 | 8 | 9 | 10 | 11 |
|---|---|---|---|---|---|
| k = | −9.0000E+01 | −9.0000E+01 | −4.9893E+01 | 7.6833E+00 | 1.8110E+00 |
| A4 = | 2.6603E−02 | −2.1682E−03 | 4.6465E−02 | −1.1222E−01 | −1.3717E−01 |
| A6 = | −1.0012E−01 | 3.7806E−02 | 8.8109E−02 | 1.8080E−01 | 1.7618E−01 |
| A8 = | 1.8090E−01 | 2.1968E−02 | −1.1300E−01 | −2.1029E−01 | −2.7734E−01 |
| A10 = | −1.6787E−01 | −3.2594E−02 | 1.6694E−01 | 2.3217E−01 | 3.2731E−01 |
| A12 = | 8.5578E−02 | 1.1973E−02 | −1.4393E−01 | −1.2641E−01 | −2.4930E−01 |
| A14 = | −2.3075E−02 | −1.9385E−03 | 8.7598E−02 | 3.4221E−02 | 1.1224E−01 |
| A16 = | 2.7621E−03 | 2.7638E−04 | −2.4740E−02 | −1.7155E−03 | −2.0879E−02 |

| Surface # | 13 | 14 | 15 | 16 | 17 |
|---|---|---|---|---|---|
| k = | −3.9402E+01 | 2.1676E+01 | 8.8081E+01 | −2.0619E+00 | −7.8363E+01 |
| A4 = | −2.6485E−01 | −3.4358E−01 | −1.4604E−01 | 3.6605E−03 | −1.0022E−01 |
| A6 = | 2.2985E−01 | 3.0926E−01 | −1.4758E−01 | −7.7043E−02 | 6.3927E−02 |
| A8 = | −4.6510E−01 | −3.3973E−01 | 2.9473E−01 | 2.0624E−01 | −4.8645E−02 |
| A10 = | 5.4847E−01 | 2.7750E−01 | −3.0329E−01 | −1.7631E−01 | 3.0813E−02 |
| A12 = | −5.6076E−01 | −1.4772E−01 | 1.4018E−01 | 7.3106E−02 | −1.0501E−02 |
| A14 = | 3.6624E−01 | 5.3691E−02 | −3.1616E−02 | −1.5223E−02 | 1.3939E−03 |
| A16 = | −9.8571E−02 | −9.6782E−03 | 2.7740E−03 | 1.2755E−03 | −1.5125E−05 |

| Surface # | 18 | 19 | 20 |
|---|---|---|---|
| k = | −4.8886E+01 | −4.1538E+01 | 1.0737E+01 |
| A4 = | −1.0669E−01 | −7.6618E−02 | −9.6969E−02 |
| A6 = | 6.0260E−02 | 3.5648E−02 | 4.3438E−02 |
| A8 = | −3.9119E−02 | −1.7575E−02 | −1.6243E−02 |
| A10 = | 1.7652E−02 | 5.1516E−03 | 3.9576E−03 |
| A12 = | −4.3630E−03 | −8.0838E−04 | −5.9649E−04 |
| A14 = | 4.8631E−04 | 6.8219E−05 | 4.7179E−05 |
| A16 = | −1.4704E−05 | −2.5324E−06 | −1.2504E−06 |

In the 9th embodiment, the equation of the aspheric surface profiles of the aforementioned lens elements is the same as the equation of the 1st embodiment. Also, the definitions of these parameters shown in the following table are the same as those stated in the 1st to 8th embodiments with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 7.91 | R18/ImgH | −4.25 |
| Fno | 2.35 | TL/Y92 | 3.14 |
| HFOV [deg.] | 20.0 | Y92/BL | 2.95 |
| FOV [deg.] | 40.0 | fG1/f | 0.41 |
| V1/N1 | 36.26 | f/fG2 | −0.13 |
| V2/N2 | 36.26 | f/fG3 | −2.99 |
| V3/N3 | 36.26 | f/f1 | 1.36 |
| V4/N4 | 13.21 | |f/f1| | 1.36 |
| V5/N5 | 23.91 | f/f2 | 1.25 |
| V6/N6 | 8.21 | |f/f2| | 1.25 |
| V7/N7 | 10.95 | f/f3 | 0.05 |
| V8/N8 | 36.26 | |f/f3| | 0.05 |
| V9/N9 | 8.21 | f/f4 | −1.14 |
| Vmin | 14.0 | |f/f4| | 1.14 |
| V40 | 5 | f/f5 | −0.79 |
| V30 | 4 | |f/f5| | 0.79 |
| V20 | 3 | f/f6 | −0.80 |
| Sd/Td | 0.87 | |f/f6| | 0.80 |
| Td/ΣCT | 1.58 | f/f7 | 0.77 |
| TL/ImgH | 2.39 | |f/f7| | 0.77 |
| TL/EPD | 2.08 | f/f8 | −1.31 |
| TL/f | 0.89 | |f/f8| | 1.31 |
| TL/[ImgH × tan(CRA)] | 5.95 | f/f9 | 0.33 |
| Y11/ImgH | 0.57 | |f/f9| | 0.33 |
| Ymax/Ymin | 2.24 | |f/R17| + |f/R18| | 0.81 |
| f123/f | 0.41 | NIF | 16 |
| f123/f456 | −1.23 | — | — |

10th Embodiment

Figure 19:
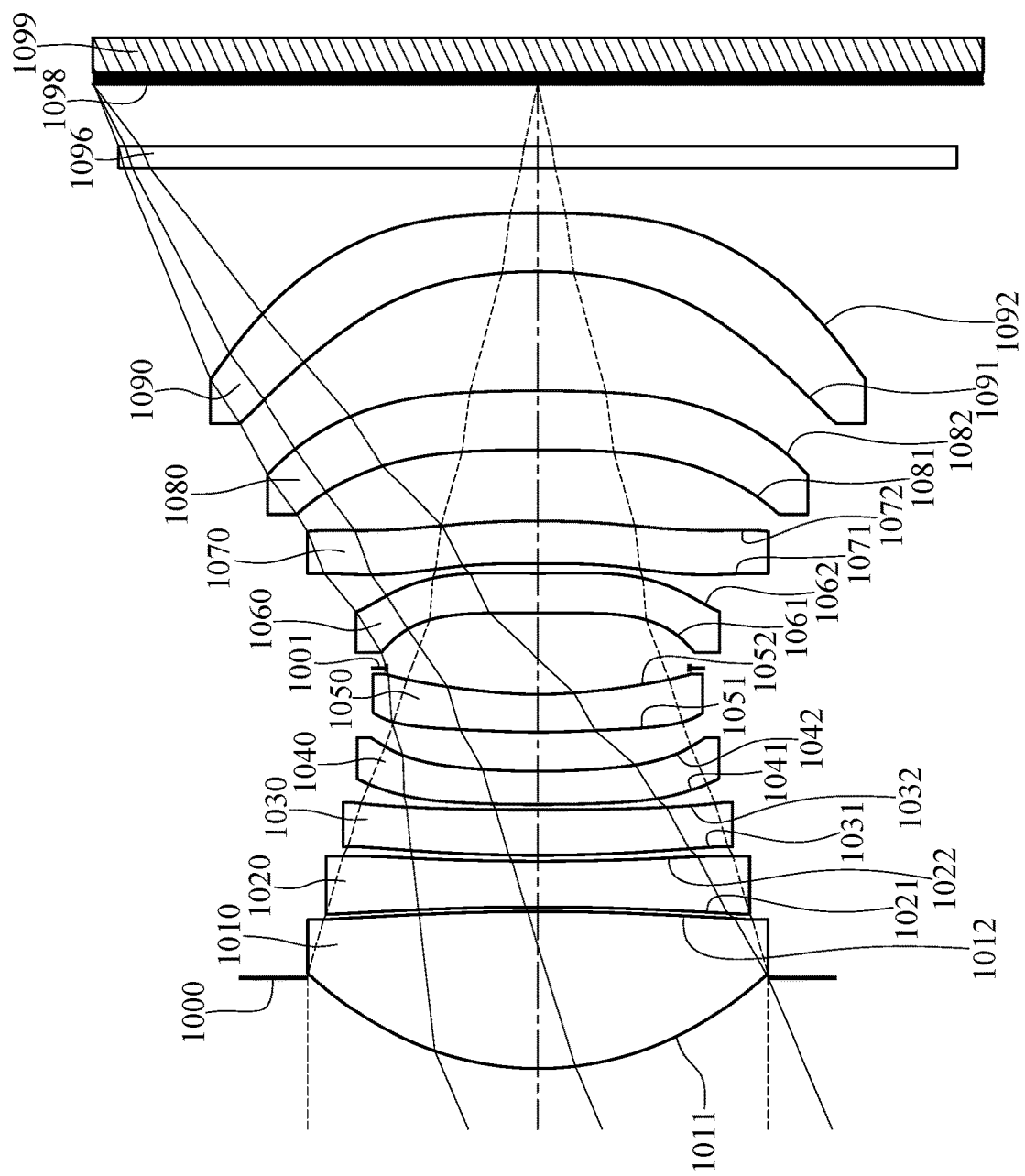
FIG. 19 is a schematic view of an image capturing unit according to the 10th embodiment of the present disclosure.
Figure 20:
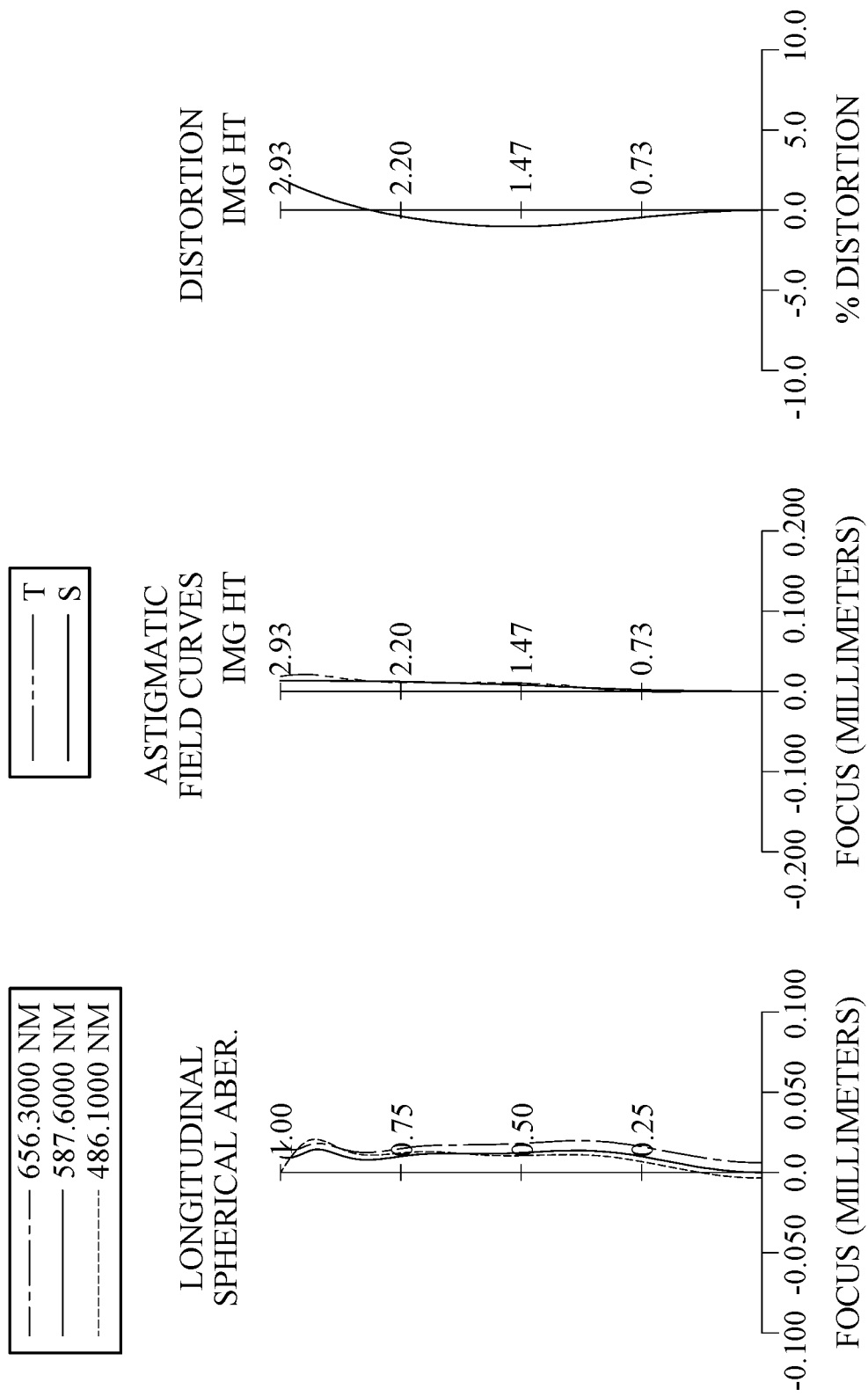
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical lens system (its reference numeral is omitted) of the present disclosure and an image sensor 1099. The optical lens system includes, in order from an object side to an image side, an aperture stop 1000, a first lens element 1010, a second lens element 1020, a third lens element 1030, a fourth lens element 1040, a fifth lens element 1050, a stop 1001, a sixth lens element 1060, a seventh lens element 1070, an eighth lens element 1080, a ninth lens element 1090, an IR-cut filter 1096 and an image surface 1098. In addition, the optical lens system has a configuration of a front lens group (the first lens element 1010, the second lens element 1020 and the third lens element 1030), a middle lens group (the fourth lens element 1040, the fifth lens element 1050 and the sixth lens element 1060) and a rear lens group (the seventh lens element 1070, the eighth lens element 1080 and the ninth lens element 1090). The optical lens system includes nine lens elements (1010~1090) with no additional lens element disposed between each of the adjacent nine lens elements.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric. The image-side surface 1012 of the first lens element 1010 has three inflection points.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has one inflection point. The image-side surface 1022 of the second lens element 1020 has one inflection point.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has one inflection point.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The object-side surface 1061 of the sixth lens element 1060 has one inflection point. The image-side surface 1062 of the sixth lens element 1060 has two inflection points.

The seventh lens element 1070 with positive refractive power has an object-side surface 1071 being concave in a paraxial region thereof and an image-side surface 1072 being convex in a paraxial region thereof. The seventh lens element 1070 is made of plastic material and has the object-side surface 1071 and the image-side surface 1072 being both aspheric. The object-side surface 1071 of the seventh lens element 1070 has two inflection points. The image-side surface 1072 of the seventh lens element 1070 has two inflection points. The object-side surface 1071 of the seventh lens element 1070 has at least one critical point in an off-axis region thereof. The image-side surface 1072 of the seventh lens element 1070 has at least one critical point in an off-axis region thereof.

The eighth lens element 1080 with positive refractive power has an object-side surface 1081 being concave in a paraxial region thereof and an image-side surface 1082 being convex in a paraxial region thereof. The eighth lens element 1080 is made of plastic material and has the object-side surface 1081 and the image-side surface 1082 being both aspheric.

The ninth lens element 1090 with negative refractive power has an object-side surface 1091 being concave in a paraxial region thereof and an image-side surface 1092 being convex in a paraxial region thereof. The ninth lens element 1090 is made of plastic material and has the object-side surface 1091 and the image-side surface 1092 being both aspheric. The object-side surface 1091 of the ninth lens element 1090 has two inflection points. The image-side surface 1092 of the ninth lens element 1090 has one inflection point.

The IR-cut filter 1096 is made of glass material and located between the ninth lens element 1090 and the image surface 1098, and will not affect the focal length of the optical lens system. The image sensor 1099 is disposed on or near the image surface 1098 of the optical lens system.

The detailed optical data of the 10th embodiment are shown in Table 19 and the aspheric surface data are shown in Table 20 below.

TABLE 19

10th Embodiment
f = 6.77 mm, Fno = 2.23, HFOV = 23.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.600 | | | | |
| 2 | Lens 1 | 2.044 | (ASP) | 1.039 | Plastic | 1.545 | 56.1 | 3.35 |
| 3 | | −14.016 | (ASP) | 0.030 | | | | |
| 4 | Lens 2 | −15.964 | (ASP) | 0.300 | Plastic | 1.639 | 23.5 | −12.38 |
| 5 | | 15.778 | (ASP) | 0.039 | | | | |
| 6 | Lens 3 | 10.937 | (ASP) | 0.300 | Plastic | 1.639 | 23.5 | 26.36 |
| 7 | | 30.884 | (ASP) | 0.035 | | | | |

TABLE 19-continued

10th Embodiment
f = 6.77 mm, Fno = 2.23, HFOV = 23.0 deg.

| Surface # | | Curvature Radius | | Thickness | Material | Index | Abbe # | Focal Length |
|---|---|---|---|---|---|---|---|---|
| 8 | Lens 4 | 11.624 | (ASP) | 0.220 | Plastic | 1.611 | 23.5 | −13.78 |
| 9 | | 4.849 | (ASP) | 0.261 | | | | |
| 10 | Lens 5 | 5.004 | (ASP) | 0.248 | Plastic | 1.607 | 26.6 | −10.96 |
| 11 | | 2.803 | (ASP) | 0.173 | | | | |
| 12 | Stop | Plano | | 0.366 | | | | |
| 13 | Lens 6 | 57.412 | (ASP) | 0.260 | Plastic | 1.705 | 14.0 | −13.73 |
| 14 | | 8.265 | (ASP) | 0.064 | | | | |
| 15 | Lens 7 | −33.600 | (ASP) | 0.280 | Plastic | 1.720 | 14.5 | 13.70 |
| 16 | | −7.652 | (ASP) | 0.474 | | | | |
| 17 | Lens 8 | −13.192 | (ASP) | 0.388 | Plastic | 1.720 | 14.5 | 114.14 |
| 18 | | −11.507 | (ASP) | 0.787 | | | | |
| 19 | Lens 9 | −2.850 | (ASP) | 0.385 | Plastic | 1.544 | 56.0 | −7.83 |
| 20 | | −9.027 | (ASP) | 0.300 | | | | |
| 21 | IR-cut Filter | Plano | | 0.145 | Glass | 1.517 | 64.2 | — |
| 22 | | Plano | | 0.409 | | | | |
| 23 | Image | Plano | | 0.000 | | | | |

Note:
Reference wavelength is 587.6 nm (d-line).
An effective radius of the stop 1001 (Surface 12) is 1.000 mm.

TABLE 20

Aspheric Coefficients

| Surface # | 2 | 3 | 4 | 5 | 6 |
|---|---|---|---|---|---|
| k = | −2.1455E−01 | 0.0000E+00 | 0.0000E+00 | 0.0000E+00 | 0.0000E+00 |
| A4 = | −1.0587E−03 | 3.8955E−03 | 1.3250E−03 | −1.0943E−02 | 1.1868E−03 |
| A6 = | 1.7954E−04 | 2.2625E−03 | −3.4154E−03 | 5.2890E−03 | −1.2929E−02 |
| A8 = | 6.5289E−04 | 2.4203E−03 | 1.7707E−02 | 4.3921E−02 | 4.7443E−02 |
| A10 = | −1.5093E−03 | −1.3581E−02 | −3.0823E−02 | −9.8465E−02 | −9.0564E−02 |
| A12 = | 8.8598E−04 | 1.7235E−02 | 2.7926E−02 | 8.6796E−02 | 8.3179E−02 |
| A14 = | −1.8626E−04 | −8.9826E−03 | −1.2664E−02 | −3.6591E−02 | −3.7062E−02 |
| A16 = | — | 1.6702E−03 | 2.2446E−03 | 6.0556E−03 | 6.3050E−03 |

| Surface # | 7 | 8 | 9 | 10 | 11 |
|---|---|---|---|---|---|
| k = | 9.0000E+01 | 5.5976E+01 | −7.7649E+01 | 1.5268E+00 | 2.5259E+00 |
| A4 = | 2.7877E−02 | −1.7391E−02 | −8.6831E−03 | −2.0898E−01 | −1.9368E−01 |
| A6 = | −5.7641E−02 | 1.4229E−01 | 1.9593E−01 | 3.6848E−01 | 2.8644E−01 |
| A8 = | 6.4891E−02 | −1.7583E−01 | −1.7975E−01 | −3.4628E−01 | −3.1870E−01 |
| A10 = | −2.9053E−02 | 1.5915E−01 | 8.0674E−02 | 2.2341E−01 | 2.4679E−01 |
| A12 = | 2.8009E−03 | −8.3667E−02 | 2.3655E−02 | −6.5324E−02 | −1.3129E−01 |
| A14 = | 9.0079E−04 | 1.7563E−02 | −2.2895E−02 | 8.1605E−03 | 3.8100E−02 |

| Surface # | 13 | 14 | 15 | 16 | 17 |
|---|---|---|---|---|---|
| k = | 9.0000E+01 | 3.0317E+01 | 8.3964E+01 | 8.9749E+00 | 5.2114E+01 |
| A4 = | −2.0101E−01 | −4.0787E−01 | −3.1280E−01 | −9.0018E−02 | −5.9838E−02 |
| A6 = | 1.2261E−01 | 4.6826E−01 | 5.1197E−01 | 2.0541E−01 | −8.9358E−04 |
| A8 = | −3.6296E−01 | −6.2425E−01 | −3.9023E−01 | −1.6515E−01 | −3.5428E−03 |
| A10 = | 4.5511E−01 | 6.3772E−01 | 1.7650E−01 | 7.6305E−02 | 1.1957E−02 |
| A12 = | −4.4706E−01 | −4.6238E−01 | −4.8385E−02 | −2.1223E−02 | −7.0308E−03 |
| A14 = | 2.6143E−01 | 2.0883E−01 | 7.4845E−03 | 3.2894E−03 | 1.5848E−03 |
| A16 = | −6.1003E−02 | −4.0014E−02 | −5.6141E−04 | −2.4356E−04 | −1.2261E−04 |

| Surface # | 18 | 19 | 20 |
|---|---|---|---|
| k = | 6.1307E+00 | 5.9531E−01 | 1.2094E+01 |
| A4 = | −3.1991E−02 | −2.2128E−02 | −6.5803E−02 |
| A6 = | −2.7744E−02 | −2.7022E−02 | 3.8764E−03 |
| A8 = | 2.3298E−02 | 2.1255E−02 | 2.9479E−03 |
| A10 = | −9.3488E−03 | −3.5515E−03 | −1.2906E−04 |
| A12 = | 2.4191E−03 | −9.4594E−04 | −3.1843E−04 |
| A14 = | −4.4932E−04 | 4.0018E−04 | 7.1653E−05 |
| A16 = | 4.2024E−05 | −3.7815E−05 | −4.3901E−06 |

In the 10th embodiment, the equation of the aspheric surface profiles of the aforementioned lens elements is the same as the equation of the 1st embodiment. Also, the definitions of these parameters shown in the following table are the same as those stated in the 1st to 9th embodiments with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 6.77 | R18/ImgH | −3.08 |
| Fno | 2.23 | TL/Y92 | 3.01 |
| HFOV [deg.] | 23.0 | Y92/BL | 2.53 |
| FOV [deg.] | 46.0 | fG1/f | 0.56 |
| V1/N1 | 36.30 | f/fG2 | −0.24 |
| V2/N2 | 14.34 | f/fG3 | −1.69 |
| V3/N3 | 14.34 | f/f1 | 2.02 |
| V4/N4 | 14.59 | |f/f1| | 2.02 |
| V5/N5 | 16.57 | f/f2 | −0.55 |
| V6/N6 | 8.21 | |f/f2| | 0.55 |
| V7/N7 | 8.43 | f/f3 | 0.26 |
| V8/N8 | 8.43 | |f/f3| | 0.26 |
| V9/N9 | 36.26 | f/f4 | −0.49 |
| Vmin | 14.0 | |f/f4| | 0.49 |
| V40 | 7 | f/f5 | −0.62 |
| V30 | 7 | |f/f5| | 0.62 |
| V20 | 3 | f/f6 | −0.49 |
| Sd/Td | 0.89 | |f/f6| | 0.49 |
| Td/ΣCT | 1.65 | f/f7 | 0.49 |
| TL/ImgH | 2.22 | |f/f7| | 0.49 |
| TL/EPD | 2.14 | f/f8 | 0.06 |
| TL/f | 0.96 | |f/f8| | 0.06 |
| TL/[ImgH × tan(CRA)] | 4.25 | f/f9 | −0.86 |
| Y11/ImgH | 0.52 | |f/f9| | 0.86 |
| Ymax/Ymin | 2.14 | |f/R17| + |f/R18| | 3.12 |
| f123/f | 0.56 | NIF | 16 |
| f123/f456 | −0.94 | — | — |

11th Embodiment

Figure 21:
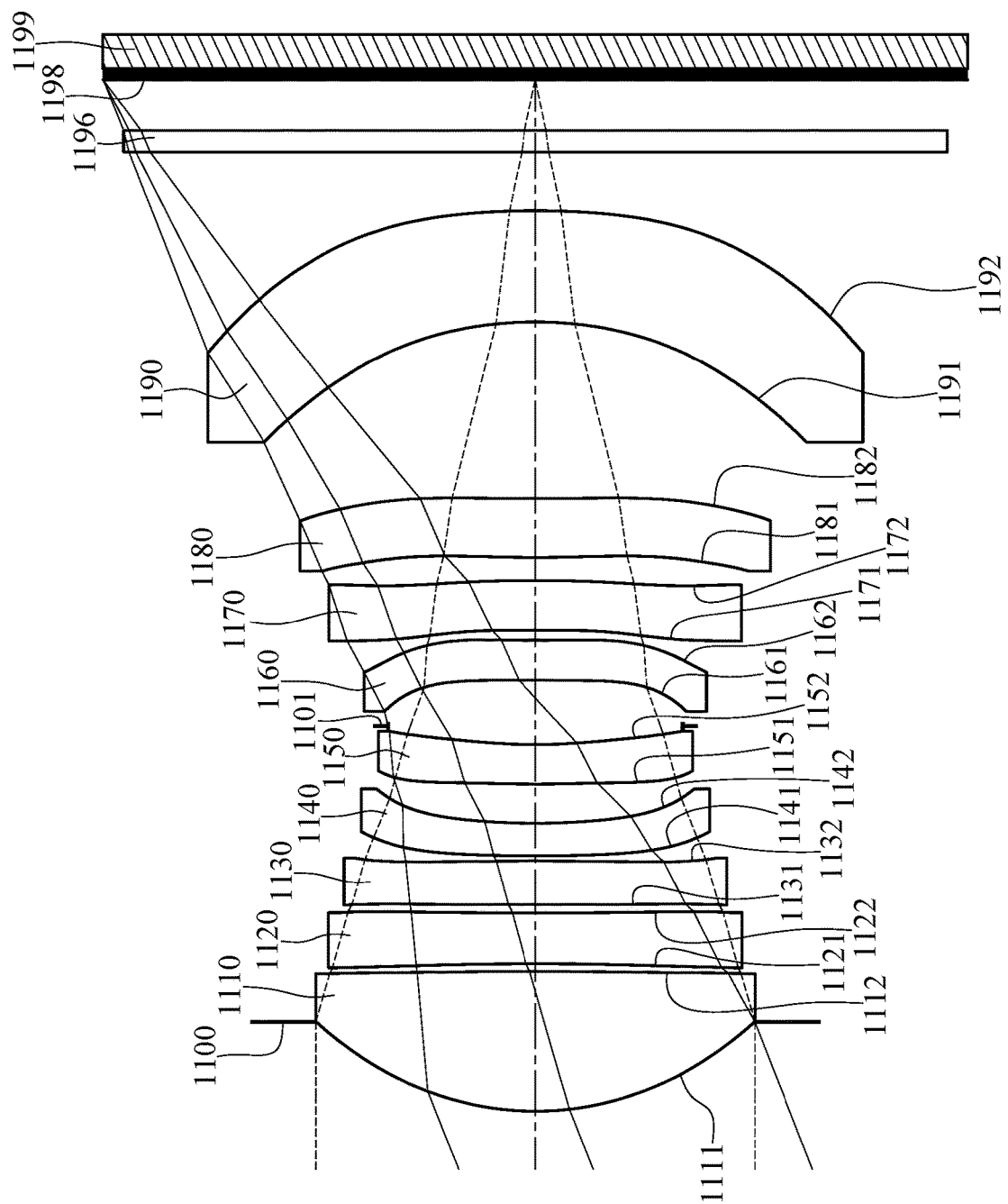
FIG. 21 is a schematic view of an image capturing unit according to the 11th embodiment of the present disclosure.
Figure 22:
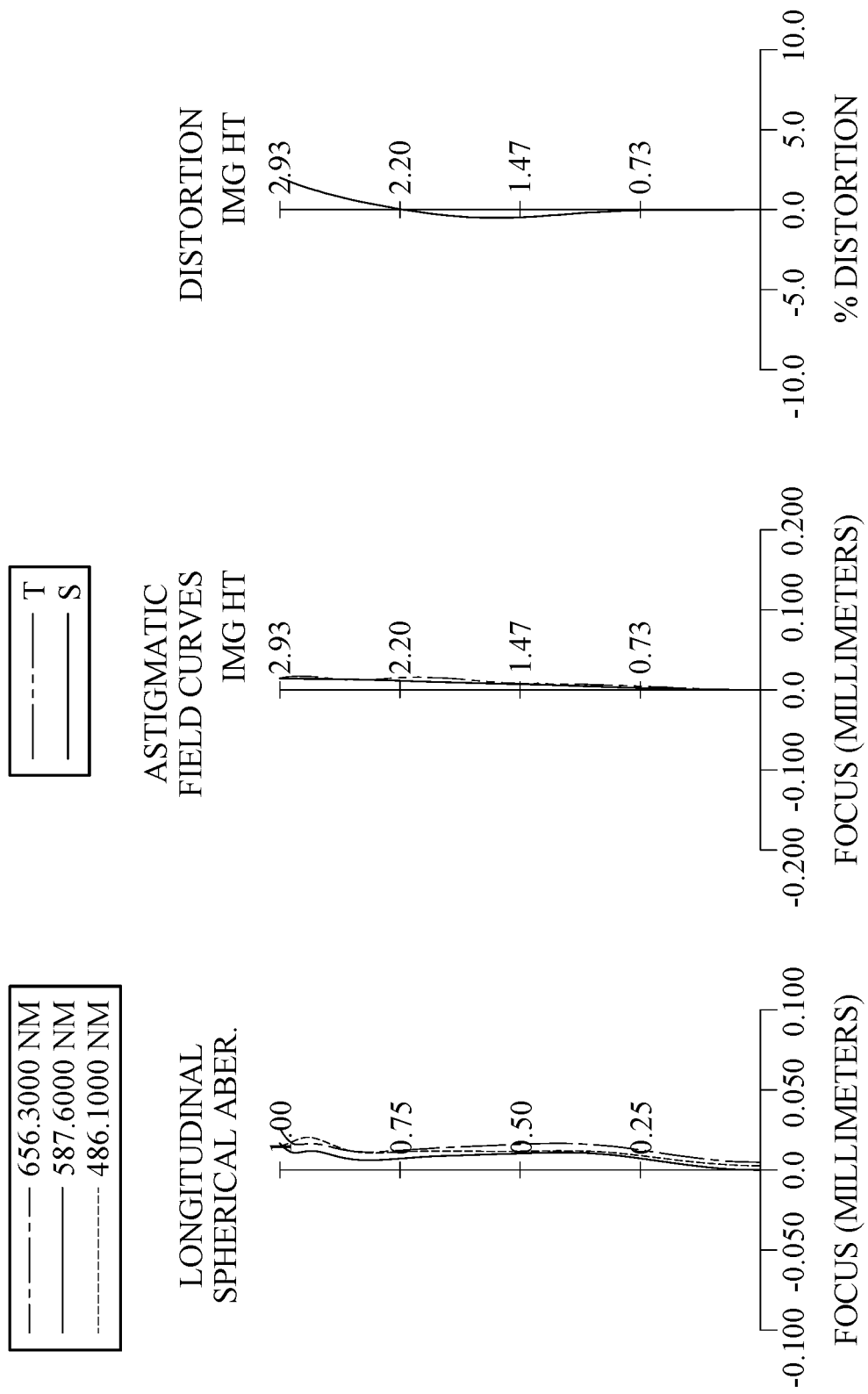
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical lens system (its reference numeral is omitted) of the present disclosure and an image sensor 1199. The optical lens system includes, in order from an object side to an image side, an aperture stop 1100, a first lens element 1110, a second lens element 1120, a third lens element 1130, a fourth lens element 1140, a fifth lens element 1150, a stop 1101, a sixth lens element 1160, a seventh lens element 1170, an eighth lens element 1180, a ninth lens element 1190, an IR-cut filter 1196 and an image surface 1198. In addition, the optical lens system has a configuration of a front lens group (the first lens element 1110, the second lens element 1120 and the third lens element 1130), a middle lens group (the fourth lens element 1140, the fifth lens element 1150 and the sixth lens element 1160) and a rear lens group (the seventh lens element 1170, the eighth lens element 1180 and the ninth lens element 1190). The optical lens system includes nine lens elements (1110~1190) with no additional lens element disposed between each of the adjacent nine lens elements.

The first lens element 1110 with positive refractive power has an object-side surface 1111 being convex in a paraxial region thereof and an image-side surface 1112 being convex in a paraxial region thereof. The first lens element 1110 is made of glass material and has the object-side surface 1111 and the image-side surface 1112 being both aspheric. The image-side surface 1112 of the first lens element 1110 has three inflection points.

The second lens element 1120 with negative refractive power has an object-side surface 1121 being concave in a paraxial region thereof and an image-side surface 1122 being concave in a paraxial region thereof. The second lens element 1120 is made of plastic material and has the object-side surface 1121 and the image-side surface 1122 being both aspheric. The object-side surface 1121 of the second lens element 1120 has three inflection points. The image-side surface 1122 of the second lens element 1120 has two inflection points.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric. The object-side surface 1131 of the third lens element 1130 has one inflection point. The image-side surface 1132 of the third lens element 1130 has one inflection point.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The object-side surface 1151 of the fifth lens element 1150 has two inflection points.

The sixth lens element 1160 with negative refractive power has an object-side surface 1161 being convex in a paraxial region thereof and an image-side surface 1162 being concave in a paraxial region thereof. The sixth lens element 1160 is made of plastic material and has the object-side surface 1161 and the image-side surface 1162 being both aspheric. The object-side surface 1161 of the sixth lens element 1160 has one inflection point. The image-side surface 1162 of the sixth lens element 1160 has two inflection points.

The seventh lens element 1170 with positive refractive power has an object-side surface 1171 being convex in a paraxial region thereof and an image-side surface 1172 being convex in a paraxial region thereof. The seventh lens element 1170 is made of plastic material and has the object-side surface 1171 and the image-side surface 1172 being both aspheric. The object-side surface 1171 of the seventh lens element 1170 has three inflection points. The image-side surface 1172 of the seventh lens element 1170 has two inflection points. The object-side surface 1171 of the seventh lens element 1170 has at least one critical point in an off-axis region thereof. The image-side surface 1172 of the seventh lens element 1170 has at least one critical point in an off-axis region thereof.

The eighth lens element 1180 with positive refractive power has an object-side surface 1181 being convex in a paraxial region thereof and an image-side surface 1182 being concave in a paraxial region thereof. The eighth lens element 1180 is made of plastic material and has the object-side surface 1181 and the image-side surface 1182 being both aspheric. The object-side surface 1181 of the eighth lens element 1180 has one inflection point. The image-side surface 1182 of the eighth lens element 1180 has one inflection point. The object-side surface 1181 of the eighth lens element 1180 has at least one critical point in an off-axis region thereof. The image-side surface 1182 of the eighth lens element 1180 has at least one critical point in an off-axis region thereof.

The ninth lens element 1190 with negative refractive power has an object-side surface 1191 being concave in a paraxial region thereof and an image-side surface 1192 being convex in a paraxial region thereof. The ninth lens element 1190 is made of plastic material and has the object-side surface 1191 and the image-side surface 1192 being both aspheric The IR-cut filter 1196 is made of glass material and located between the ninth lens element 1190 and the image surface 1198, and will not affect the focal length of the optical lens system. The image sensor 1199 is disposed on or near the image surface 1198 of the optical lens system.

The detailed optical data of the 11th embodiment are shown in Table 21 and the aspheric surface data are shown in Table 22 below.

TABLE 21

11th Embodiment
f = 7.29 mm, Fno = 2.45, HFOV = 21.5 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Ape. Stop | Plano            |       | −0.603    |          |       |        |              |
| 2         | Lens 1    | 2.044            | (ASP) | 0.947     | Glass    | 1.542 | 62.9   | 3.63         |
| 3         |           | −43.933          | (ASP) | 0.053     |          |       |        |              |
| 4         | Lens 2    | −22.015          | (ASP) | 0.343     | Plastic  | 1.650 | 21.5   | −22.07       |
| 5         |           | 41.527           | (ASP) | 0.057     |          |       |        |              |
| 6         | Lens 3    | 92.907           | (ASP) | 0.300     | Plastic  | 1.614 | 26.0   | 31.90        |
| 7         |           | −24.772          | (ASP) | 0.035     |          |       |        |              |
| 8         | Lens 4    | 12.698           | (ASP) | 0.221     | Plastic  | 1.614 | 26.0   | −11.48       |
| 9         |           | 4.501            | (ASP) | 0.266     |          |       |        |              |
| 10        | Lens 5    | 7.759            | (ASP) | 0.267     | Plastic  | 1.582 | 30.2   | −11.39       |
| 11        |           | 3.532            | (ASP) | 0.125     |          |       |        |              |
| 12        | Stop      | Plano            |       | 0.310     |          |       |        |              |
| 13        | Lens 6    | 40.204           | (ASP) | 0.272     | Plastic  | 1.660 | 20.4   | −12.86       |
| 14        |           | 6.987            | (ASP) | 0.068     |          |       |        |              |
| 15        | Lens 7    | 100.012          | (ASP) | 0.339     | Plastic  | 1.639 | 23.5   | 19.26        |
| 16        |           | −14.008          | (ASP) | 0.158     |          |       |        |              |
| 17        | Lens 8    | 9.088            | (ASP) | 0.398     | Plastic  | 1.686 | 18.4   | 25.91        |
| 18        |           | 18.265           | (ASP) | 1.200     |          |       |        |              |
| 19        | Lens 9    | −2.689           | (ASP) | 0.754     | Plastic  | 1.544 | 56.0   | −10.12       |
| 20        |           | −5.776           | (ASP) | 0.400     |          |       |        |              |
| 21        | IR-cut Filter | Plano        |       | 0.145     | Glass    | 1.517 | 64.2   | —            |
| 22        |           | Plano            |       | 0.347     |          |       |        |              |
| 23        | Image     | Plano            |       | 0.000     |          |       |        |              |

Note:
Reference wavelength is 587.6 nm (d-line).
An effective radius of the stop 1101 (Surface 12) is 1.000 mm.

TABLE 22

Aspheric Coefficients

| Surface # | 2 | 3 | 4 | 5 | 6 |
|-----------|---|---|---|---|---|
| k =  | −1.9856E−01 | 0.0000E+00 | 0.0000E+00 | 0.0000E+00 | 0.0000E+00 |
| A4 = | −3.4051E−04 | 2.6229E−03 | 2.8803E−03 | −1.0717E−02 | 1.6185E−03 |
| A6 = | 1.2835E−04 | 1.8969E−03 | −3.0859E−03 | 5.6607E−03 | −1.2975E−02 |
| A8 = | 7.0058E−04 | 2.4554E−03 | 1.7625E−02 | 4.4090E−02 | 4.7436E−02 |
| A10 = | −1.4911E−03 | −1.3608E−02 | −3.0877E−02 | −9.8412E−02 | −9.0525E−02 |
| A12 = | 8.8376E−04 | 1.7211E−02 | 2.7899E−02 | 8.6742E−02 | 8.3344E−02 |
| A14 = | −1.9339E−04 | −8.9915E−03 | −1.2674E−02 | −3.6635E−02 | −3.6937E−02 |
| A16 = | — | 1.6698E−03 | 2.2407E−03 | 6.0810E−03 | 6.3025E−03 |

| Surface # | 7 | 8 | 9 | 10 | 11 |
|-----------|---|---|---|----|----|
| k =  | −8.7036E+01 | 5.1546E+01 | −6.4604E+01 | 6.3636E+00 | 2.9950E+00 |
| A4 = | 3.0843E−02 | −1.8563E−02 | 8.2595E−04 | −2.0423E−01 | −1.8649E−01 |
| A6 = | −5.6334E−02 | 1.4305E−01 | 1.9520E−01 | 3.7470E−01 | 2.8481E−01 |
| A8 = | 6.5753E−02 | −1.7583E−01 | −1.7938E−01 | −3.4441E−01 | −3.1711E−01 |
| A10 = | −2.8475E−02 | 1.5877E−01 | 8.2301E−02 | 2.2381E−01 | 2.5082E−01 |
| A12 = | 2.9592E−03 | −8.3234E−02 | 2.4428E−02 | −6.6216E−02 | −1.2953E−01 |
| A14 = | 1.1002E−03 | 1.8210E−02 | −2.2518E−02 | 7.5239E−03 | 3.2778E−02 |

TABLE 22-continued

Aspheric Coefficients

| Surface # | 13 | 14 | 15 | 16 | 17 |
|---|---|---|---|---|---|
| k = | 8.8856E+01 | 2.6511E+01 | −6.0205E+01 | 6.5250E+01 | −8.3367E+01 |
| A4 = | −1.7266E−01 | −4.0466E−01 | −3.2397E−01 | −9.2253E−02 | −6.7920E−02 |
| A6 = | 1.1900E−01 | 4.6193E−01 | 5.0817E−01 | 2.0392E−01 | 5.2704E−03 |
| A8 = | −3.6844E−01 | −6.2677E−01 | −3.8978E−01 | −1.6552E−01 | −1.4103E−03 |
| A10 = | 4.6249E−01 | 6.4046E−01 | 1.7699E−01 | 7.6554E−02 | 1.2012E−02 |
| A12 = | −4.3695E−01 | −4.6001E−01 | −4.8063E−02 | −2.1161E−02 | −7.0962E−03 |
| A14 = | 2.6378E−01 | 2.0885E−01 | 7.5416E−03 | 3.2699E−03 | 1.5480E−03 |
| A16 = | −6.7874E−02 | −4.1537E−02 | −7.0872E−04 | −2.6578E−04 | −1.6284E−04 |

| Surface # | 18 | 19 | 20 |
|---|---|---|---|
| k = | −3.4673E+01 | 5.2067E−01 | −1.0891E+00 |
| A4 = | −3.6736E−02 | 5.7564E−04 | −1.8933E−02 |
| A6 = | −3.2509E−02 | −2.8274E−02 | −1.3874E−02 |
| A8 = | 4.3274E−02 | 1.9973E−02 | 6.8649E−03 |
| A10 = | −2.6005E−02 | −3.4729E−03 | −9.7404E−04 |
| A12 = | 9.6510E−03 | −8.9512E−05 | −7.0889E−05 |
| A14 = | −2.0620E−03 | 4.0427E−04 | 2.8729E−05 |
| A16 = | 1.8301E−04 | −4.0421E−05 | −1.8518E−06 |

In the 11th embodiment, the equation of the aspheric surface profiles of the aforementioned lens elements is the same as the equation of the 1st embodiment. Also, the definitions of these parameters shown in the following table are the same as those stated in the 1st to 10th embodiments with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 7.29 | R18/ImgH | −1.97 |
| Fno | 2.45 | TL/Y92 | 3.15 |
| HFOV [deg.] | 21.5 | Y92/BL | 2.49 |
| FOV [deg.] | 43.0 | fG1/f | 0.52 |
| V1/N1 | 40.78 | f/fG2 | 0.02 |
| V2/N2 | 13.01 | f/fG3 | −1.95 |
| V3/N3 | 16.09 | f/f1 | 2.01 |
| V4/N4 | 16.09 | |f/f1| | 2.01 |
| V5/N5 | 19.11 | f/f2 | −0.33 |
| V6/N6 | 12.29 | |f/f2| | 0.33 |
| V7/N7 | 14.34 | f/f3 | 0.23 |
| V8/N8 | 10.91 | |f/f3| | 0.23 |
| V9/N9 | 36.26 | f/f4 | −0.64 |
| Vmin | 18.4 | |f/f4| | 0.64 |
| V40 | 7 | f/f5 | −0.64 |
| V30 | 6 | |f/f5| | 0.64 |
| V20 | 1 | f/f6 | −0.57 |
| Sd/Td | 0.90 | |f/f6| | 0.57 |
| Td/ΣCT | 1.59 | f/f7 | 0.38 |
| TL/ImgH | 2.39 | |f/f7| | 0.38 |
| TL/EPD | 2.35 | f/f8 | 0.28 |
| TL/f | 0.96 | |f/f8| | 0.28 |
| TL/[ImgH × tan(CRA)] | 4.69 | f/f9 | −0.72 |
| Y11/ImgH | 0.51 | |f/f9| | 0.72 |
| Ymax/Ymin | 2.23 | |f/R17| + |f/R18| | 3.97 |
| f123/f | 0.52 | NIF | 22 |
| f123/f456 | −1.02 | — | — |

12th Embodiment

Figure 23:
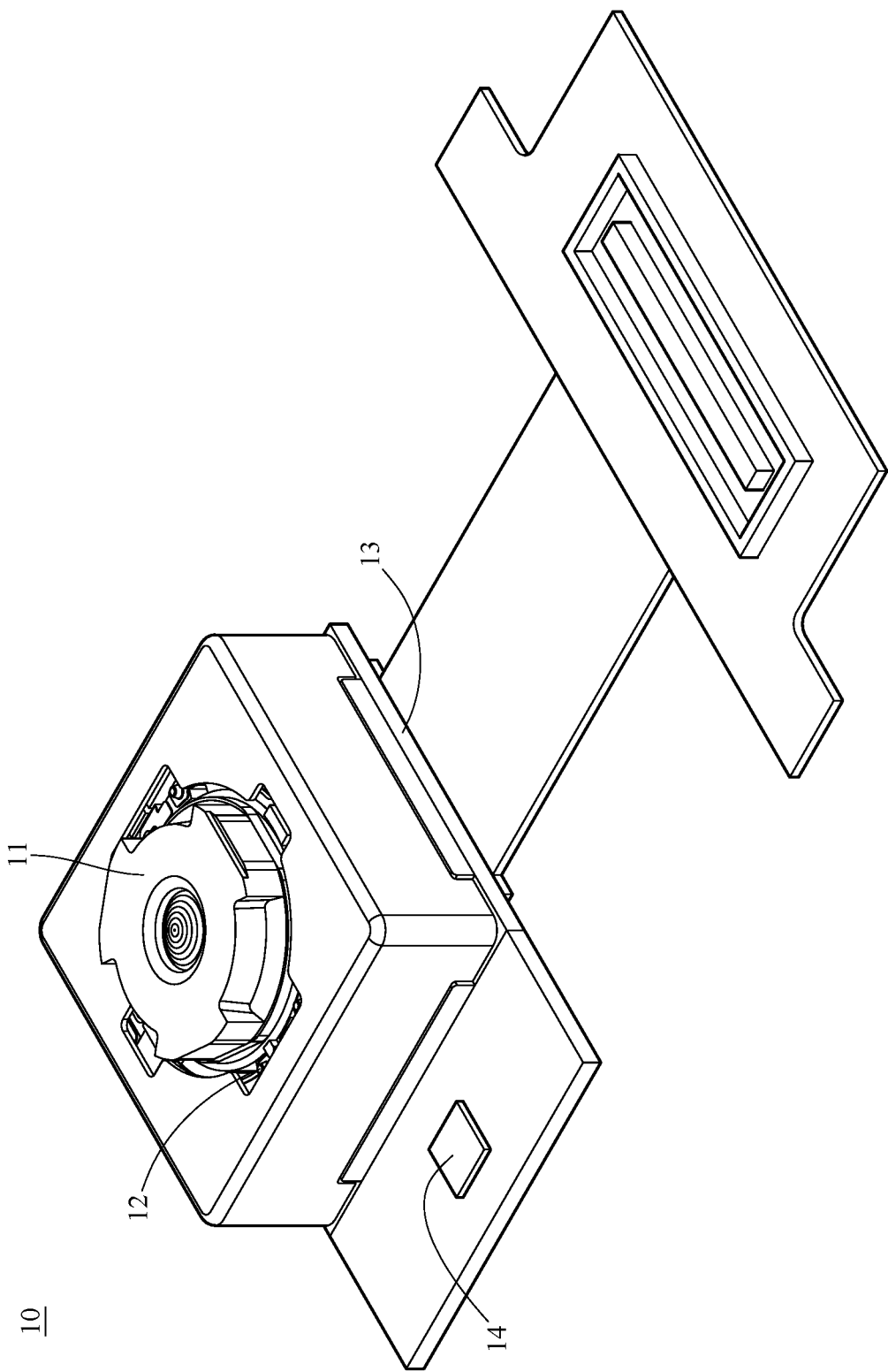
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 10 is a camera module including a lens unit 11, a driving device 12, an image sensor 13 and an image stabilizer 14. The lens unit 11 includes the optical lens system disclosed in the aforementioned embodiment, a barrel and a holder member (their reference numerals are omitted) for holding the optical lens system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

13th Embodiment

Figure 24:
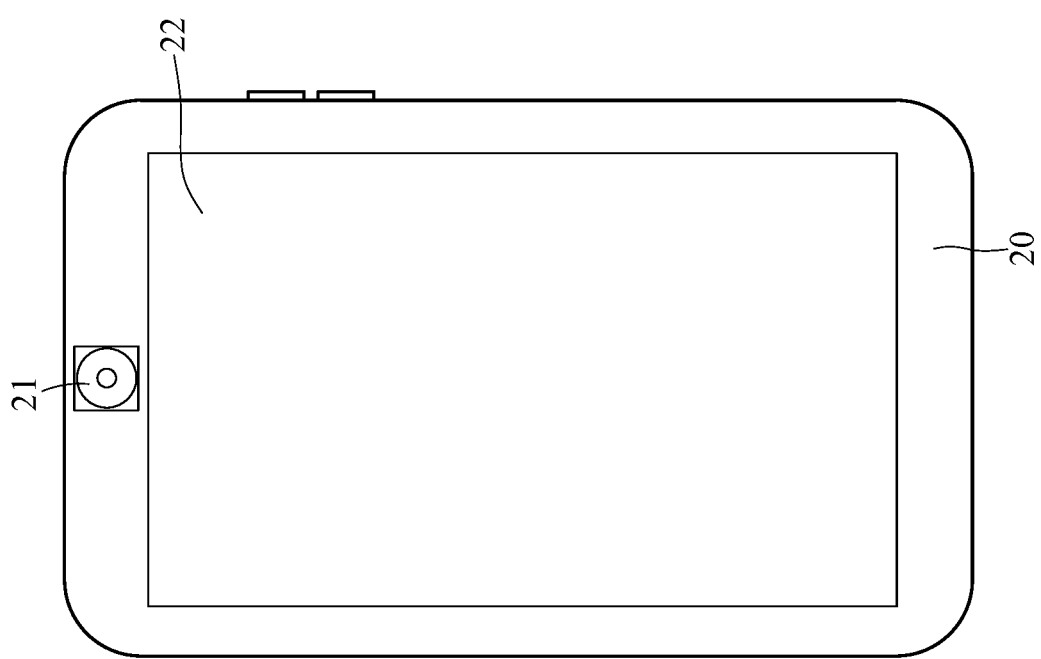
FIG. 24 is a front view of an electronic device according to the 13th embodiment of the present disclosure.

FIG. 24 is a front view of an electronic device according to the 13th embodiment of the present disclosure.

In this embodiment, an electronic device 20 is a smartphone including an image capturing unit 21 and a display unit 22. In this embodiment, the image capturing unit 21 includes the optical lens system disclosed in the 2nd embodiment and an image sensor (their reference numbers are omitted). In FIG. 24, the image capturing unit 21 and the display unit 22 are both disposed on the same side of the electronic device 20. The image capturing unit 21 is a front-facing camera of the electronic device 20 for taking selfies, but the present disclosure is not limited thereto.

14th Embodiment

Figure 25:
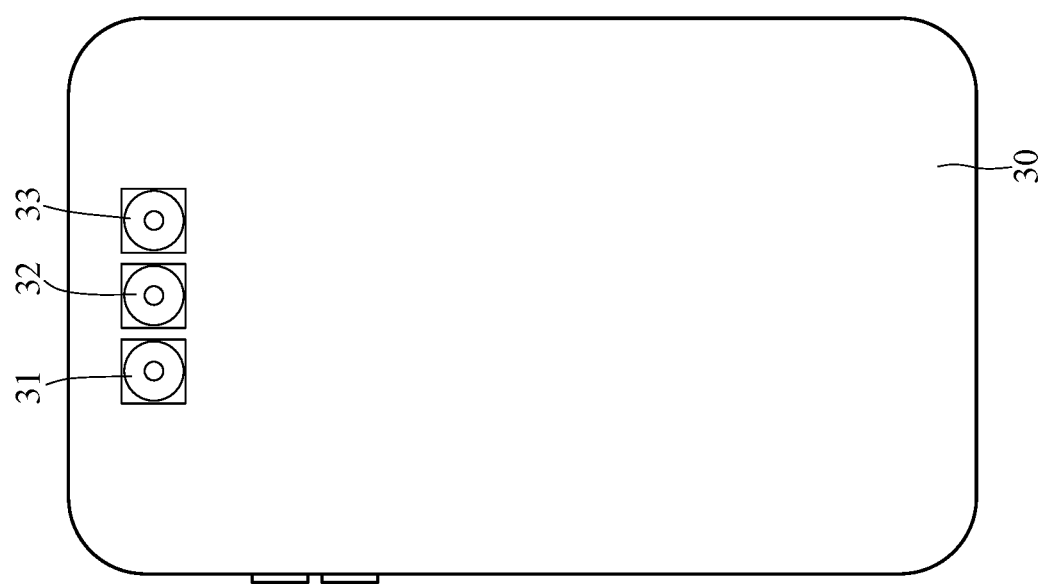
FIG. 25 is a rear view of an electronic device according to the 14th embodiment of the present disclosure.

FIG. 25 is a rear view of an electronic device according to the 14th embodiment of the present disclosure.

In this embodiment, an electronic device 30 is a smartphone including an image capturing unit 31, an image capturing unit 32, an image capturing unit 33 and a display unit (its reference number is omitted), wherein the image capturing unit 31 is a telephoto image capturing unit including the optical lens system disclosed in the 9th embodiment, the image capturing unit 32 is a wide-angle image capturing unit including the optical lens system disclosed in the 7th embodiment, and the image capturing unit 33 is a standard image capturing unit including the optical lens system disclosed in the 4th embodiment.

In this embodiment, the image capturing units 31, 32 and 33 have different fields of view (e.g., the maximum field of view of the image capturing unit 31 is different from the maximum field of view of the image capturing unit 33 by at least 20 degrees, the maximum field of view of the image capturing unit 32 is different from the maximum field of view of the image capturing unit 33 by at least 20 degrees, and the maximum field of view of the image capturing unit 31 is different from the maximum field of view of the image capturing unit 32 by at least 60 degrees), such that the electronic device 30 has various magnification ratios so as to meet the requirement of optical zoom functionality. In this embodiment, the image capturing units 31, 32 and 33 are all disposed on the same side of the electronic device 30, while the display unit is disposed on the opposite side of the electronic device 30.

15th Embodiment

Figure 26:
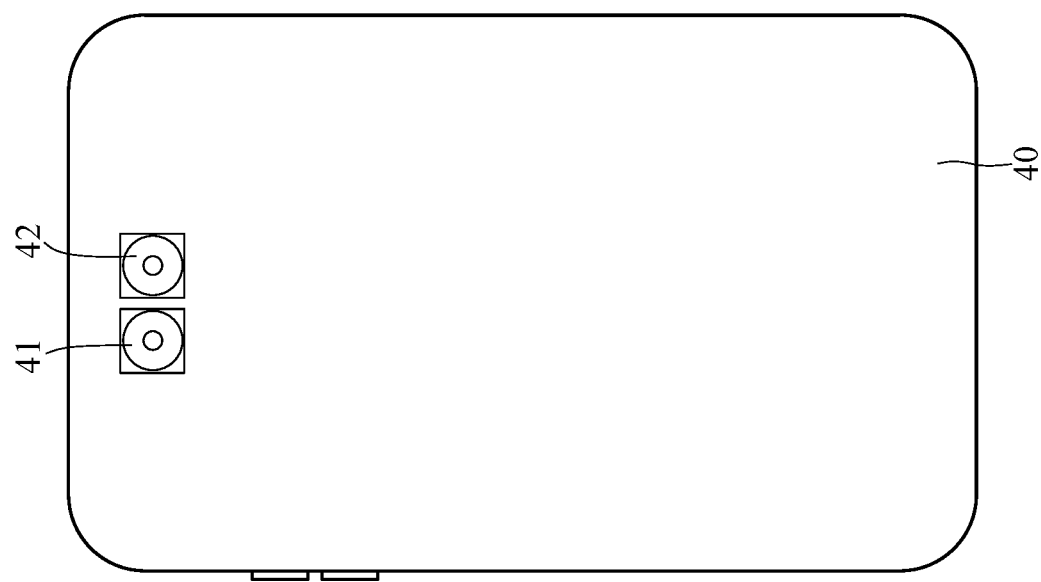
FIG. 26 is a rear view of an electronic device according to the 15th embodiment of the present disclosure.

FIG. 26 is a rear view of an electronic device according to the 15th embodiment of the present disclosure.

In this embodiment, an electronic device 40 is a smartphone including an image capturing unit 41, an image capturing unit 42 and a display unit (its reference number is omitted), wherein the image capturing unit 41 is a wide-angle image capturing unit including the optical lens system disclosed in the 8th embodiment, and the image capturing unit 42 is a standard image capturing unit including the optical lens system disclosed in the 5th embodiment.

In this embodiment, the image capturing units 41 and 42 have different fields of view (e.g., the maximum field of view of the image capturing unit 41 can be different from the maximum field of view of the image capturing unit 42 by at least 20 degrees), such that the electronic device 40 has various magnification ratios so as to meet the requirement of optical zoom functionality. In this embodiment, the image capturing units 41 and 42 are both disposed on the same side of the electronic device 40, while the display unit is disposed on the opposite side of the electronic device 40.

The smartphone in this embodiment is only exemplary for showing the image capturing units including the optical lens system of the present disclosure installed in an electronic device, and the present disclosure is not limited thereto. The optical lens system can be optionally applied to systems with a movable focus. Furthermore, the optical lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens system comprising nine lens elements, the nine lens elements being, in order from an object side to an image side, a first lens element, a second lens element, a third lens element, a fourth lens element, a fifth lens element, a sixth lens element, a seventh lens element, an eighth lens element and a ninth lens element;

wherein the ninth lens element has an object-side surface being concave on an optical axis, at least one lens surface of the seventh lens element, the eighth lens element and the ninth lens element has at least one critical point in an off-axis region thereof, and each of the seventh lens element, the eighth lens element and the ninth lens element has at least one lens surface being aspheric;

wherein an axial distance between an object-side surface of the first lens element and an image surface is TL, a maximum image height of the optical lens system is ImgH, an entrance pupil diameter of the optical lens system is EPD, a minimum value among Abbe numbers of all lens elements of the optical lens system is Vmin, a total number of lens elements having an Abbe number smaller than 40 in the optical lens system is V40, and the following conditions are satisfied:

$TL/ImgH<3.0;$ $TL/EPD<4.0;$ $Vmin<28;$ and $4 \leq V40.$

2. The optical lens system of claim 1, wherein a focal length of the optical lens system is f, a composite focal length of the first lens element, the second lens element and the third lens element is f123, and the following condition is satisfied:

$0.25 < f123/f < 8.0.$

3. The optical lens system of claim 1, wherein at least five lens elements of the optical lens system are made of plastic material, the axial distance between the object-side surface of the first lens element and the image surface is TL, a focal length of the optical lens system is f, and the following condition is satisfied:

$TL/f<3.0.$

4. The optical lens system of claim 1, wherein a composite focal length of the first lens element, the second lens element and the third lens element is f123, a composite focal length of the fourth lens element, the fifth lens element and the sixth lens element is f456, and the following condition is satisfied:

$$-1.25 < f123/f456.$$

5. The optical lens system of claim 1, wherein an axial distance between the object-side surface of the first lens element and an image-side surface of the ninth lens element is Td, a sum of central thicknesses of all lens elements of the optical lens system is ΣCT, and the following condition is satisfied:

$$Td/\Sigma CT < 1.75.$$

6. The optical lens system of claim 1, wherein the object-side surface of the first lens element is concave on an optical axis and has at least one convex critical point in an off-axis region thereof, a vertical distance between the critical point on the object-side surface of the first lens element and the optical axis is Yc11, a maximum effective radius of the object-side surface of the first lens element is Y11, a maximum field of view of the optical lens system is FOV, and the following conditions are satisfied:

$$Yc11/Y11 < 0.75; \text{and}$$

$$100\,[\text{deg.}] < FOV < 150\,[\text{deg.}].$$

7. The optical lens system of claim 1, further comprising an aperture stop, wherein the aperture stop is disposed between an imaged object and the fourth lens element, an axial distance between the aperture stop and an image-side surface of the ninth lens element is Sd, an axial distance between the object-side surface of the first lens element and the image-side surface of the ninth lens element is Td, an f-number of the optical lens system is Fno, and the following conditions are satisfied:

$$0.60 < Sd/Td < 1.20; \text{and}$$

$$1.0 < Fno < 2.20.$$

8. The optical lens system of claim 1, wherein a total number of lens elements having an Abbe number smaller than 30 in the optical lens system is V30, and the following condition is satisfied:

$$4 \leq V30;$$

wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the i-th lens element is Ni, and at least one lens element of the optical lens system satisfies the following condition:

$$6.0 < Vi/Ni < 12.0, \text{wherein } i=1, 2, 3, 4, 5, 6, 7, 8 \text{ or } 9.$$

9. The optical lens system of claim 1, wherein a curvature radius of an image-side surface of the ninth lens element is R18, the maximum image height of the optical lens system is ImgH, and the following condition is satisfied:

$$R18/ImgH < 1.0.$$

10. The optical lens system of claim 1, wherein a maximum value among maximum effective radii of all lens surfaces of the optical lens system is Ymax, a minimum value among maximum effective radii of all lens surfaces of the optical lens system is Ymin, the axial distance between the object-side surface of the first lens element and the image surface is TL, a maximum effective radius of an image-side surface of the ninth lens element is Y92, and the following conditions are satisfied:

$$1.0 < Ymax/Ymin < 5.0; \text{and}$$

$$TL/Y92 < 3.50.$$

11. The optical lens system of claim 1, wherein a maximum effective radius of an image-side surface of the ninth lens element is Y92, an axial distance between the image-side surface of the ninth lens element and the image surface is BL, a vertical distance between a critical point on an image-side surface of the eighth lens element and the optical axis is Yc82, a vertical distance between a critical point on the image-side surface of the ninth lens element and the optical axis is Yc92, and the following conditions are satisfied:

$$2.0 < Y92/BL < 20; \text{and}$$

$$0.50 < Yc92/Yc82 < 2.0.$$

12. An image capturing unit, comprising:
the optical lens system of claim 1; and
an image sensor disposed on the image surface of the optical lens system.

13. An electronic device, comprising at least two image capturing units which face in a same direction and comprise:
a first image capturing unit, wherein the first image capturing unit is the image capturing unit of claim 12; and
a second image capturing unit;
wherein a maximum field of view of the first image capturing unit is different from a maximum field of view of the second image capturing unit by at least 20 degrees.

14. The electronic device of claim 13, wherein the maximum field of view of the first image capturing unit is different from the maximum field of view of the second image capturing unit by at least 60 degrees.

15. An optical lens system comprising, in order from an object side to an image side, a front lens group, a middle lens group and a rear lens group; the front lens group comprising an object-side lens element closest to an imaged object, the rear lens group comprising at least three lens elements, and the at least three lens elements of the rear lens group comprise an image-side lens element closest to an image surface;
wherein the image-side lens element has an object-side surface being concave on an optical axis, at least one lens surface of the rear lens group has at least one critical point in an off-axis region thereof, and each lens element of the rear lens group has at least one lens surface being aspheric;
wherein a total number of lens elements of the optical lens system is NL, an axial distance between an object-side surface of the object-side lens element and the image surface is TL, a maximum image height of the optical lens system is ImgH, an entrance pupil diameter of the optical lens system is EPD, a minimum value among Abbe numbers of all lens elements of the optical lens system is Vmin, a total number of lens elements having an Abbe number smaller than 40 in the optical lens system is V40, and the following conditions are satisfied:

NL=9;

$TL/ImgH<3.0$;

$TL/EPD<4.0$;

$Vmin<28$; and $4 \le V40$.

16. The optical lens system of claim 15, wherein the front lens group has a total of three lens elements, the rear lens group has a total of three lens elements, a focal length of the optical lens system is f, a composite focal length of the front lens group is fG1, and the following condition is satisfied:

$0.25<fG1/f<8.0$.

17. The optical lens system of claim 16, wherein the focal length of the optical lens system is f, a composite focal length of the middle lens group is fG2, a composite focal length of the rear lens group is fG3, and the following conditions are satisfied:

$-0.75<f/fG2<2.0$; and $-2.50<f/fG3<0.60$.

18. The optical lens system of claim 15, wherein the axial distance between the object-side surface of the object-side lens element and the image surface is TL, the entrance pupil diameter of the optical lens system is EPD, a maximum effective radius of the object-side surface of the object-side lens element is Y11, the maximum image height of the optical lens system is ImgH, and the following conditions are satisfied:

$TL/EPD<3.0$; and $0.2<Y11/ImgH<1.0$.

19. The optical lens system of claim 15, wherein an Abbe number of a lens element of the optical lens system is V, a refractive index of the lens element of the optical lens system is N, and at least one lens element of the optical lens system satisfies the following condition:

$6.0<V/N<12.0$.

20. The optical lens system of claim 15, wherein the minimum value among Abbe numbers of all lens elements of the optical lens system is Vmin, and the following condition is satisfied:

Vmin<24;

wherein a focal length of the optical lens system is f, a focal length of the i-th lens element is fi, and at least two lens elements of the optical lens system satisfy the following condition:

$|f/fi|<0.20$.

21. The optical lens system of claim 15, wherein at least one lens surface of each lens element of the rear lens group has at least one critical point in an off-axis region thereof.

22. The optical lens system of claim 15, wherein an axial distance between the object-side surface of the object-side lens element and an image-side surface of the image-side lens element is Td, a sum of central thicknesses of all lens elements of the optical lens system is ΣCT, and the following condition is satisfied:

$Td/\Sigma CT<1.75$.

23. The optical lens system of claim 15, wherein a total number of inflection points of all lens elements of the optical lens system is NIF, and the following condition is satisfied:

$20 \le NIF$.

24. The optical lens system of claim 15, wherein the axial distance between the object-side surface of the object-side lens element and the image surface is TL, the maximum image height of the optical lens system is ImgH, a chief ray angle at a maximum image height position of the optical lens system is CRA, and the following condition is satisfied:

$TL/[ImgH \times \tan(CRA)]<3.0$.

25. An image capturing unit, comprising:
the optical lens system of claim 15; and
an image sensor disposed on the image surface of the optical lens system.

26. An electronic device, comprising:
the image capturing unit of claim 25.

27. An optical lens system comprising nine lens elements, the nine lens elements being, in order from an object side to an image side, a first lens element, a second lens element, a third lens element, a fourth lens element, a fifth lens element, a sixth lens element, a seventh lens element, an eighth lens element and a ninth lens element;
wherein the ninth lens element has an object-side surface being concave on an optical axis, at least one lens surface of the seventh lens element, the eighth lens element and the ninth lens element has at least one critical point in an off-axis region thereof, each of the seventh lens element, the eighth lens element and the ninth lens element has at least one lens surface being aspheric, and at least five lens elements of the optical lens system are made of plastic material;
wherein an axial distance between an object-side surface of the first lens element and an image surface is TL, a maximum image height of the optical lens system is ImgH, an entrance pupil diameter of the optical lens system is EPD, a total number of lens elements having an Abbe number smaller than 40 in the optical lens system is V40, and the following conditions are satisfied:

$TL/ImgH<3.0$ $TL/EPD<4.0$; and $4 \le V40$.

28. The optical lens system of claim 27, wherein a maximum effective radius of an image-side surface of the ninth lens element is Y92, an axial distance between the image-side surface of the ninth lens element and the image surface is BL, and the following condition is satisfied:

$2.0<Y92/BL<20$.

29. The optical lens system of claim 27, wherein a total number of inflection points of all lens elements of the optical lens system is NIF, and the following condition is satisfied:

$20<NIF$.

30. The optical lens system of claim 27, wherein a total number of lens elements having an Abbe number smaller than 30 in the optical lens system is V30, and the following condition is satisfied:

$$4 \leq V30.$$

31. The optical lens system of claim 27, wherein the axial distance between the object-side surface of the first lens element and the image surface is TL, the maximum image height of the optical lens system is ImgH, a chief ray angle at a maximum image height position of the optical lens system is CRA, and the following condition is satisfied:

$$TL/[ImgH \times \tan(CRA)] < 3.0.$$

32. The optical lens system of claim 27, wherein a focal length of the optical lens system is f, a curvature radius of the object-side surface of the ninth lens element is R17, a curvature radius of an image-side surface of the ninth lens element is R18, a vertical distance between a critical point on an image-side surface of the eighth lens element and the optical axis is Yc82, a vertical distance between a critical point on the image-side surface of the ninth lens element and the optical axis is Yc92, and the following conditions are satisfied:

$$1.0 < |f/R17| + |f/R18|; \text{ and}$$

$$0.50 < Yc92/Yc82 < 2.0.$$

33. The optical lens system of claim 27, wherein a focal length of the optical lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, a focal length of the ninth lens element is f9, and the following conditions are satisfied:

$$-1.5 < f/f1 < 4.0;$$

$$-3.0 < f/f2 < 2.0;$$

$$-3.0 < f/f3 < 3.0;$$

$$-3.0 < f/f4 < 3.0;$$

$$-3.0 < f/f5 < 3.0;$$

$$-3.0 < f/f6 < 3.0;$$

$$-3.0 < f/f7 < 3.0;$$

$$-3.0 < f/f8 < 3.0; \text{ and}$$

$$-3.0 < f/f9 < 3.0.$$

* * * * *